(12) United States Patent
LeTourneau

(10) Patent No.: US 11,418,315 B2
(45) Date of Patent: *Aug. 16, 2022

(54) METHOD AND/OR SYSTEM FOR TRANSMITTING AND/OR RECEIVING DATA

(71) Applicant: Robert T. and Virginia T. Jenkins as Trustees of the Jenkins Family Trust Dated Feb. 8, 2002, Sacramento, CA (US)

(72) Inventor: Jack J. LeTourneau, Ventura, CA (US)

(73) Assignee: Robert T. and Virginia T. Jenkins, Sacramento, CA (US), as Trustees of the Jenkins Family Trust Dated Feb. 8, 2002

( * ) Notice: Subject to any disclaimer, the term of this patent is extended or adjusted under 35 U.S.C. 154(b) by 13 days.

This patent is subject to a terminal disclaimer.

(21) Appl. No.: 16/427,054

(22) Filed: May 30, 2019

(65) Prior Publication Data
US 2019/0356465 A1    Nov. 21, 2019

Related U.S. Application Data

(63) Continuation of application No. 15/240,964, filed on Aug. 18, 2016, now Pat. No. 10,411,878, which is a continuation of application No. 14/726,192, filed on May 29, 2015, now Pat. No. 9,425,951, which is a continuation of application No. 14/149,749, filed on Jan. 7, 2014, now Pat. No. 9,077,515, which is a continuation of application No. 12/613,450, filed on
(Continued)

(51) Int. Cl.
*G06F 16/9032* (2019.01)
*G06F 16/248* (2019.01)
*G06F 16/2457* (2019.01)
*G06F 16/93* (2019.01)
*H04L 7/04* (2006.01)
*H04L 1/00* (2006.01)
*G06F 16/23* (2019.01)
*H04N 19/68* (2014.01)

(52) U.S. Cl.
CPC ............ *H04L 7/041* (2013.01); *G06F 16/235* (2019.01); *H04L 1/0041* (2013.01); *H04L 7/04* (2013.01); *H04N 19/68* (2014.11); *H04M 2201/22* (2013.01); *Y10S 707/99942* (2013.01)

(58) Field of Classification Search
CPC ......... H04L 7/04; H04L 7/041; H04L 7/0041; H04L 1/0041; H04N 19/68; Y10S 707/99942; H04M 2201/22; G06F 16/235
USPC ........ 707/755, 802, 5, 2, 201, 1, 11, 10, 797
See application file for complete search history.

(56) References Cited

U.S. PATENT DOCUMENTS 3,201,701 A    8/1965   Maitra
3,704,345 A    11/1972  Coker
(Continued)

OTHER PUBLICATIONS

U.S. Appl. No. 16/209,872 /Notice of Allowance/Allowability dated Jul. 13, 2021, 12 pages, Doc 2314.
(Continued)

*Primary Examiner* — Kuen S Lu
(74) *Attorney, Agent, or Firm* — Berkeley Law & Technology Group, LLP

(57) ABSTRACT

Embodiments of a method and/or system of transmitting and/or receiving data is disclosed.

46 Claims, 8 Drawing Sheets

300

Related U.S. Application Data

Nov. 5, 2009, now Pat. No. 8,650,201, which is a continuation of application No. 11/006,842, filed on Dec. 7, 2004, now Pat. No. 7,630,995.

(60) Provisional application No. 60/632,343, filed on Nov. 30, 2004.

(56) References Cited

U.S. PATENT DOCUMENTS

| | | |
|---|---|---|
| 4,001,951 A | 1/1977 | Fasse |
| 4,134,218 A | 1/1979 | Adams |
| 4,156,910 A | 5/1979 | Barton |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa |
| 4,751,684 A | 6/1988 | Holt |
| 4,831,525 A | 5/1989 | Saito |
| 4,867,686 A | 9/1989 | Goldstein |
| 4,905,138 A | 1/1990 | Bourne |
| 4,916,655 A | 4/1990 | Ohsone |
| 4,931,928 A | 6/1990 | Greenfeld |
| 4,949,388 A | 8/1990 | Bhaskaran |
| 4,989,132 A | 1/1991 | Mellender |
| 4,991,087 A | 2/1991 | Burkowski |
| 5,010,478 A | 4/1991 | Deran |
| 5,021,943 A | 6/1991 | Grimes |
| 5,021,992 A | 6/1991 | Kondo |
| 5,050,071 A | 9/1991 | Harris |
| 5,136,593 A | 8/1992 | Moon |
| 5,191,522 A | 3/1993 | Bosco |
| 5,235,701 A | 8/1993 | Ohler |
| 5,265,245 A | 11/1993 | Nordstrom |
| 5,295,261 A | 3/1994 | Simonetti |
| 5,325,531 A | 6/1994 | McKeeman |
| 5,335,320 A | 8/1994 | Iwata |
| 5,335,345 A | 8/1994 | Frieder |
| 5,355,496 A | 10/1994 | Fant |
| 5,450,581 A | 9/1995 | Bergen |
| 5,463,777 A | 10/1995 | Bialkowski |
| 5,493,504 A | 2/1996 | Minato |
| 5,493,678 A | 2/1996 | Arcuri |
| 5,497,500 A | 3/1996 | Rogers |
| 5,509,088 A | 4/1996 | Robson |
| 5,511,159 A | 4/1996 | Baker |
| 5,519,627 A | 5/1996 | Mahmood |
| 5,522,068 A | 5/1996 | Berkowitz |
| 5,544,301 A | 8/1996 | Orton |
| 5,548,755 A | 8/1996 | Leung |
| 5,577,253 A | 11/1996 | Blickstein |
| 5,598,350 A | 1/1997 | Kawanishi |
| 5,606,669 A | 2/1997 | Bertin |
| 5,636,155 A | 6/1997 | Kabuo |
| 5,687,362 A | 11/1997 | Bhargava |
| 5,706,406 A | 1/1998 | Pollock |
| 5,724,512 A | 3/1998 | Winterbottom |
| 5,724,576 A | 3/1998 | Letourneau |
| 5,742,806 A | 4/1998 | Reiner |
| 5,745,892 A | 4/1998 | Miyata |
| 5,748,975 A | 5/1998 | Van De Vanter |
| 5,758,152 A | 5/1998 | Letourneau |
| 5,778,354 A | 7/1998 | Leslie |
| 5,778,371 A | 7/1998 | Fujihara |
| 5,781,906 A | 7/1998 | Aggarwal |
| 5,784,557 A | 7/1998 | Oprescu |
| 5,787,415 A | 7/1998 | Jacobson |
| 5,787,432 A | 7/1998 | Letourneau |
| 5,796,356 A | 8/1998 | Okada |
| 5,802,370 A | 9/1998 | Sitbon |
| 5,822,593 A | 10/1998 | Lamping |
| 5,826,262 A | 10/1998 | Bui |
| 5,838,319 A | 11/1998 | Guzak |
| 5,848,159 A * | 12/1998 | Collins ............ G06Q 20/382 380/30 |
| 5,930,805 A | 7/1999 | Marquis |
| 5,937,181 A * | 8/1999 | Godefroid ............ G06F 8/73 703/22 |
| 5,940,619 A | 8/1999 | Abadi |
| 5,960,425 A | 8/1999 | Buneman |
| 5,970,490 A | 10/1999 | Morgenstern |
| 5,978,790 A | 11/1999 | Buneman |
| 5,987,449 A | 11/1999 | Suciu |
| 5,999,926 A | 12/1999 | Suciu |
| 6,002,879 A | 12/1999 | Radigan |
| 6,003,033 A | 12/1999 | Amano |
| 6,022,879 A | 2/2000 | Crow |
| 6,028,987 A | 2/2000 | Hirairi |
| 6,055,537 A | 4/2000 | Letourneau |
| 6,076,087 A | 6/2000 | Suciu |
| 6,088,691 A | 7/2000 | Bhargava |
| 6,141,655 A | 10/2000 | Johnson |
| 6,199,059 B1 | 3/2001 | Dahan |
| 6,199,103 B1 | 3/2001 | Sakuguchi |
| 6,236,410 B1 | 5/2001 | Politis |
| 6,240,418 B1 | 5/2001 | Shadmon |
| 6,243,859 B1 | 6/2001 | Chen-Kuang |
| 6,272,495 B1 | 8/2001 | Hetherington |
| 6,279,007 B1 | 8/2001 | Uppala |
| 6,289,354 B1 | 9/2001 | Aggarwal |
| 6,292,938 B1 | 9/2001 | Sarkar |
| 6,314,559 B1 | 11/2001 | Sollich |
| 6,336,812 B1 | 1/2002 | Cooper |
| 6,341,372 B1 | 1/2002 | Datig |
| 6,377,953 B1 | 4/2002 | Gawlick |
| 6,411,957 B1 | 6/2002 | Dijkstra |
| 6,442,584 B1 | 8/2002 | Kolli |
| 6,446,256 B1 | 9/2002 | Hymen |
| 6,466,240 B1 | 10/2002 | Maslov |
| 6,480,857 B1 | 11/2002 | Chandler |
| 6,499,036 B1 | 12/2002 | Gurevich |
| 6,505,205 B1 | 1/2003 | Kothuri |
| 6,542,899 B1 | 4/2003 | Saulpaugh |
| 6,550,024 B1 | 4/2003 | Pagurek |
| 6,556,983 B1 | 4/2003 | Altschuler |
| 6,598,052 B1 | 7/2003 | Saulpaugh |
| 6,598,502 B1 | 7/2003 | Rosa |
| 6,606,632 B1 | 8/2003 | Saulpaugh |
| 6,606,741 B2 | 8/2003 | Kojima |
| 6,609,130 B1 | 8/2003 | Saulpaugh |
| 6,610,106 B1 | 8/2003 | Jenks |
| 6,611,844 B1 | 8/2003 | Saulpaugh |
| 6,640,218 B1 | 10/2003 | Golding |
| 6,658,649 B1 | 12/2003 | Bates |
| 6,665,664 B2 | 12/2003 | Paulley |
| 6,687,734 B1 | 2/2004 | Sellink |
| 6,691,301 B2 | 2/2004 | Bowen |
| 6,714,939 B2 | 3/2004 | Saldanha |
| 6,728,953 B1 | 4/2004 | Walster |
| 6,742,054 B1 | 5/2004 | Upton |
| 6,745,384 B1 | 6/2004 | Biggerstaff |
| 6,748,378 B1 | 6/2004 | Lavender |
| 6,763,515 B1 | 7/2004 | Vazquez |
| 6,785,673 B1 * | 8/2004 | Fernandez ............ G06F 40/151 |
| 6,795,868 B1 | 9/2004 | Dingman |
| 6,804,677 B2 | 10/2004 | Shadmon |
| 6,817,865 B2 | 11/2004 | Charbonneau |
| 6,829,695 B1 | 12/2004 | Ross |
| 6,847,979 B2 | 1/2005 | Allemang |
| 6,854,976 B1 | 2/2005 | Suhr |
| 6,874,005 B2 | 3/2005 | Fortenberry |
| 6,880,148 B1 | 4/2005 | Raph |
| 6,941,511 B1 | 9/2005 | Hind |
| 6,965,990 B2 | 11/2005 | Barsness |
| 6,968,330 B2 | 11/2005 | Edwards |
| 6,978,271 B1 * | 12/2005 | Hoffman ............ G06F 16/13 |
| 7,043,555 B1 | 5/2006 | McClain |
| 7,051,033 B2 | 5/2006 | Agarwal |
| 7,072,904 B2 | 7/2006 | Najork |
| 7,103,838 B1 | 9/2006 | Krishnamurthy |
| 7,107,265 B1 | 9/2006 | Calvignac |
| 7,111,016 B2 | 9/2006 | Gurevich |
| 7,117,196 B2 | 10/2006 | Gaur |
| 7,117,479 B2 | 10/2006 | Van De Vanter |

(56) References Cited

U.S. PATENT DOCUMENTS

| | | |
|---|---|---|
| 7,127,704 B2 | 10/2006 | Van De Vanter |
| 7,134,075 B2 | 11/2006 | Hind |
| 7,139,765 B1 | 11/2006 | Balkany |
| 7,140,006 B2 | 11/2006 | Harrison |
| 7,162,485 B2 | 1/2007 | Gottlob |
| 7,167,856 B2 | 1/2007 | Lawder |
| 7,190,376 B1 | 3/2007 | Tonisson |
| 7,191,182 B2 | 3/2007 | Anonsen |
| 7,203,680 B2 | 4/2007 | Parida |
| 7,203,774 B1 | 4/2007 | Zhou |
| 7,225,183 B2 | 5/2007 | Gardner |
| 7,225,199 B1 | 5/2007 | Green |
| 7,287,026 B2 | 10/2007 | Oommen |
| 7,313,563 B2 | 12/2007 | Kar |
| 7,318,066 B2 | 1/2008 | Kaufman |
| 7,318,215 B1 | 1/2008 | Krishnan |
| 7,337,163 B1 | 2/2008 | Srinivasan |
| 7,356,802 B2 | 4/2008 | de Sutter |
| 7,360,202 B1 | 4/2008 | Seshadri |
| 7,392,239 B2 | 6/2008 | Fontoura |
| 7,409,673 B2 | 8/2008 | Kuo |
| 7,419,376 B2 | 9/2008 | Sarvazyan |
| 7,421,648 B1 | 9/2008 | Davis |
| 7,437,666 B2 | 10/2008 | Ramarao |
| 7,475,070 B2 | 1/2009 | Fan |
| 7,496,892 B2 | 2/2009 | Nuss |
| 7,512,932 B2 | 3/2009 | Davidov |
| 7,536,675 B2 | 5/2009 | Gallagher |
| 7,536,676 B2 | 5/2009 | Baker |
| 7,544,062 B1 | 6/2009 | Hauschild |
| 7,561,927 B2 | 7/2009 | Oyama |
| 7,571,156 B1 | 8/2009 | Gupta |
| 7,571,169 B2 | 8/2009 | Jones |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | Letourneau |
| 7,630,995 B2 | 12/2009 | Letourneau |
| 7,636,727 B2 | 12/2009 | Schiffmann |
| 7,650,592 B2 | 1/2010 | Eckels |
| 7,669,183 B2 | 2/2010 | Bowman |
| 7,681,177 B2 | 3/2010 | Letourneau |
| 7,720,830 B2 | 5/2010 | Wen |
| 7,761,847 B2 | 7/2010 | Kornerup |
| 7,761,858 B2 | 7/2010 | Chang |
| 7,765,183 B2 | 7/2010 | Williams, Jr. |
| 7,779,396 B2 | 8/2010 | Meijer |
| 7,801,923 B2 | 9/2010 | Letourneau |
| 7,827,523 B2 | 11/2010 | Ahmed |
| 7,861,304 B1 | 12/2010 | Nachenberg |
| 7,882,147 B2 | 2/2011 | Letourneau |
| 7,890,471 B2 | 2/2011 | Fan |
| 7,890,927 B2 | 2/2011 | Eldridge |
| 7,890,928 B2 | 2/2011 | Patrudu |
| 7,899,821 B1 | 3/2011 | Schiffmann |
| 7,962,494 B2 | 6/2011 | Furusho |
| 8,005,869 B2 | 8/2011 | Corl |
| 8,020,145 B2 | 9/2011 | Fant |
| 8,032,860 B2 | 10/2011 | Piehler |
| 8,037,102 B2 | 10/2011 | Letourneau |
| 8,060,868 B2 | 11/2011 | Meijer |
| 8,086,998 B2 | 12/2011 | Bansal |
| 8,112,740 B2 | 2/2012 | Meijer |
| 8,151,276 B2 | 4/2012 | Grechanik |
| 8,181,155 B2 | 5/2012 | Pinto |
| 8,203,972 B2 | 6/2012 | Sauermann |
| 8,230,526 B2 | 7/2012 | Holland |
| 8,250,526 B2 | 8/2012 | Anderson |
| 8,307,102 B2 | 11/2012 | Skog |
| 8,316,059 B1 | 11/2012 | Schiffmann |
| 8,332,428 B2 | 12/2012 | Bonneau |
| 8,356,040 B2 | 1/2013 | Letourneau |
| 8,365,137 B2 | 1/2013 | Fant |
| 8,438,534 B2 | 5/2013 | Thomson |
| 8,443,339 B2 | 5/2013 | Letourneau |
| 8,458,191 B2 | 6/2013 | Bhattacharjee |
| 8,484,236 B1 | 7/2013 | Andrews |
| 8,606,794 B2 | 12/2013 | Amer-Yahia |
| 8,612,461 B2 | 12/2013 | Schiffmann |
| 8,615,530 B1 | 12/2013 | Letourneau |
| 8,626,777 B2 | 1/2014 | Letourneau |
| 8,645,346 B2 | 2/2014 | Dumitru |
| 8,650,201 B2 | 2/2014 | Letourneau |
| 8,683,431 B2 | 3/2014 | Thomson |
| 8,745,070 B2 | 6/2014 | Krishnamurthy |
| 8,762,942 B2 | 6/2014 | Langworthy |
| 8,868,621 B2 | 10/2014 | D'Onofrio, II |
| 8,869,106 B2 | 10/2014 | Jazdzewski |
| 8,930,896 B1 | 1/2015 | Wiggins |
| 8,935,232 B2 | 1/2015 | Abadi |
| 8,990,769 B2 | 3/2015 | Letourneau |
| 9,002,862 B2 | 4/2015 | Schiffmann |
| 9,015,202 B2 | 4/2015 | Letourneau |
| 9,020,961 B2 | 4/2015 | Letourneau |
| 9,043,347 B2 | 5/2015 | Letourneau |
| 9,077,515 B2 | 7/2015 | Letourneau |
| 9,167,579 B2 | 10/2015 | Fettweis |
| 9,177,003 B2 | 11/2015 | Letourneau |
| 9,245,050 B2 | 1/2016 | Schiffmann |
| 9,330,128 B2 | 5/2016 | Schiffmann |
| 9,411,841 B2 | 8/2016 | Schiffmann |
| 9,425,951 B2 | 8/2016 | Letourneau |
| 9,430,512 B2 | 8/2016 | Letourneau |
| 9,563,653 B2 | 2/2017 | Letourneau |
| 9,563,663 B2 | 2/2017 | Shukla |
| 9,646,034 B2 | 5/2017 | Schiffmann |
| 9,646,107 B2 | 5/2017 | Letourneau |
| 9,842,130 B2 | 12/2017 | Schiffmann |
| 10,055,438 B2 | 8/2018 | Schiffmann |
| 10,068,003 B2 | 9/2018 | Letourneau |
| 10,140,349 B2 | 11/2018 | Letourneau |
| 10,255,311 B2 | 4/2019 | Letourneau |
| 10,275,489 B1 | 4/2019 | Muniswamy Reddy |
| 10,325,031 B2 | 6/2019 | Letourneau |
| 10,380,039 B2 | 8/2019 | Cooray |
| 10,380,089 B2 | 8/2019 | Letourneau |
| 10,394,785 B2 | 8/2019 | Letourneau |
| 10,411,878 B2 | 9/2019 | Letourneau |
| 10,437,886 B2 | 10/2019 | Andrews |
| 10,713,274 B2 | 7/2020 | Letourneau |
| 10,725,989 B2 | 7/2020 | Schiffmann |
| 10,733,234 B2 | 8/2020 | Letourneau |
| 11,100,070 B2 | 8/2021 | Schiffmann |
| 11,100,137 B2 | 8/2021 | Letourneau |
| 11,194,777 B2 | 12/2021 | Letourneau |
| 11,204,906 B2 | 12/2021 | Letourneau |
| 11,243,975 B2 | 2/2022 | Letourneau |
| 11,314,709 B2 | 4/2022 | Letourneau |
| 11,314,766 B2 | 4/2022 | Letourneau |
| 2001/0003211 A1 | 6/2001 | Bera |
| 2001/0037496 A1 | 11/2001 | Simonyi |
| 2002/0023166 A1* | 2/2002 | Bar-Noy ............ H04L 65/4076 709/231 |
| 2002/0040292 A1 | 4/2002 | Marcu |
| 2002/0059281 A1 | 5/2002 | Watanabe |
| 2002/0062259 A1 | 5/2002 | Katz |
| 2002/0091676 A1 | 7/2002 | Agrawal |
| 2002/0107860 A1 | 8/2002 | Gobeille |
| 2002/0129129 A1* | 9/2002 | Bloch ................. G06F 8/61 709/220 |
| 2002/0130796 A1 | 9/2002 | Tsuchido |
| 2002/0130907 A1 | 9/2002 | Chi |
| 2002/0133347 A1 | 9/2002 | Schoneburg |
| 2002/0133497 A1 | 9/2002 | Draper |
| 2002/0149604 A1 | 10/2002 | Wilkinson |
| 2002/0169563 A1 | 11/2002 | Carvalho |
| 2002/0194163 A1 | 12/2002 | Hopeman |
| 2003/0041088 A1 | 2/2003 | Wilson |
| 2003/0065659 A1 | 4/2003 | Agarwal |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su |
| 2003/0195885 A1* | 10/2003 | Emmick ............ G06F 16/86 |

(56) References Cited

U.S. PATENT DOCUMENTS

| | | |
|---|---|---|
| 2003/0195890 A1 | 10/2003 | Oommen |
| 2003/0236787 A1 | 12/2003 | Burges |
| 2003/0236794 A1 | 12/2003 | Hostetter |
| 2004/0003028 A1 | 1/2004 | Emmett |
| 2004/0010752 A1 | 1/2004 | Chan |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd |
| 2004/0054692 A1 | 3/2004 | Seyrat |
| 2004/0060006 A1 | 3/2004 | Lindblad |
| 2004/0060007 A1 | 3/2004 | Gottlob |
| 2004/0068498 A1 | 4/2004 | Patchet |
| 2004/0075677 A1 | 4/2004 | Loyall |
| 2004/0103105 A1 | 5/2004 | Lindblad |
| 2004/0122844 A1* | 6/2004 | Malloy ............... G06F 16/283 |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron |
| 2004/0239674 A1 | 12/2004 | Ewald |
| 2004/0254909 A1 | 12/2004 | Testa |
| 2004/0260683 A1* | 12/2004 | Chan ................. G06F 16/9027 |
| 2004/0260684 A1 | 12/2004 | Agarwal |
| 2004/0267958 A1 | 12/2004 | Reed |
| 2004/0268236 A1 | 12/2004 | Chidlovskii |
| 2005/0021548 A1 | 1/2005 | Bohannon |
| 2005/0021683 A1 | 1/2005 | Newton |
| 2005/0023524 A1 | 2/2005 | Beatty |
| 2005/0027495 A1 | 2/2005 | Matichuk |
| 2005/0027743 A1 | 2/2005 | O'Neil |
| 2005/0028091 A1 | 2/2005 | Bordawekar |
| 2005/0050016 A1 | 3/2005 | Stanoi |
| 2005/0050066 A1 | 3/2005 | Hughes |
| 2005/0055369 A1 | 3/2005 | Gorelik |
| 2005/0058976 A1 | 3/2005 | Vernon |
| 2005/0060320 A1 | 3/2005 | Bostrom |
| 2005/0060332 A1 | 3/2005 | Bernstein |
| 2005/0065964 A1 | 3/2005 | Ziemann |
| 2005/0065965 A1 | 3/2005 | Ziemann |
| 2005/0097084 A1 | 5/2005 | Balmin |
| 2005/0102636 A1 | 5/2005 | McKeon |
| 2005/0125432 A1 | 6/2005 | Lin |
| 2005/0138073 A1 | 6/2005 | Zhou |
| 2005/0149471 A1 | 7/2005 | Lassalle |
| 2005/0154979 A1 | 7/2005 | Chidlovskii |
| 2005/0156761 A1 | 7/2005 | Oh |
| 2005/0165732 A1 | 7/2005 | Burges |
| 2005/0514265 | 7/2005 | Miro |
| 2005/0171962 A1* | 8/2005 | Martin ................. H03M 7/30 |
| 2005/0187900 A1 | 8/2005 | Letourneau |
| 2005/0195741 A1* | 9/2005 | Doshi .................. H04L 47/825 370/230 |
| 2005/0210014 A1 | 9/2005 | Asano |
| 2005/0214727 A1 | 9/2005 | Stoianovici |
| 2005/0216445 A1 | 9/2005 | Rao |
| 2005/0267908 A1 | 12/2005 | Letourneau |
| 2005/0286788 A1* | 12/2005 | Orr .................. H04L 25/03292 382/240 |
| 2006/0004817 A1* | 1/2006 | Andrews ............. G06F 16/9027 |
| 2006/0005122 A1 | 1/2006 | Lemoine |
| 2006/0015538 A1 | 1/2006 | Letourneau |
| 2006/0053122 A1 | 3/2006 | Korn |
| 2006/0074838 A1 | 4/2006 | Srivastava |
| 2006/0095442 A1 | 5/2006 | Letourneau |
| 2006/0095455 A1 | 5/2006 | Letourneau |
| 2006/0123029 A1 | 6/2006 | Letourneau |
| 2006/0129582 A1 | 6/2006 | Schiffmann |
| 2006/0209351 A1 | 9/2006 | Saito |
| 2006/0259533 A1 | 11/2006 | Letourneau |
| 2006/0271573 A1 | 11/2006 | Letourneau |
| 2007/0003917 A1 | 1/2007 | Kitching |
| 2007/0198538 A1 | 8/2007 | Palacios |
| 2008/0270435 A1 | 10/2008 | Furusho |
| 2008/0313196 A1 | 12/2008 | Furusho |
| 2010/0094885 A1 | 4/2010 | Andrews |
| 2010/0094908 A1 | 4/2010 | Letourneau |
| 2010/0114969 A1 | 4/2010 | Letourneau |
| 2010/0191775 A1 | 7/2010 | Schiffmann |
| 2010/0205581 A1 | 8/2010 | Letourneau |
| 2010/0318521 A1 | 12/2010 | Letourneau |
| 2011/0131259 A1 | 6/2011 | Letourneau |
| 2011/0282898 A1 | 11/2011 | Schiffmann |
| 2011/0320499 A1 | 12/2011 | Letourneau |
| 2012/0144388 A1 | 6/2012 | Schiffmann |
| 2013/0151566 A1 | 6/2013 | Letourneau |
| 2013/0198239 A1 | 8/2013 | Letourneau |
| 2014/0040293 A1 | 2/2014 | Letourneau |
| 2014/0184430 A1 | 7/2014 | Jiang |
| 2014/0289266 A1 | 9/2014 | Letourneau |
| 2014/0289278 A1 | 9/2014 | Schiffmann |
| 2014/0289279 A1 | 9/2014 | Letourneau |
| 2014/0362961 A1 | 12/2014 | Letourneau |
| 2015/0193517 A1 | 7/2015 | Letourneau |
| 2015/0220582 A1 | 8/2015 | Letourneau |
| 2015/0242449 A1 | 8/2015 | Schiffmann |
| 2015/0242450 A1 | 8/2015 | Letourneau |
| 2015/0310048 A1 | 10/2015 | Letourneau |
| 2015/0341165 A1 | 11/2015 | Letourneau |
| 2016/0117353 A1 | 4/2016 | Schiffmann |
| 2016/0162528 A1 | 6/2016 | Letourneau |
| 2016/0283611 A1 | 9/2016 | Letourneau |
| 2016/0328431 A1 | 11/2016 | Schiffmann |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0255660 A1 | 9/2017 | Letourneau |
| 2018/0107698 A1 | 4/2018 | Schiffmann |
| 2019/0026326 A1 | 1/2019 | Schiffmann |
| 2019/0034510 A1 | 1/2019 | Letourneau |
| 2019/0121795 A1 | 4/2019 | Schiffmann |
| 2019/0129899 A1 | 5/2019 | Letourneau |
| 2019/0171628 A1 | 6/2019 | Letourneau |
| 2019/0236078 A1 | 8/2019 | Letourneau |
| 2019/0356465 A1 | 11/2019 | Letourneau |
| 2019/0377718 A1 | 12/2019 | Letourneau |
| 2019/0384753 A1 | 12/2019 | Letourneau |
| 2019/0384792 A1 | 12/2019 | Andrews |
| 2020/0218707 A1 | 7/2020 | Letourneau |
| 2020/0372041 A1 | 11/2020 | Letourneau |
| 2020/0394168 A1 | 12/2020 | Schiffmann |
| 2020/0394224 A1 | 12/2020 | Letourneau |
| 2021/0149860 A1 | 5/2021 | Letourneau |
| 2021/0349871 A1 | 11/2021 | Letourneau |
| 2022/0043793 A1 | 2/2022 | Letourneau |
| 2022/0043832 A1 | 2/2022 | Letourneau |

OTHER PUBLICATIONS

U.S. Appl. No. 16/209,872 / Issue Fee Payment and 312 Response filed Oct. 11, 2021, 14 pages, Doc 2357.

U.S. Appl. No. 16/820,457 / Supplemental Preliminary Amendment filed Jul. 30, 2021, 17 pages, Doc 2315.

U.S. Appl. No. 17/158,804 / Supplemental Preliminary Amendment filed Jul. 30, 2021, 14 pages, Doc 2316.

U.S. Appl. No. 17/381,142 / Patent Application and Preliminary Amendment filed Jul. 20, 2021, 146 pages, Doc 2317.

U.S. Appl. No. 17/381,142 / Filing Receipt dated Aug. 3, 2021, 4 pages, Doc 2318.

U.S. Appl. No. 16/909,899 / Non-final Office Action dated Aug. 11, 2021, pages, Doc 2336.

U.S. Appl. No. 16/459,930 / Response to Non-final Office Action filed Oct. 12, 2021, 18 pages, Doc 2358.

U.S. Appl. No. 16/513,021 / Response to Non-final Office Action and Terminal Disclaimer filed Sep. 28, 2021, 36 pages, Doc 2346.

U.S. Appl. No. 16/513,021 / Final Office Action dated Nov. 2, 2021, 37 pages, Doc 2359

U.S. Appl. No. 15/464,205 / Request for Continued Examination and 312 Response filed Aug. 26, 2021, 13 pages, Doc 2337.

U.S. Appl. No. 15/464,205 / Notice of Allowance/Allowability dated Sep. 9, 2021, 5 pages, Doc 2347.

(56) References Cited

OTHER PUBLICATIONS

U.S. Appl. No. 15/464,205 / Notice of Allowance/Allowability dated Oct. 29, 2021, 105 pages, Doc 2360.
U.S. Appl. No. 16/710,731 / Response to Non-Final Rejection filed Sep. 15, 2021, 24 pages, Doc 2348.
U.S. Appl. No. 16/710,731 / Final Office Action dated Nov. 2, 2021, 39 pages, Doc 2361.
U.S. Appl. No. 16/048,113 / Issue Notification dated Aug. 4, 2021, 1 page, Doc 2339.
U.S. Appl. No. 17/396,488 / Patent Application filed Aug. 6, 2021, 84 pages, Doc 2340.
U.S. Appl. No. 17/396,488 / Filing Receipt and Notice of Missing Parts dated Aug. 19, 2021, 7 pages, Doc 2341.
U.S. Appl. No. 17/396,488 / Response to Notice of Missing Parts and Preliminary Amendment filed Nov. 3, 2021, 95 pages, Doc 2365.
U.S. Appl. No. 16/898,134 / Response to Non-final Office Action and Terminal Disclaimer filed Jul. 30, 2021, 30 pages, Doc 2342.
U.S. Appl. No. 16/898,134 / Notice of Allowance/Allowability dated Sep. 22, 2021, 8 pages, Doc 2349.
U.S. Appl. No. 16/898,134 / Supplemental Notice of Allowability dated Oct. 14, 2021, 23 pages, Doc 2362.
U.S. Appl. No. 16/898,134 / Supplemental Notice of Allowability dated Oct. 20, 2021, 23 pages, Doc 2363.
U.S. Appl. No. 16/048,061 / Issue Notification dated Aug. 4, 2021, 1 page, Doc 2350.
U.S. Appl. No. 17/378,119 / Patent Application filed Jul. 16, 2021, 125 pages, Doc 2343.
U.S. Appl. No. 17/378,119 / Filing Receipt dated Jul. 29, 2021, 4 pages, Doc 2344.
U.S. Appl. No. 17/378,119 / Notice to File Corrected Application Papers dated Jul. 29, 2021, 2 pages, Doc 2345.
U.S. Appl. No. 17/378,119 / Response to Notice to File Corrected Application Papers dated Nov. 3, 2021, 27 pages, Doc 2364.
"Core Technology Benchmarks a White Paper" (Jul. 2002), downloaded from the internet Mar. 2, 2004, 11 pages, Doc 2178.
"Origin Data, Inc. White Paper"(1999) pp. 1-13, 14 pages, Doc 2179.
ACM Portal Search—"The Art of Computer Programming", Fundamental Algorithms, 1 K1973), ACM Portal Search Results conducted by Examiner on Jul. 18, 2009, 6 pages, Doc 2180.
ACM Portal Search—"The Associative Model of Data White Paper", Lazy Software K2000), ACM Portal Search Results conducted by Examiner on Jul. 18, 2009, 1 page, Doc 2181.
Alderson, "Toward An Optimization Driven Framework for Designing and Generating Realistic Internet Topologies", Journal of the Association for Computing Machinery SIGCOMM Computer Communications Review 41, 33(1) (2003) pp. 41-46, 6 pages, Doc 2182.
Apostol, "A Centennial History of the Prime Number Theorem", Engineering and Science, 4, (1996), 10 pages, Doc 2183.
Benedikt, "Definable Relations and First-Order Query Languages over Strings", Journal of the Journal of the Association for Computing Machinery, 50 (2003) pp. 694-751, 58 pages, Doc 2186.
Boppana, "Full Fault Dictionary Storage Based on Labeled Tree Encoding", 14th VLSI Test Symposium (1996) pp. 174-179, 6 pages, Doc 2185.
Borodin, "A Tradeoff Between Search and Update Time for the Implicit Dictionary Problem", Theoretical Computer Science, 1(4) (1990), pp. 425-447, 12 pages, Doc 2184.
Cano, "Lazy Evaluation in Penniless Propagation Over Join Trees", Networks, 39(4) K2002), pp. 175-185, 11 pages, Doc 2187.
Caviness, "Simplification of Radical Expressions", Journal of the Association for Computing Machinery (1976), pp. 329-338, 10 pages, Doc 2188.
Coenen, "T-Trees, Vertical Partitioning and Distributed Association Rule Mining", IEEE (2003), 4 pages, Doc 2191.
Cole—"Tree Pattern Matching and Subset Matching in Deterministic O(n log 3 n)-time", Proceedings of the Tenth Annual Association for Computing Machinery-SIAM Symposium on Discrete Algorithms, (1999) pp. 1-10, 10 pages, Doc 2189

Cooper, "Oh! Pascal!", Arrays for Random Access (1982) pp. 295-327, 18 pages, Doc 2190.
Dubiner—"Faster Tree Pattern Matching", Journal of the Association for Computing Machinery, 41(2) (1994) pp. 205-213, 9 pages, Doc 2192.
Durango Bill's—"Enumeration of Trees", http://web.archive.org/web/20021028184112/http://www.durangobill.com/Trees.html (1998), 3 pages, Doc 2193.
ER, "Enumerating Ordered Trees Lexicographically", Computation Journal, 28 (1985) pp. 538-542, 5 pages, Doc 2194.
Ferragina, "The String B-Tree: A New Data Structure for String Search in External Memory and Its Applications", Journal of the Association for Computing Machinery, 46(2) (1999) pp. 236-280, 45 pages, Doc 2196.
Fluri, "Change Distilling: Tree Differencing for Fine-Grained Source Code Change Extraction", IEEE pp. 725-743 (2007), Doc 2354.
Google search (Kleene prime No. enumeration operation natural numerals sequences "Kleene prime") conducted by Examiner on Jul. 18, 2009, 2 pages, Doc 2195.
Google search (Kleene prime number enumeration operation natural numerals sequences "enumeration operation") conducted by Examiner on Jul. 18, 2009, 2 pages, Doc 2197.
Google search (Kleene prime enumeration operation) conducted by Examiner on Jul. 18, 2009, 2 pages, Doc 2198.
Hirschberg, "Algorithm for Computing Maximal Common Subsequences", Journal of the Association for Computing Machinery, 18(6) (1975) pp. 341-343, 3 pages, Doc 2199.
Hoffmann, "Pattern Matching in Trees" 29(1) (1982) pp. 68-95 28 pages, Doc 2200.
Iacob, "Xpath Extension for Querying Concurrent XML Markup," Technical Report #TR-394-04, Department of Computer Science, University of Kentucky (2004), 15 pages, Doc 2201.
IEEE Explore Digital Library Search Result Conducted by Examiner on Jul. 18, 2009, 1 page, Doc 2202.
Jaiswal, "Local Pattern Transformation Based Feature Extraction Techniques for Classification of Epileptic EEG Signals", Biomedical Signal Processing and Control (2017) pp. 81-92, 12 pages, Doc 2205.
Johnston, "Advances in Dataflow Programming Languages", Journal of the Association for Computing Machinery Computing Surveys, 36 (2004) pp. 1-34, 34 pages, Doc 2203
Katajainen, "Tree Compression and Optimization with Applications", International Journal of Foundations of Computer Science, 1(4) 1990, pp. 425-447, 24 pages, Doc 2204.
Kharbutli, "Using Prime Numbers for Cache Indexing to Eliminate Conflict Misses" North Carolina State University Dept. of Electronical and Computer Engineering (2004) 24 pages, Doc 2206.
Kilpelainen, "Tree Matching Problems with Applications to Structured Text Databases," University of Helsinki Ph. D. Dissertation, Report A-1992-6 (1992) pp. 1-109, 113 pages, Doc 2207.
Knott—"A Balanced Tree Storage and Retrieval Algorithm" ACM pp. 175-196, 1971, Doc 2296.
Knuth—"The Art of Computer Programming", Fundamental Algorithms, 1 (1973), pp. 162-163, 3 pages, Doc 2208.
Krishna, "A VLSI Architecture for Object Recognition Using Tree Matching", IEEE International Conference on Application-Specific Systems, Architecture and Processors (2000), 78 pages, Doc 2226.
Leinonen, "Automation of Document Structure Transformations", University of Kuopio (2004) 68 pages, Doc 2209.
Lerman, "Learning the Common Structure of Data," American Association for Artificial Intelligence, AAAI-00 Proceedings (2000) 6 pages, Doc 2210.
Letourneau, "The Elementary Theory of Object Oriented Arithmetic" (1990) pp. 1-9, 9 pages, Doc 2211.
LI—"An Immediate Approach to Balancing Nodes in Binary Search Trees" ACM, pp. 238-245, 2006, Doc 2242.
Malhotra "A Methodology for Formal Expression of Hierarchy in Model Solution", IEEE (1983) pp. 258-267, 10 pages, Doc 2244.
Minn, "Linear Transformation of Multi-Level Signal Set in Multi-Code CDMA", IEEE (2001) pp. 1239-1243, 5 pages, Doc 2214.
Murray, "Code Transformation and Instruction Set Extension", Journal of the Association for Computing Machinery (2009) pp. 1-31, 32 pages, Doc 2215.

(56) References Cited

OTHER PUBLICATIONS

Navarro, "A Guided Tour to Approximate String Matching", Journal of the Association for Computing Machinery Computing Surveys, 33 (2001) pp. 31-88, 58 pages, Doc 2213.
Neven, "Expressive and Efficient Pattern Languages for Tree-Structured Data," Proceedings of the 19th Association for Computing Machinery SIGACT-SIGMOD-SIGART Symposium on Principles of Database Systems (2000), 12 pages, Doc 2216
Paik, "Mining Association Rules in Tree Structured XML Data" ACM, pp. 807-811, 2009, 5 pages, Doc 2243.
Prasad, "Efficient Bit-Parallel Multi-Patterns String Matching Algorithms for Limited Expression", Journal of the Association for Computing Machinery (2010) pp. 1-6, 6 pages, Doc 2217.
Ramesh—"Nonlinear Pattern Matching in Trees", Journal of the Association for Computer Machinery, 39 (1992) pp. 295-316, 22 pages, Doc 2218.
Reiss, "Semantics-Based Code Search", IEEE ICSE (2009) pp. 243-253, 11 pages, Doc 2219.
Rizum, "Code Transformation by Direct Transformation of ASTs", Journal of the Association for Computing Machinery (2015) pp. 1-7, 7 pages, Doc 2220.
Sahinalp, "Distance Based Indexing for String Proximity Search", IEEE, pp. 125-136 (2003), Doc 2355.
Schmidt, "Comparison of Tree and Graph Encodings as Function of Problem Complexity", Journal of the Association for Computing Machinery (2007) pp. 1674-1679, 6 pages, Doc 2221.
Sechrest, "Blending Hierarchical and Attribute-Based File Naming", Distributed Computing System of the 12th International Conference (1992), pp. 572-580, 9 pages, Doc 2222.
Shanmugasundaram, "Querying SML Views of Relational Data" 27th VLDB Conference (2001), 9 pages, Doc 2223.
Siegel, "All Searches Are Divided into Three Parts String Searches Using Ternary Trees", Journal of the Association for Computing Machinery (1988) pp. 57-68, 12 pages, Doc 2224.
Sinha, "Efficient Trie Based Sorting of Large Sets of Strings", Journal of the Association for Computing Machinery (2003) pp. 1-8, 8 pages, Doc 2225.
Smorynski, "Logical Number Theory 1: An Introduction", Springer-Verlag (1991) pp. 14-23, 305, 16 pages, Doc 2227.
Somani, "Phased-Mission System Analysis Using Boolean Algebraic Methods" 22(1) (1994), 10 pages, Doc 2228.
Spinellis, "Declarative Peephole Optimization Using String Pattern Matching", Journal of the Association for Computing Machinery (1999) pp. 47-51, 5 pages, Doc 2229.
Sproat, "Compilation of Weighted Finite-State Transducers from Decision Trees", Journal of the Association for Computing Machinery (1996) pp. 215-222, 8 pages, Doc 2230.
Stanat, "Discrete Mathematics in Computer Science," (1977) pp. 131-145, 16 pages, Doc 2231
Stefanov "Algorithmic Transformation Techniques for Efficient Exploration of Alternative Application Instances" Journal for the Association for Computing Machinery (ACM) (2002) pp. 7-12, 6 pages, Doc 2234.
Talukdar, "Learning to Create Data-Integrating Queries", Journal of the Association for Computing Machinery PVLDB (2008) pp. 785-796, 12 pages, Doc 2232.
Thiemann, "Grammar Based Analysis of String Expressions", Journal of the Association for Computing Machinery (2005) pp. 59-70, 12 pages, Doc 2233.
Valiente, "Algorithms on Trees and Graphs", Tree Isomorphism (2002) pp. 151-251, 100 pages, Doc 2235.
Valiente, "Tree Isomorphism", Algorithms on Trees and Graphs (2002), 51 pages, Doc 2236.
Mon-Dury, "Experimenting with the Circus Language for XML Modeling and Transformation", ACM pp. 82-87 (2002), Doc 2352.
Wagner, "The String-to-String Correction Problem", Journal of the Association for Computing Machinery, 21(1) (1974) pp. 168-173, 9 pages, Doc 2237.
Wu, "A Prime Number Labeling Scheme for Dynamic Ordered XML Trees", IEEE (2004) 13 pages, Doc 2238.
Xie, "S-Looper: Automatic Summarization for Multipath String Loops", Journal of the Association for Computing Machinery, (2015) pp. 188-198, 11 pages, Doc 2239.
Yang, "Interactive Hierarchical Dimension Ordering, Spacing and Filtering for Exploration of High Dimensional Datasets", IEEE, pp. 1-8 (Year: 2013), 8 pages, Doc 2324.
Yates, "A New Approach to Text Searching", Communication of the Journal of the Association for Computing Machinery, 35(1) (1992) pp. 74-82, 9 pages, Doc 2240.
Zaks, "Lexicographic Generation of Ordered Trees," The Journal of Theoretical Computer Science, 10(1) (1980) pp. 63-82, 11 pages, Doc 2241.
Zanibbi, "Recognizing Mathematical Expressions Using Tree Transformation," IEEE, pp. 1455-1467 (2002), Doc 2353.
Zhang, "B ed-Tree: An All-Purpose Index Structure for String Similarity Search Based on Edit Distance", ACM, pp. 915-926 (2010), Doc 2351.
U.S. Appl. No. 11/005,859 / Patent Application filed Dec. 6, 2004, 124 pages, Doc 1070
U.S. Appl. No. 11/005,859 / Notice to File Missing Parts, Jan. 10, 2002, 2 pages, Doc 1071.
U.S. Appl. No. 11/005,859 / Response to Notice to File Missing Parts, Mar. 29, 2005, 9 pages, Doc 1072.
U.S. Appl. No. 11/005,859 / Preliminary Amendment, Apr. 28, 2005, 193 pages, Doc 1073.
U.S. Appl. No. 11/005,859 / Restriction Requirement, 12/12/007, 7 pages, Doc 1074.
U.S. Appl. No. 11/005,859 / Response to Restriction Requirement, dated Jan. 14, 2008, 82 pages, Doc 1075.
U.S. Appl. No. 11/005,859 / Office Action, dated Mar. 21, 2008, 21 pages, Doc 1076.
U.S. Appl. No. 11/005,859 / Response to Office Action, dated Jul. 21, 2008, 89 pages, Doc 1077.
U.S. Appl. No. 11/005,859 / Final Office Action, dated Oct. 30, 2008, 14 pages, Doc 1078.
U.S. Appl. No. 11/005,859 / Response to Final Office Action, dated Dec. 30, 2008, 84 pages, Doc 1079.
U.S. Appl. No. 11/005,859 / Advisory Action, dated Jan. 13, 2009, 3 pages, Doc 1080.
U.S. Appl. No. 11/005,859 / RCE Amendment, dated Apr. 30, 2009, 88 pages, Doc 1081.
U.S. Appl. No. 11/005,859 / Final Office Action, dated Jul. 8, 2009, 8 pages, Doc 1082.
U.S. Appl. No. 11/005,859 / Interview Summary, dated Oct. 27, 2009, 3 pages, Doc 1083.
U.S. Appl. No. 11/005,859 / Response to Final Office Action, dated Dec. 8, 2009, 85 pages, Doc 1084.
U.S. Appl. No. 11/005,859 / Advisory Action, dated Dec. 22, 2009, 2 pages, Doc 1085.
U.S. Appl. No. 11/005,859 / RCE Amendment, dated Jan. 7, 2010, 87 pages, Doc 1086.
U.S. Appl. No. 11/005,859 / Office Action, dated Jan. 21, 2010, 17 pages, Doc 1087.
U.S. Appl. No. 11/005,859 / Response to Office Action, dated Feb. 25, 2020, 85 pages, Doc 1088.
U.S. Appl. No. 11/005,859 / Final Office Action, dated Jun. 8, 2010, 9 pages, Doc 1089.
U.S. Appl. No. 11/005,859 / Response to Final Office Action, dated Sep. 1, 2010, 91 pages, Doc 1090.
U.S. Appl. No. 11/005,859 / Advisory Action, dated Sep. 14, 2010, 7 pages, Doc 1091.
U.S. Appl. No. 11/005,859 / Notice of Appeal, dated Sep. 29, 2010, 3 pages, Doc 1092.
U.S. Appl. No. 11/005,859 / Office Action, dated Oct. 15, 2010, 5 pages, Doc 1093.
U.S. Appl. No. 11/005,859 / Response to Office Action, dated Jan. 18, 2011, 97 pages, Doc 1094.
U.S. Appl. No. 11/005,859 / Final Office Action, dated Mar. 30, 2011, 8 pages, Doc 1095.
U.S. Appl. No. 11/005,859 / Proposed Examiner's Amendment, dated May 4, 2011, 4 pages, Doc 1096.
U.S. Appl. No. 11/005,859 / Clarification of Examiner's Amendment, dated May 11, 2011, 4 pages, Doc 1097.

(56) References Cited

OTHER PUBLICATIONS

U.S. Appl. No. 11/005,859 / Notice of Allowance, dated Jun. 9, 2011, 19 pages, Doc 1098.
U.S. Appl. No. 11/005,859 / Isue Fee, dated Sep. 9, 2011, 6 pages, Doc 1099.
U.S. Appl. No. 11/005,859 / Issue Notification, dated Sep. 21, 2011, 1 page, Doc 1100.
U.S. Appl. No. 13/229,624 / Application, Sep. 9, 2011, 137 pages, Doc 1101.
U.S. Appl. No. 13/229,624 / Filing Receipt, Sep. 21, 2011, 3 pages, Doc 1102.
U.S. Appl. No. 13/229,624 / Office Action, dated Nov. 23, 2011, 8 pages, Doc 1104.
U.S. Appl. No. 13/229,624 / Notice of Publication, dated Dec. 29, 2011, 1 page, Doc 1103.
U.S. Appl. No. 13/229,624 / Response to Office Action, dated Feb. 23, 2012, 24 pages, Doc 1105.
U.S. Appl. No. 13/229,624 / Final Office Action, dated Mar. 20, 2012, 10 pages, Doc 1106.
U.S. Appl. No. 13/229,624 / Response to Final Office Action, dated Jun. 13, 2012, 25 pages, Doc 1107.
U.S. Appl. No. 13/229,624 / Advisory Action, dated Jun. 20, 2012, 3 pages, Doc 1108.
U.S. Appl. No. 13/229,624 / RCE Amendment, Jul. 20, 2012, 28 pages, Doc 1109.
U.S. Appl. No. 13/229,624 / Office Action, dated Oct. 2, 2013, 38 pages, Doc 1110.
U.S. Appl. No. 13/229,624 / Response to Office Action, dated Dec. 27, 2013, 13 pages, Doc 1111.
U.S. Appl. No. 13/229,624 / Office Action, dated Apr. 4, 2014, 9 pages, Doc 1112.
U.S. Appl. No. 13/229,624 / Response to Office Action, dated Aug. 1, 2014, 11 pages, Doc 1113.
U.S. Appl. No. 13/229,624 / Final Office Action, dated Oct. 30, 2014, 9 pages, Doc 1114.
U.S. Appl. No. 13/229,624 / Response to Final Office Action, dated Jan. 30, 2015, 13 pages, Doc 1115
U.S. Appl. No. 13/229,624 / Advisory Action, dated Mar. 11, 2015, 3 pages, Doc 1116.
U.S. Appl. No. 13/229,624 / Interview Summary, dated Mar. 19, 2015, 3 pages, Doc 1117.
U.S. Appl. No. 13/229,624 / Interview Summary, dated Mar. 27, 2015, 4 pages, Doc 1118.
U.S. Appl. No. 13/229,624 / Response to Advisory Action & Final Office Action, dated Mar. 27, 2015, 18 pages, Doc 1119.
U.S. Appl. No. 13/229,624 / Advisory Action, dated Apr. 15, 2015, 6 pages, Doc 1120.
U.S. Appl. No. 13/229,624 / RCE Amendment, dated Apr. 27, 2015, 19 pages, Doc 1121.
U.S. Appl. No. 13/229,624 / Notice of Allowance, dated Jul. 6, 2015, 10 pages, Doc 1122.
U.S. Appl. No. 13/229,624 / Issue Fee, Sep. 28, 2015, 6 pages, Doc 1123.
U.S. Appl. No. 13/229,624 / Issue Notification, dated Oct. 14, 2015, 1 page, Doc 1124.
U.S. Appl. No. 14/870,744 / Application, Sep. 30, 2015, 131 pages, Doc 1125.
U.S. Appl. No. 14/870,744 / Preliminary Amendment, dated Oct. 6, 2015, 12 pages, Doc 1128.
U.S. Appl. No. 14/870,744 / Filing Receipts Notice to File Missing Parts, Oct. 16, 2015, 5 pages, Doc 1126.
U.S. Appl. No. 14/870,744 / Response to Notice to File Missing Parts, dated Feb. 19, 2016, 6 pages, Doc 1129.
U.S. Appl. No. 14/870,744 / Updated Filing Receipts Informational Notice, Mar. 2, 2016, 4 pages, Doc 1130.
U.S. Appl. No. 14/870,744 / Notice of Publication, dated Jun. 9, 2016, 1 page, Doc 1127.
U.S. Appl. No. 14/870,744 / Response to Informational Notice, dated Jun. 22, 2016, 5 pages, Doc 1131.
U.S. Appl. No. 14/870,744 / Office Action, dated Aug. 24, 2017, 58 pages, Doc 1132.
U.S. Appl. No. 14/870,744 / Response to Office Action, dated Nov. 24, 2017, 32 pages, Doc 1133.
U.S. Appl. No. 14/870,744 / Final Office Action, dated Mar. 30, 2018, 30 pages, Doc 1134.
U.S. Appl. No. 14/870,744 / Response to Final Office Action, dated May 30, 2018, 35 pages, Doc 1135.
U.S. Appl. No. 14/870,744 / Advisory Action, dated Jul. 3, 2018, 7 pages, Doc 1136.
U.S. Appl. No. 14/870,744 / RCE Amendment, Jul. 27, 2018, 35 pages, Doc 1137.
U.S. Appl. No. 14/870,744 / Notice of Allowance, dated Sep. 6, 2018, 11 pages, Doc 1138
U.S. Appl. No. 14/870,744 / Issue Fee, Dec. 4, 2018, 21 pages, Doc 1139.
U.S. Appl. No. 14/870,744 / Interview Summary, dated Mar. 8, 2019, 2 pages, Doc 1140.
U.S. Appl. No. 14/870,744 / Issue Notification, dated Mar. 20, 2019, 1 page, Doc 1141.
U.S. Appl. No. 16/209,872 / Application, Dec. 4, 2018, 134 pages, Doc 1142.
U.S. Appl. No. 16/209,872 / Filing Receipt & Notice to File Missing Parts, Dec. 28, 2018, 5 pages, Doc 1143.
U.S. Appl. No. 16/209,872 / Preliminary Amendment and Response to Notice to File Missing Parts, dated Feb. 21, 2019, 20 pages, Doc 1145.
U.S. Appl. No. 16/209,872 / Update Filing Receipt, Feb. 26, 2019, 3 pages, Doc 1146.
U.S. Appl. No. 16/209,872 / Notice of Publication, dated Jun. 6, 2019, 1 page, Doc 1144.
U.S. Appl. No. 16/209,872 / Office Action, dated Sep. 17, 2020, 63 pages, Doc 2155.
U.S. Appl. No. 16/209,872 / Response to Office Action, dated Sep. 17, 2020, 63 pages, Doc 2156.
U.S. Appl. No. 16/209,872 / Terminal Disclaimer, Sep. 17, 2020, 6 pages, Doc 2157.
U.S. Appl. No. 16/209,872 / Notice of Allowance and Allowability dated Mar. 26, 2021, 17 pages, Doc 2171.
U.S. Appl. No. 16/209,872 / Amendment After filed Apr. 30, 2021, 11 pages, Doc 2245.
U.S. Appl. No. 16/209,872 / Response to 312 Amendment dated Jun. 10, 2021, 4 pages, Doc2297.
U.S. Appl. No. 16/209,872 / Request for Continued Examination and Amendment filed Jun. 25, 2021, 17 pages, Doc 2299.
U.S. Appl. No. 16/820,457 / Application and Preliminary Amendment filed Mar. 16, 2020, 148 pages, Doc 1147.
U.S. Appl. No. 16/820,457 / Filing Receipt, Mar. 31, 2020, 3 pages, Doc 1148.
U.S. Appl. No. 16/820,457 / Notice of Publication, dated Jul. 9, 2020, 1 page, Doc 1149.
U.S. Appl. No. 17/158,804 / Patent Application filed Jan. 26, 2021, 146 pages, Doc 2158.
U.S. Appl. No. 17/158,804 / Filing Receipt dated Feb. 9, 2021, 5 pages, Doc 2172.
U.S. Appl. No. 17/158,804 / Notice of Publication dated Feb. 9, 2021, 1 page, Doc 2246.
U.S. Appl. No. 11/007,139 / Application filed Dec. 7, 2004, 90 pages, Doc 1152.
U.S. Appl. No. 11/007,139 / Notice to File Missing Parts dated Jan. 19, 2005, 2 pages, Doc 1153.
U.S. Appl. No. 11/007,139 / Response to Notice to File Missing Parts dated Mar. 29, 2005, 9 pages, Doc 1154.
U.S. Appl. No. 11/007,139 / Preliminary Amendment dated Apr. 28, 2005, 146 pages, Doc 1155.
U.S. Appl. No. 11/007,139 / Office Action, dated May 14, 2007, 2 pages, Doc 1156.
U.S. Appl. No. 11/007,139 / Response to Office Action dated Oct. 15, 2007, 29 pages, Doc 1157.
U.S. Appl. No. 11/007,139 / Supplemental Amendment dated Oct. 17, 2007, 6 pages, Doc 1158.
U.S. Appl. No. 11/007,139 / Office Action dated Jan. 2, 2008, 15 pages, Doc 1159.

(56) References Cited

OTHER PUBLICATIONS

U.S. Appl. No. 11/007,139 / Response to Office Action dated Apr. 2, 2008, 29 pages, Doc 1160.
U.S. Appl. No. 11/007,139 / Final Office Action dated Aug. 15, 2008, 22 pages, Doc 1161.
U.S. Appl. No. 11/007,139 / Response to Final Office Action dated Oct. 15, 2008, 25 pages, Doc 1162.
U.S. Appl. No. 11/007,139 / Advisory Action dated Oct. 22, 2008, 3 pages, Doc 1163.
U.S. Appl. No. 11/007,139 / RCE Amendment dated Nov. 14, 2008, 29 pages, Doc 1164.
U.S. Appl. No. 11/007,139 / Office Action, dated Dec. 8, 2008, 17 pages, Doc 1165.
U.S. Appl. No. 11/007,139 / Response to Office Action dated May 8, 2009, 28 pages, Doc 1166.
U.S. Appl. No. 11/007,139 / Final Office Action dated Aug. 4, 2009, 18 pages, Doc 1167.
U.S. Appl. No. 11/007,139 / Response to Final Office Action dated Dec. 4, 2009, 25 pages, Doc 1168.
U.S. Appl. No. 11/007,139 / Advisory Action dated Dec. 14, 2009, 3 pages, Doc 1169.
U.S. Appl. No. 11/007,139 / RCE Amendment dated Jan. 4, 2010, 3 pages, Doc 1170
U.S. Appl. No. 11/007,139 / Office Action dated Jan. 27, 2010, 31 pages, Doc 1171.
U.S. Appl. No. 11/007,139 / Response to Office Action dated Apr. 27, 2010, 30 pages, Doc 1172.
U.S. Appl. No. 11/007,139 / Final Office Action dated Jul. 20, 2010, 22 pages, Doc 1173.
U.S. Appl. No. 11/007,139 / Response to Final Office Action dated Oct. 20, 2010, 35 pages, Doc 1174.
U.S. Appl. No. 11/007,139 / Advisory Action dated Oct. 25, 2010, 2 pages, Doc 1175.
U.S. Appl. No. 11/007,139 / Response to Final Office Action and Advisory Action dated Nov. 18, 2010, 26 pages, Doc 1176.
U.S. Appl. No. 11/007,139 / Advisory Action dated Dec. 1, 2010, 4 pages, Doc 1177.
U.S. Appl. No. 11/007,139 / Notice of Appeal dated Dec. 20, 2010, 3 pages, Doc 1178.
U.S. Appl. No. 11/007,139 / Response to Final Office Action and Advisory Action, dated Dec. 20, 2010, 30 pages, Doc 1179.
U.S. Appl. No. 11/007,139 / Office Action dated Jan. 3, 2011, 24 pages, Doc 1180.
U.S. Appl. No. 11/007,139 / Response to Office Action dated May 3, 2011, 29 pages, Doc 1181.
U.S. Appl. No. 11/007,139 / Final Office Action dated Jul. 18, 2011, 23 pages, Doc 1182.
U.S. Appl. No. 11/007,139 / Response to Final Office Action dated Oct. 18, 2011, 32 pages, Doc 1183.
U.S. Appl. No. 11/007,139 / Advisory Office Action dated Nov. 4, 2011, 12 pages, Doc 1184.
U.S. Appl. No. 11/007,139 / Notice of Appeal dated Nov. 16, 2011, 4 pages, Doc 1185.
U.S. Appl. No. 11/007,139 / Appeal Brief dated May 1, 2012, 91 pages, Doc 1186.
U.S. Appl. No. 11/007,139 / Notice of Non-Compliant Appeal Brief dated May 7, 2012, 3 pages, Doc 1187.
U.S. Appl. No. 11/007,139 / Response to Notice of Non-Compliant Appeal Brief dated May 15, 2012, 9 pages, Doc 1188.
U.S. Appl. No. 11/007,139 / Examiner's Answer dated Aug. 20, 2012, 35 pages, Doc 1189.
U.S. Appl. No. 11/007,139 / Reply Brief dated Oct. 22, 2012, 29 pages, Doc 1190.
U.S. Appl. No. 11/007,139 / Patent Trial and Appeal Board Docketing Notice dated Nov. 6, 2012, 2 pages, Doc 1191.
U.S. Appl. No. 11/007,139 / Decision on Appeal dated Jul. 24, 2015, 8 pages, Doc 1192.
U.S. Appl. No. 11/007,139 / RCE and Amendment dated Aug. 19, 2015, 21 pages, Doc 1193.
U.S. Appl. No. 11/007,139 / Office Action dated Dec. 31, 2015, 24 pages, Doc 1194.
U.S. Appl. No. 11/007,139 / Response to Office Action dated Mar. 28, 2016, 21 pages, Doc 1195.
U.S. Appl. No. 11/007,139 / Final Office Action dated Jun. 20, 2016, 13 pages, Doc 1196.
U.S. Appl. No. 11/007,139 / Response to Final Office Action dated Jul. 29, 2016, 19 pages, Doc 1197.
U.S. Appl. No. 11/007,139 / Notice of Allowance dated Aug. 23, 2016, 12 pages, Doc 1198.
U.S. Appl. No. 11/007,139 / Corrected Filing Receipt, Sep. 2, 2016, 3 pages, Doc 1199.
U.S. Appl. No. 11/007,139 / Application Data Sheet dated Oct. 24, 2016, 10 pages, Doc 1200.
U.S. Appl. No. 11/007,139 / Notice of Allowance dated Dec. 29, 2016, 14 pages, Doc 1201.
U.S. Appl. No. 11/007,139 / Issue Fee dated Mar. 23, 2017, 6 pages, Doc 1202.
U.S. Appl. No. 11/007,139 / Issue Notification dated Apr. 19, 2017, 1 page, Doc 1203.
U.S. Appl. No. 15/043,267 / Application dated Feb. 12, 2016, 104 pages, Doc 1204.
U.S. Appl. No. 15/043,267 / Filing Receipt dated Mar. 7, 2016, 3 pages, Doc 1205.
U.S. Appl. No. 15/043,267 / Informational Notice dated Mar. 7, 2016, 1 page, Doc 1206.
U.S. Appl. No. 15/043,267 / Request to Submit Priority Claim and Preliminary Amendment dated Jun. 10, 2016, 11 pages, Doc 1208.
U.S. Appl. No. 15/043,267 / Response to Informational Notice dated Oct. 14, 2016, 5 pages, Doc 1209.
U.S. Appl. No. 15/043,267 / Corrected Filing Receipt dated Oct. 25, 2016, 3 pages, Doc 1211.
U.S. Appl. No. 15/043,267 / Notice of Publication dated Feb. 2, 2017, 1 page, Doc 1207.
U.S. Appl. No. 15/043,267 / Office Action dated Apr. 2, 2019, 80 pages, Doc 1210.
U.S. Appl. No. 15/043,267 / Response to Office Action dated Jul. 2, 2019, 24 pages, Doc 1212.
U.S. Appl. No. 15/043,267 / Final Office Action dated Oct. 18, 2019, 14 pages, Doc 1213.
U.S. Appl. No. 15/043,267 / Response to Final Office Action dated Jan. 21, 2020, 20 pages, Doc 1214.
U.S. Appl. No. 15/043,267 / Advisory Action dated Jan. 29, 2020, 12 pages, Doc 1215
U.S. Appl. No. 15/043,267 / RCE Amendment dated Mar. 3, 2020, 21 pages, Doc 1216.
U.S. Appl. No. 15/043,267 / Notice of Allowance dated Mar. 23, 2020, 9 pages, Doc 1217.
U.S. Appl. No. 15/043,267 / Issue Fee Payment, dated Jun. 23, 2020, 18 pages, Doc 1218.
U.S. Appl. No. 15/043,267 / Issue Notification dated Jul. 15, 2020, 1 page, Doc 1219.
U.S. Appl. No. 16/911,282 / Application filed Jun. 24, 2020, 98 pages, Doc 1220.
U.S. Appl. No. 16/911,282 / Filing Receipt and Notice to File Missing Parts dated Jul. 7, 2020, 7 pages, Doc 1221.
U.S. Appl. No. 16/911,282 / Preliminary Amendment and Response to Notice to File Missing Parts filed Sep. 8, 2020, 18 pages, Doc 2145.
U.S. Appl. No. 16/911,282 / Updated Filing Receipt dated Sep. 10, 2020, 5 pages, Doc 2146.
U.S. Appl. No. 16/911,282 / Notice of Publication dated Dec. 17, 2020, 1 page, Doc 2159.
U.S. Appl. No. 11/006,320 / Application filed Dec. 6, 2004, 75 pages, Doc 1223.
U.S. Appl. No. 11/006,320 / Notice to File Missing Parts dated Feb. 7, 2005, 2 pages, Doc 1224.
U.S. Appl. No. 11/006,320 / Response to Notice to File Missing Parts dated May 6, 2005, 140 pages, Doc 1225.
U.S. Appl. No. 11/006,320 / Notice of Publication dated Jan. 19, 2006, 1 page, Doc 1226.
U.S. Appl. No. 11/006,320 / Restriction Requirement dated Mar. 26, 2007, 6 pages, Doc 1227.

(56) References Cited

OTHER PUBLICATIONS

U.S. Appl. No. 11/006,320 / Response to Restriction Requirement dated Apr. 27, 2007, 32 pages, Doc 1228.
U.S. Appl. No. 11/006,320 / Notice of Non-Compliant Amendment dated Jul. 6, 2007, 3 pages, Doc 1229.
U.S. Appl. No. 11/006,320 / Response to Notice of Non-Compliant Amendment dated Jul. 25, 2007, 32 pages, Doc 1230.
U.S. Appl. No. 11/006,320 / Office Action dated Oct. 1, 2007, 19 pages, Doc 1231.
U.S. Appl. No. 11/006,320 / Response to Office Action dated Jan. 29, 2008, 42 pages, Doc 1232.
U.S. Appl. No. 11/006,320 / Notice of Non-Compliant Amendment dated Apr. 8, 2008, 4 pages, Doc 1233.
U.S. Appl. No. 11/006,320 / Response to Notice of Non-Compliant Amendment dated May 5, 2008, 43 pages, Doc 1234.
U.S. Appl. No. 11/006,320 / Office Action dated Aug. 15, 2008, 28 pages, Doc 1235.
U.S. Appl. No. 11/006,320 / Response to Office Action dated Nov. 14, 2008, 39 pages, Doc 1236.
U.S. Appl. No. 11/006,320 / Office Communication dated Jan. 27, 2009, 2 pages, Doc 1237.
U.S. Appl. No. 11/006,320 / Response to Office Communication dated Apr. 27, 2009, 43 pages, Doc 1238.
U.S. Appl. No. 11/006,320 / Final Office Action dated Jul. 29, 2009, 7 pages, Doc 1239.
U.S. Appl. No. 11/006,320 / Response to Final Office Action dated Nov. 30, 2009, 8 pages, Doc 1240.
U.S. Appl. No. 11/006,320 / Office Action, dated Dec. 4, 2009, 12 pages, Doc 1241.
U.S. Appl. No. 11/006,320 / Response to Office Action filed Feb. 23, 2010, 11 pages, Doc 1242.
U.S. Appl. No. 11/006,320 / Response to Final Office Action dated May 24, 2010, 11 pages, Doc 1243.
U.S. Appl. No. 11/006,320 / Response to Final Office Action filed Aug. 24, 2010, 17 pages, Doc 1244.
U.S. Appl. No. 11/006,320 / Notice of Allowance dated Sep. 17, 2010, 18 pages, Doc 1245.
U.S. Appl. No. 11/006,320 / Issue Fee dated Dec. 17, 2010, 12 pages, Doc 1246.
U.S. Appl. No. 11/006,320 / Issue Notification dated Jan. 12, 2011, 1 page, Doc 1247.
U.S. Appl. No. 12/972,326 / Application filed Dec. 17, 2010, 76 pages, Doc 2247.
U.S. Appl. No. 12/972,326 / Filing Receipt and Notice to File Missing Parts dated Jan. 6, 2011, 5 pages, Doc 2248.
U.S. Appl. No. 12/972,326 / Preliminary Amendment and Response to Notice to File Missing Parts dated Jan. 26, 2011, 16 pages, Doc 2249.
U.S. Appl. No. 12/972,326 / Preliminary Amendment filed May 20, 2011, 17 pages, Doc 2250.
U.S. Appl. No. 12/972,326 / Notice of Non-compliant Amendment dated Jun. 2, 2011, 2 pages, Doc 2251.
U.S. Appl. No. 12/972,326 / Notice of Publication dated Jun. 2, 2011, 1 page, Doc 2252.
U.S. Appl. No. 12/972,326 / Substitute Preliminary Amendment filed Jul. 5, 2011, 23 pages, Doc 2253.
U.S. Appl. No. 12/972,326 / Preliminary Amendment filed Aug. 10, 2011, 9 pages, Doc 2254.
U.S. Appl. No. 12/972,326 / Non-final Office Action dated Feb. 23, 2011, 9 pages, Doc 2255.
U.S. Appl. No. 12/972,326 / Advisory Action dated Jun. 26, 2012, 3 pages, Doc 2256.
U.S. Appl. No. 12/972,326 / Notice of Abandonment dated Sep, 18, 2012, 2 pages, Doc 2257
U.S. Appl. No. 11/006,848 / Application filed Dec. 7, 2004, 61 pages, Doc 1249.
U.S. Appl. No. 11/006,848 / Notice to File Missing Parts dated Mar. 18, 2005, 2 pages, Doc 1250.
U.S. Appl. No. 11/006,848 / Response to Notice to File Missing Parts dated Apr. 28, 2005, 101 pages, Doc 1251.
U.S. Appl. No. 11/006,848 / Office Action dated Apr. 4, 2007, 38 pages, Doc 1252.
U.S. Appl. No. 11/006,848 / Response to Office Action filed Oct. 3, 2007, 22 pages, Doc 1253.
U.S. Appl. No. 11/006,848 / Supplemental Amendment filed Nov. 13, 2007, 6 pages, Doc 1254.
U.S. Appl. No. 11/006,848 / Office Action dated Feb. 5, 2008, 47 pages, Doc 1255.
U.S. Appl. No. 11/006,848 / Response to Office Action dated Aug. 4, 2008, 30 pages, Doc 1256.
U.S. Appl. No. 11/006,848 / Final Office Action dated Dec. 2, 2008, 30 pages, Doc 1257.
U.S. Appl. No. 11/006,848 / RCE and Amendment filed May 4, 2009, 26 pages, Doc 1258.
U.S. Appl. No. 11/006,848 / Notice of Allowance dated Jun. 11, 2009, 8 pages, Doc 1259.
U.S. Appl. No. 11/006,848 / Issue Fee Payment filed Sep. 11, 2009, 16 pages, Doc 1260.
U.S. Appl. No. 11/006,848 / Issue Notification dated Sep. 11, 2009, 1 page, Doc 1261.
U.S. Appl. No. 11/006,848 / Request to Correct Inventorship and for a Certificate of Correction filed Sep. 12, 2016, 14 pages, Doc 1262.
U.S. Appl. No. 11/006,848 / Certificate of Correction dated Aug. 8, 2017, 1 page, Doc 1263.
U.S. Appl. No. 12/573,829 / Patent Application filed Oct. 5, 2009, 67 pages, Doc 1264.
U.S. Appl. No. 12/573,829 / Notice to File Missing Parts Oct. 20, 2009, 2 pages, Doc 1265.
U.S. Appl. No. 12/573,829 / Filing Receipt Oct. 20, 2009, 3 pages, Doc 1266.
U.S. Appl. No. 12/573,829 / Preliminary Amendment filed Dec. 21, 2009, 17 pages, Doc 1267.
U.S. Appl. No. 12/573,829 / Filing Receipt Jan. 4, 2010, 3 pages, Doc 1268.
U.S. Appl. No. 12/573,829 / Notice of Publication dated Apr. 15, 2020, 1 page, Doc 1269.
U.S. Appl. No. 12/573,829 / Non-Final Rejection dated Jun. 28, 2010, 49 pages, Doc 1271
U.S. Appl. No. 12/573,829 / Amendment/Requestfor Reconsideration After Non-Final Rejection filed Sep. 28, 2010, 25 pages, Doc 1273.
U.S. Appl. No. 12/573,829 / Final Office Action dated Nov. 1, 2010, 53 pages, Doc 1274.
U.S. Appl. No. 12/573,829 / Response After Final Action filed Jan. 3, 2011, 32 pages, Doc 1275.
U.S. Appl. No. 12/573,829 / Advisory Action Jan. 7, 2011, 3 pages, Doc 1276.
U.S. Appl. No. 12/573,829 / Notice of Appeal filed Jan. 11, 2011, 5 pages, Doc 1277.
U.S. Appl. No. 12/573,829 / Appeal Brief filed May 4, 2011, 72 pages, Doc 1278.
U.S. Appl. No. 12/573,829 / Examiner's Answer to Appeal Brief, 31 pages, Doc 1279.
U.S. Appl. No. 12/573,829 / Reply Brief filed Sep. 21, 2011, 19 pages, Doc 1280.
U.S. Appl. No. 12/573,829 / Reply Brief Noted- Patent Board Oct. 5, 2011, 2 pages, Doc 1281.
U.S. Appl. No. 12/573,829 / Appeal Docketing Notice Oct. 11, 2011, 2 pages, Doc 1282.
U.S. Appl. No. 12/573,829 / Patent Board Decision—Examiner Affirmed May 9, 2014, 10 pages, Doc 1284.
U.S. Appl. No. 12/573,829 / Request for Continued Examination filed Jul. 9, 2014, 25 pages, Doc 1285.
U.S. Appl. No. 12/573,829 / Non-Final Office Action dated Apr. 28, 2015, 52 pages, Doc 1288.
U.S. Appl. No. 12/573,829 / Request for Consideration after Non-Final Rejection filed Jul. 27, 2015, 24 pages, Doc 1289.
U.S. Appl. No. 12/573,829 / Final Rejection dated Sep. 15, 2015, 24 pages, Doc 1291.
U.S. Appl. No. 12/573,829 / Response After Final Action filed Nov. 16, 2015, 21 pages, Doc 1293.
U.S. Appl. No. 12/573,829 / Advisory Action dated Dec. 2, 2015, 4 pages, Doc 1294.

(56) References Cited

OTHER PUBLICATIONS

U.S. Appl. No. 12/573,829 / Request for Continued Examination filed Dec. 14, 2015, 24 pages, Doc 1295.
U.S. Appl. No. 12/573,829 / Non-Final Rejection dated Jun. 13, 2016, 25 pages, Doc 1297.
U.S. Appl. No. 12/573,829 / Request for Corrected Filing Receipt to Correct Inventorship filed Sep. 13, 2016, 30 pages, Doc 1298.
U.S. Appl. No. 12/573,829 / Updated Filing Receipt and Notice of Acceptance of Request to Correct Inventorship dated Sep. 15, 2016, 5 pages, Doc 1299.
U.S. Appl. No. 12/573,829 / Non-Final Rejection dated Dec. 16, 2016, 21 pages, Doc 1300.
U.S. Appl. No. 12/573,829 / Request for Reconsideration After NonFinal Request filed 3/16/2017, 21 pages, Doc 1301
U.S. Appl. No. 12/573,829 / Final Rejection dated May 2, 2017, 24 pages, Doc 1303.
U.S. Appl. No. 12/573,829 / Response After Final Action filed Jul. 5, 2017, 23 pages, Doc 1304.
U.S. Appl. No. 12/573,829 / Advisory Action, Applicant Initiated Review Summary, Amendment After Final Action, After Final Consideration Program Decision Aug. 29, 2017, 8 pages, Doc 1305.
U.S. Appl. No. 12/573,829 / Request for Continued Examination filed Sep. 5, 2017, 29 pages, Doc 1306.
U.S. Appl. No. 12/573,829 / Non-Final Rejection Dec. 27, 2017, 24 pages, Doc 1308.
U.S. Appl. No. 12/573,829 / Request for Reconsideration After Non-Final Rejection filed Mar. 27, 2018, 25 pages, Doc 1309.
U.S. Appl. No. 12/573,829 / Final Rejection dated Jul. 11, 2018, 26 pages, Doc 1311.
U.S. Appl. No. 12/573,829 / Request for Consideration After Final Consideration filed Sep. 7, 2018, 25 pages, Doc 1312.
U.S. Appl. No. 12/573,829 / Advisory Action dated Sep. 24, 2018, 6 pages, Doc 1314.
U.S. Appl. No. 12/573,829 / Request for Continued Examination filed Oct. 9, 2018, 25 pages, Doc 1315.
U.S. Appl. No. 12/573,829 / Notice of Allowance dated May 21, 2019, 32 pages, Doc 1318.
U.S. Appl. No. 12/573,829 / Issue Fee & Terminal Disclaimer filed Aug. 21, 2019, 12 pages, 1320.
U.S. Appl. No. 12/573,829 / Issue Notification dated Sep. 18, 2019, 1 page, Doc 1322.
U.S. Appl. No. 16/549,185 / Application filed Sep. 23, 2019, 73 pages, Doc 1323.
U.S. Appl. No. 16/549,185 / Filing Receipt and Notice to File Missing Parts Sep. 4, 2019, 6 pages, Doc 1324.
U.S. Appl. No. 16/549,185 / Response to Notice to File Missing Parts and Preliminary Amendment filed Sep. 5, 2019, 18 pages, Doc 2147.
U.S. Appl. No. 16/549,185 / Updated Filing Receipt Sep. 6, 2019, 4 pages, Doc 1326.
U.S. Appl. No. 16/549,185 / Notice of Publication dated Dec. 19, 2019, 1 page, Doc 1325.
U.S. Appl. No. 11/006,841 / Application filed Dec. 7, 2004, 67 pages, Doc 1329.
U.S. Appl. No. 11/006,841 / Pre-Exam Formalities Notice Jan. 10, 2005, 2 pages, Doc 1330.
U.S. Appl. No. 11/006,841 / Applicant Response to Pre-Exam Formalities Notice filed Apr. 14, 2005, 105 pages, Doc 1331.
U.S. Appl. No. 11/006,841 / Examiner's Search Strategies and Results dated Mar. 30, 2007, 14 pages, Doc 1332
U.S. Appl. No. 11/006,841 / Non-Final Rejection dated Apr. 6, 2007, 18 pages, Doc 1333.
U.S. Appl. No. 11/006,841 / Response to Non-Final Rejection filed Sep. 6, 2007, 67 pages, Doc 1334.
U.S. Appl. No. 11/006,841 / Requirement for Restriction/Election dated Nov. 27, 2007, 5 pages, Doc 1335.
U.S. Appl. No. 11/006,841 / Request for Reconsideration after Non-Final Rejection filed Dec. 27, 2007, 41 pages, Doc 1336.
U.S. Appl. No. 11/006,841 / Requirement for Restriction/Election dated Mar. 17, 2008, 9 pages, Doc 1337.
U.S. Appl. No. 11/006,841 / Response to Election/Restriction filed Jul. 17, 2008, 38 pages, Doc 1339.
U.S. Appl. No. 11/006,841 / Final Office Action dated Oct. 29, 2008, 79 pages, Doc 1340.
U.S. Appl. No. 11/006,841 / RCE and Amendment filed Dec. 29, 2008, 48 pages, Doc 1341.
U.S. Appl. No. 11/006,841 / Advisory Action dated Jan. 6, 2009, 3 pages, Doc 1342.
U.S. Appl. No. 11/006,841 / Request for Continued Examination filed Apr. 23, 2009, 54 pages, Doc 1343.
U.S. Appl. No. 11/006,841 / Information Disclosure Statement and Remarks in an Amendment filed Jun. 26, 2009, 43 pages, Doc 1345.
U.S. Appl. No. 11/006,841 / Notice of Allowance and Fees Due dated Jun. 29, 2009, 69 pages, Doc 1346.
U.S. Appl. No. 11/006,841 / Issue Fee Payment; Information Disclosure Statement; Amendment After Notice of Allowance filed Sep. 29, 2009, 17 pages, Doc 1350.
U.S. Appl. No. 11/006,841 / Miscellaneous Communication to Applicant dated Oct. 21, 2009, 5 pages, Doc 1351.
U.S. Appl. No. 11/006,841 / Issue Notification dated Nov. 11, 2009, 1 page, Doc 1352.
U.S. Appl. No. 12/578,411 / Application filed Oct. 13, 2009, 75 pages, Doc 1354.
U.S. Appl. No. 12/578,411 / Notice to File Missing Parts Oct. 28, 2009, 6 pages, Doc 1355.
U.S. Appl. No. 12/578,411 / Applicant Response to Pre-Exam Formalities Notice filed Dec. 28, 2009, 27 pages, Doc 1356.
U.S. Appl. No. 12/578,411 / Filing Receipt Jan. 7, 2010, 3 pages, Doc 1357.
U.S. Appl. No. 12/578,411 / Requirement for Restriction/Election dated Jun. 8, 2011, 6 pages, Doc 1358.
U.S. Appl. No. 12/578,411 / Response to Election/Restriction filed Jul. 6, 2011, 20 pages, Doc 1359.
U.S. Appl. No. 12/578,411 / Non-Final Rejection dated Aug. 23, 2011, 25 pages, Doc 1360.
U.S. Appl. No. 12/578,411 / Amendment After Non-Fina Rejection filed 1, 42 pages, Doc 1361
U.S. Appl. No. 12/578,411 / Search Results by Examiner dated Jan. 20, 2012, 57 pages, Doc 1363.
U.S. Appl. No. 12/578,411 / Applicant Amendment submitted/ Entered with Filing of CPA/RCE filed May 21, 2012, 28 pages, Doc 1364.
U.S. Appl. No. 12/578,411 / Refund Request filed May 24, 2012, 4 pages, Doc 1365.
U.S. Appl. No. 12/578,411 / Advisory Action dated May 31, 2012, 4 pages, Doc 1366.
U.S. Appl. No. 12/578,411 / Request for Continued Examination filed Jun. 12, 2012, 38 pages, Doc 1367.
U.S. Appl. No. 12/578,411 / Notice of Allowance and Fees Due, dated Aug. 19, 2012, 35 pages, Doc 1369.
U.S. Appl. No. 12/578,411 / Amendment After Notice of Allowance dated Nov. 14, 2013, 16 pages, Doc 1371.
U.S. Appl. No. 12/578,411 / Amendment After Final and Response to Amendment dated Nov. 19, 2013, 2 pages, Doc 1372.
U.S. Appl. No. 12/578,411 / Response to Amendment dated Dec. 3, 2013, 8 pages, Doc 1373.
U.S. Appl. No. 12/578,411 / Issue Notification dated Dec. 18, 2013, 1 page, Doc 1375.
U.S. Appl. No. 12/578,411 / Terminal Disclaimer Nov. 8, 2017, 7 pages, Doc 1376.
U.S. Appl. No. 14/086,837 / Application filed Nov. 21, 2013, 70 pages, Doc 2258.
U.S. Appl. No. 14/086,837 / Filing Receipt dated Dec. 12, 2013, 3 pages, Doc 2259.
U.S. Appl. No. 14/086,837 / Notice to File Missing Parts dated Dec. 12, 2013, 2 pages, Doc 2261.
U.S. Appl. No. 14/086,837 / Preliminary Amendment and Response to Notice to File Missing Parts filed Jun. 11, 2013, 28 pages, Doc 2262.
U.S. Appl. No. 14/086,837 / Notice of Publication dated Sep. 25, 2014, 1 page, Doc 2260.
U.S. Appl. No. 14/086,837 / Two Terminal Disclaimers filed Nov. 14, 2014, 4 pages, Doc 2263.

(56) References Cited

OTHER PUBLICATIONS

U.S. Appl. No. 14/086,837 / Notice of Allowance/Allowability dated Dec. 2, 2014, 19 pages, Doc 2264.
U.S. Appl. No. 14/086,837 / Issue Fee and 312 Amendment filed Feb. 27, 2015, 12 pages, Doc 2265.
U.S. Appl. No. 14/086,837 / Issue Notification dated May 6, 2015, 1 page, Doc 2266.
U.S. Appl. No. 14/635,836 / Application filed Mar. 2, 2015, 75 pages, Doc 2267.
U.S. Appl. No. 14/635,836 / Filing Receipt dated Mar. 12, 2015, 3 pages, Doc 2268.
U.S. Appl. No. 14/635,836 / Notice to File Missing Parts dated Mar. 12, 2015, 2 pages, Doc 2270.
U.S. Appl. No. 14/635,836 / Preliminary Amendment and Response to Notice to File Missing Parts filed May 12, 2015, 42 pages, Doc 2271.
U.S. Appl. No. 14/635,836 / Notice of Publication dated Aug. 27, 2015, 1 page, Doc 2269.
U.S. Appl. No. 14/635,836 / Terminal Disclaimer filed Nov. 13, 2015, 5 pages, Doc 2272.
U.S. Appl. No. 14/635,836 / Notice of Allowance/Allowability dated Apr. 18, 2016, 65 pages, Doc 2273.
U.S. Appl. No. 14/635,836 / ssue Fee and 312 Amendment filed Jul. 15, 2016, 17 pages, Doc 2274.
U.S. Appl. No. 14/635,836 / Issue Notification dated Aug. 16, 2016, 1 page, Doc 2275.
U.S. Appl. No. 15/250,118 / Application filed Aug. 29, 2016, 96 pages, Doc 2276.
U.S. Appl. No. 15/250,118 / Notice to File Corrected Application Papers dated Sep. 9, 2016, 2 pages, Doc 2277.
U.S. Appl. No. 15/250,118 / Filing Receipt dated Sep. 9, 2016, 3 pages, Doc 2278.
U.S. Appl. No. 15/250,1181 Response to Notice to File Corrected Application Papers and Revised Figures filed Nov. 8, 2016, 23 pages, Doc 2280.
U.S. Appl. No. 15/250,118 / Notice of Publication dated Feb. 23, 2017, 1 page, Doc 2279.
U.S. Appl. No. 15/250,118 / Non-final Office Action dated Jun. 15, 2017, 30 pages, Doc 2281.
U.S. Appl. No. 15/250,118 / Response to Non-final Office Action filed Sep. 14, 2017, 46 pages, Doc 2282.
U.S. Appl. No. 15/250,118 / Final Office Action dated Dec. 15, 2017, 69 pages, Doc 2283.
U.S. Appl. No. 15/250,118 / RCE and Amendment filed Dec. 15, 2017, 48 pages, Doc 2284.
U.S. Appl. No. 15/250,118 / Terminal Disclaimer filed Dec. 11, 2017, 6 pages, Doc 2285.
U.S. Appl. No. 15/250,118 / Notice of Allowance/Allowability filed Jan. 8, 2019, 41 pages, Doc 2286.
U.S. Appl. No. 15/250,118 / 312 Amendment filed Jan. 23, 2019, 20 pages, Doc 2287.
U.S. Appl. No. 15/250,118 / Issue Fee and 312 Amendment filed Apr. 5, 2019, 22 pages, Doc 2288.
U.S. Appl. No. 15/250,118 / Issue Notification dated Apr. 5, 2019, 1 page, Doc 2298.
U.S. Appl. No. 16/379,674 / Application Filed Apr. 9, 2019, 88 pages, Doc 2148.
U.S. Appl. No. 16/379,674 / Filing Receipt 4/24/2019, 4 pages, Doc 2149
U.S. Appl. No. 16/379,674 / Notice of Publication dated Aug. 1, 2019, 1 page, Doc 1016.
U.S. Appl. No. 16/379,674 / Office Action, dated Oct. 19, 2020, 69 pages, Doc 2151.
U.S. Appl. No. 16/379,674 / Response to Office Action filed Feb. 19, 2021, 21 pages, Doc 2173.
U.S. Appl. No. 16/379,674 / Final Office Action dated Apr. 5, 2021, 21 pages, Doc 2289.
U.S. Appl. No. 16/379,674 / Final Office Action dated Apr. 9, 2021, 21 pages, Doc 2301.

U.S. Appl. No. 16/379,674 / Request for Continued Examination, Amendment and Terminal Disclaimer filed Jul. 1, 2021, 25 pages, Doc 2302.
U.S. Appl. No. 11/006,440 / Application filed Dec. 6, 2004, 87 pages, Doc 1377.
U.S. Appl. No. 11/006,440 / Pre-Exam Formalities Notice Jan. 11, 2005, 2 pages, Doc 1378.
U.S. Appl. No. 11/006,440 / Preliminary Amendment filed May 2, 2005, 140 pages, Doc 1379.
U.S. Appl. No. 11/006,440 / Preliminary Amendment filed Oct. 10, 2006, 139 pages, Doc 1380.
U.S. Appl. No. 11/006,440 / Requirement for Restriction/Election Mar. 29, 2007, 5 pages, Doc 1381.
U.S. Appl. No. 11/006,440 / Response to Election/Restriction filed Apr. 30, 2007, 43 pages, Doc 1382.
U.S. Appl. No. 11/006,440 / Examiner's Search Strategies and Results Jun. 19, 2007, 5 pages, Doc 1383.
U.S. Appl. No. 11/006,440 / Non-Final Rejection Jun. 21, 2007, 21 pages, Doc 1384.
U.S. Appl. No. 11/006,4401 Request for Reconsideration After Non-Final Rejection filed Nov. 20, 2007, 47 pages 1385.
U.S. Appl. No. 11/006,440 / Examiner's Search Strategies and Results, Feb. 1, 2008, 11 pages, Doc 1386.
U.S. Appl. No. 11/006,440 / Final Rejection dated Feb. 6, 2008, 18 pages, Doc 1387.
U.S. Appl. No. 11/006,440 / Response After Final Action dated Apr. 7, 2008, 37 pages, Doc 1388.
U.S. Appl. No. 11/006,440 / Notice of Appeal filed Aug. 4, 2008, 6 pages, Doc 1390.
U.S. Appl. No. 11/006,440 / Request for Continued Examination filed Nov. 4, 2008, 43 pages, Doc 1391.
U.S. Appl. No. 11/006,440/Attorney Ref. No. 151.P006: Non-Final Rejection Jan. 23, 2009, 69 pages, Doc 1392.
U.S. Appl. No. 11/006,440 / Request for Reconsideration After Non-Final Rejection filed Apr. 23, 2009, 36 pages, Doc 1393.
U.S. Appl. No. 11/006,440 / Supplemental Response or Supplemental Amendment filed Jul. 17, 2009, 31 pages, Doc 1394.
U.S. Appl. No. 11/006,440 / Notice of Allowance and Fees Due dated Jul. 31, 2009, 58 pages, Doc 1395.
U.S. Appl. No. 11/006,440 / Amendment After Notice of Allowance and Issue Fee Payment filed Nov. 2, 2009, 14 pages, Doc 1402.
U.S. Appl. No. 11/006,440 / Issue Notification dated Dec. 2, 2009, 1 page, Doc 1405.
U.S. Appl. No. 12/627,816 / Claims Worksheet filed Nov. 24, 2009, 1 page, Doc 1406.
U.S. Appl. No. 12/627,816 / Preliminary Amendment, Application and Declaration filed Nov. 30, 2009, 94 pages, Doc 1407.
U.S. Appl. No. 12/627,816 / Notice to File Missing Parts, Dec. 15, 2009, 5 pages, Doc 1408.
U.S. Appl. No. 12/627,816 / Applicant Response to Pre-Exam Formalities Notice filed Apr. 12, 2010, 25 pages, Doc 1409.
U.S. Appl. No. 12/627,816 / Filing Receipt Apr. 20, 2010, 3 pages, Doc 1410.
U.S. Appl. No. 12/627,816 / Notice of Publication Jul. 29, 2010, 1 page, Doc 1411.
U.S. Appl. No. 12/627,816 / Non-Final Rejection May 5, 2011, 94 pages, Doc 1412.
U.S. Appl. No. 12/627,816 / Response to Final Office Action filed Nov. 7, 2011, 17 pages, Doc 1413.
U.S. Appl. No. 12/627,816 / Final Rejection dated Nov. 17, 2011, 21 pages, Doc 1414.
U.S. Appl. No. 12/627,816 / Terminal Disclaimer Review Decision Feb. 7, 2012, 1 page, Doc 1416.
U.S. Appl. No. 12/627,816 / Request for Continued Examination filed Feb. 17, 2012, 21 pages, Doc 1415.
U.S. Appl. No. 12/627,816 / Notice of Allowance and Fees Due Aug. 1, 2013, 51 pages, Doc 1417.
U.S. Appl. No. 12/627,816 / Issue Fee Payment and Amendment After Notice of Allowance dated Nov. 1, 2013, 16 pages, Doc 1420.
U.S. Appl. No. 12/627,816 / Miscellaneous Communication to Applicant dated Nov. 5, 2013, 4 pages, Doc 1421.
U.S. Appl. No. 12/627,816 / Amendment After Final Initialed by Examiner dated Nov. 9, 2013, 2 pages, Doc 1422.

(56) References Cited

OTHER PUBLICATIONS

U.S. Appl. No. 12/627,816 / Response to Amendment Under Rule 312 dated Nov. 12, 2013, 3 pages, Doc 1423.
U.S. Appl. No. 12/627,816 / Issue Notification dated Nov. 26, 2013, 1 page, Doc 1425.
U.S. Appl. No. 14/086,808 / Application filed Nov. 21, 2013, 89 pages, Doc 1428.
U.S. Appl. No. 14/086,808 / Notice to File Missing Parts dated Dec. 11, 2013, 6 pages, Doc 1429
U.S. Appl. No. 14/086,808 / Applicant Response to Pre-Exam Formalities Notice and Declaration and Preliminary Amendment filed Jun. 11, 2014, 71 pages, Doc 1430.
U.S. Appl. No. 14/086,808 / Filing Receipt Jun. 17, 2014, 4 pages, Doc 1431.
U.S. Appl. No. 14/086,808 / Notice of Publication dated Sep. 25, 2014, 1 page, Doc 1432.
U.S. Appl. No. 14/086,808 / Terminal Disclaimer filed Oct. 24, 2014, 6 page, Doc 1433.
U.S. Appl. No. 14/086,808 / Terminal Disclaimer Review Decision Oct. 29, 2014, 1 page, Doc 1434.
U.S. Appl. No. 14/086,808 / Terminal Disclaimer and Power of Attorney filed Nov. 4, 2014, 6 pages, Doc 1435.
U.S. Appl. No. 14/086,808 / Terminal Disclaimer Review Decision Nov. 13, 2014, 1 page, Doc 1437.
U.S. Appl. No. 14/086,808 / Notice of Allowance and Fees Due dated Nov. 17, 2014, 68 pages, Doc 1438.
U.S. Appl. No. 14/086,808 / Amendment After Notice of Allowance and Issue Fee Payment dated Feb. 17, 2015, 25 pages, Doc 1439.
U.S. Appl. No. 14/086,808 / Response to Amendment under Rule 312 and Miscellaneous Communication to Applicant dated Feb. 20, 2015, 2 pages, Doc 1440.
U.S. Appl. No. 14/086,808 / Amendment After Final, Initialed by Examiner and Response to Amendment Under Rule 312 Feb. 25, 2015, 10 pages, Doc 1441.
U.S. Appl. No. 14/086,808 / Issue Notification dated Mar. 18, 2015, 1 page, Doc 1443.
U.S. Appl. No. 14/625,473 / Application, Declaration and Power of Attorney filed Feb. 18, 2015, 97 pages, Doc 1444.
U.S. Appl. No. 14/625,473 / Notice to File Missing Parts Mar. 18, 2015, 6 pages, Doc 1445.
U.S. Appl. No. 14/625,473 / Applicant Response to Pre-Exam Formalities Notice and Applicant Arguments/ Remarks Made in an Amendment filed May 18, 2015, 33 pages, Doc 1446.
U.S. Appl. No. 14/625,473 / Filing Receipt May 20, 2015, 4 pages, Doc 1447.
U.S. Appl. No. 14/625,473 / Notice of Publication dated Aug. 27, 2015, 1 page, Doc 1448.
U.S. Appl. No. 14/625,473 / Terminal Disclaimer filed Nov. 13, 2015, 7 pages, Doc 1449.
U.S. Appl. No. 14/625,473 / Notice of Allowance and Fees Due and List of References Cited by Applicant and Considered by Examiner Mar. 28, 2018, 91 pages, Doc 1450.
U.S. Appl. No. 14/625,473 / Amendment After Notice of Allowance and Issue Fee Paid filed Jun. 28, 2016, 28 pages, Doc 1453
U.S. Appl. No. 14/625,473 / Response to Amendment Under Rule 312 dated Jun. 30, 2016, 1 page, Doc 1454.
U.S. Appl. No. 14/625,473 / Response to Amendment Under Rule 312 dated Jul. 6, 2016, 3 pages, Doc 1455.
U.S. Appl. No. 14/625,473 / Issue Notification dated Jul. 20, 2016, 1 page, Doc 1457.
U.S. Appl. No. 15/214,168 / Application, Declaration and Preliminary Amendment filed Jul. 19, 2016, 124 pages, Doc 1458.
U.S. Appl. No. 15/214,168 / Filing Receipt and Response Re: Informal Power of Attorney Aug. 3, 2016, 6 pages, Doc 1459.
U.S. Appl. No. 15/214,168 / Request for Corrected Filing Receipt and Power of Attorney filed Oct. 7, 2016, 14 pages, Doc 1462.
U.S. Appl. No. 15/214,168 / Filing Receipt Oct. 12, 2016, 5 pages, Doc 1463.
U.S. Appl. No. 15/214,168 / Notice of Publication dated Nov. 10, 2016, 1 page, Doc 1464.
U.S. Appl. No. 15/214,168 / Non-Final Rejection dated Mar. 2, 2017, 38 pages, Doc 1465.
U.S. Appl. No. 15/214,168 / Amendment / Request for Reconsideration After Non-Final Rejection filed Jun. 2, 2017, 42 pages, Doc 1466.
U.S. Appl. No. 15/214,168 / Terminal Disclaimer filed Jul. 17, 2017, 8 pages, Doc 1467.
U.S. Appl. No. 15/214,168 / Notice of Allowance and Fees Due dated Aug. 1, 2017, 124 pages, Doc 1468.
U.S. Appl. No. 15/214,168 / Amendment After Notice of Allowance and Issue Fee Payment filed Nov. 1, 2017, 27 pages, Doc 1469.
U.S. Appl. No. 15/214,168 / Miscellaneous Communication to Applicant and Amendment After Final or Under 37CFR 1.312, Initialed by Examiner dated Nov. 6, 2017, 5 pages, Doc 1470.
U.S. Appl. No. 15/214,168 / Issue Notification dated Nov. 21, 2017, 1 page, Doc 1472.
U.S. Appl. No. 16/710,577 / US Reissue Patent Application and Preliminary Amendment filed Dec. 11, 2019, 88 pages, Doc 1017.
U.S. Appl. No. 16/710,577 / Filing Receipt dated Jan. 10, 2020, 4 pages, Doc 1018.
U.S. Appl. No. 16/710,577 / Non-final Office Action dated Mar. 19, 2021, 11 pages, Doc 2174.
U.S. Appl. No. 15/802,348 / Application, Preliminary Amendment and Declaration filed Nov. 2, 2017, 134 pages, Doc 1475.
U.S. Appl. No. 15/802,348 / Notice to File Corrected Application Papers Nov. 30, 2017, 7 pages, Doc 1476.
U.S. Appl. No. 15/802,348 / Applicant Response to Pre-Exam Formalities Notice filed Jan. 9, 2018, 19 pages, Doc 1477.
U.S. Appl. No. 15/802,348 / Filing Receipt Jan. 11, 2018, 5 pages, Doc 1478.
U.S. Appl. No. 15/802,348 / Notice of Publication dated Apr. 19, 2018, 1 page, Doc 1479.
U.S. Appl. No. 15/802,348 / Preliminary Amendment filed Oct. 26, 2018, 27 pages, Doc 1480.
U.S. Appl. No. 15/802,348 / Non-Final Rejection dated Feb. 11, 2019, 174 pages, Doc 1481.
U.S. Appl. No. 15/802,348 / Amendment / Request for Reconsideration After Non-Final Rejection filed May 13, 2019, 25 pages, Doc 1482.
U.S. Appl. No. 15/802,348 / Final Office Action dated Jul. 9, 2019, 24 pages, Doc 1019.
U.S. Appl. No. 15/802,348 / Response to Final Office Action filed Aug. 20, 2019, 29 pages, Doc 1020.
U.S. Appl. No. 15/802,348 / Advisory Action dated Sep. 4, 2019, 3 pages, Doc 1021.
U.S. Appl. No. 15/802,348 / RCE and Amendment filed Sep. 16, 2019, 30 pages, Doc 1022.
U.S. Appl. No. 15/802,348 / Terminal Disclaimer filed Mar. 18, 2020, 9 pages, Doc 1488.
U.S. Appl. No. 15/802,348 / Notice of Allowance and Fees Due dated Mar. 27, 2020, 178 pages, Doc 1489.
U.S. Appl. No. 15/802,348 / Issue Fee Payment filed Jun. 19, 2020, 9 pages, Doc 1491.
U.S. Appl. No. 15/802,348 / Issue Notification dated Jul. 8, 2020, 1 page, Doc 1494.
U.S. Appl. No. 16/909,899 / Application filed Jun. 23, 2020, 98 pages, Doc 2140.
U.S. Appl. No. 16/909,899 / Filing Receipt and Notice to File Missing Parts Jul. 6, 2020, 8 pages, Doc 2141.
U.S. Appl. No. 16/909,899 / Preliminary Amendment and Response to Missing Parts filed Sep. 8, 2020, 31 pages, Doc 2142.
U.S. Appl. No. 16/909,899 / Updated Filing Receipt Sep. 10, 2020, 6 pages, Doc 2143.
U.S. Appl. No. 16/909,899 / Notice of Publication dated Dec. 17, 2020, 6 pages, Doc 2161.
U.S. Appl. No. 11/006,446 / New Application filed Dec. 6, 2004, 91 pages, Doc 1495.
U.S. Appl. No. 11/006,446 / Pre-Exam Formalities Notice dated Jan. 24, 2005, 3 pages, Doc 1496.
U.S. Appl. No. 11/006,446 / Preliminary Amendment filed May 2, 2005, 118 pages, Doc 1497.
U.S. Appl. No. 11/006,446 / Requirement for Restriction / Election dated Apr. 4, 2007, 5 pages, Doc 1498.

(56) References Cited

OTHER PUBLICATIONS

U.S. Appl. No. 11/006,446 / Response to Election / Restriction filed May 3, 2007, 6 pages, Doc 1499
U.S. Appl. No. 11/006,446 / Non-Final Rejection dated Jul. 26, 2007, 34 pages, Doc 1502.
U.S. Appl. No. 11/006,446 / Amendment, Request for Reconsideration After Non-Final Rejection filed Nov. 26, 2007, 37 pages, Doc 1503.
U.S. Appl. No. 11/006,446 / Examiner's Search Strategies and Results dated Feb. 7, 2008, 1 page, Doc 1504.
U.S. Appl. No. 11/006,446 / Non-Final Rejection Feb. 20, 2008, 58 pages, Doc 1506.
U.S. Appl. No. 11/006,446 / Amendment / Request for Reconsideration After Non-Final Rejection dated Jul. 21, 2008, 33 pages, Doc 1507.
U.S. Appl. No. 11/006,446 / Final Rejection dated Oct. 28, 2008, 49 pages, Doc 1508.
U.S. Appl. No. 11/006,446 / Amendment Submitted / Entered with Filing of CPA/RCE filed Dec. 29, 2008, 33 pages, Doc 1509.
U.S. Appl. No. 11/006,446 / Advisory Action dated Jan. 7, 2009, 4 pages, Doc 1510.
U.S. Appl. No. 11/006,446 / Request for Continued Examination dated Apr. 28, 2009, 38 pages, Doc 1511.
U.S. Appl. No. 11/006,446 / Non-Final Rejection dated Jul. 7, 2009, 41 pages, Doc 1512.
U.S. Appl. No. 11/006,446 / Examiner Interview Summary Record and Examiner's Search Strategy and Results dated Oct. 26, 2009, 6 pages, Doc 1513.
U.S. Appl. No. 11/006,446 / Amendment / Request for Reconsideration After Non-Final Rejection Dec. 7, 2009, 33 pages, Doc 1514.
U.S. Appl. No. 11/006,446 / Notice of Allowance and Fees Due Mar. 19, 2010, 135 pages, Doc 1515.
U.S. Appl. No. 11/006,446 / Amendment After Notice of Allowance and Issue Fee Payment filed Jun. 21, 2010, 25 pages, Doc 1518.
U.S. Appl. No. 11/006,446 / Response to Amendment After Rule 312 dated Aug. 19, 2010, 3 pages, Doc 1520.
U.S. Appl. No. 11/006,446 / Drawings filed Aug. 25, 2010, 31 pages, Doc 1521.
U.S. Appl. No. 11/006,446 / Issue Notification dated Sep. 1, 2010, 1 page, Doc 1522.
U.S. Appl. No. 12/830,236 / Application, Declaration and Preliminary Amendment filed Jul. 2, 2010, 106 pages, Doc 1524.
U.S. Appl. No. 12/830,236 / Fee Worksheet filed Jul. 15, 2010, 1 page, Doc 1525.
U.S. Appl. No. 12/830,236 / Notice to File Corrected Application Papers Jul. 16, 2010, 5 pages, Doc 1526.
U.S. Appl. No. 12/830,236 / Applicant Response to Pre-Exam Formalities Notice filed Aug. 25, 2010, 34 pages, Doc 1527.
U.S. Appl. No. 12/830,236 / Filing Receipt Sep. 3, 2010, 3 pages, Doc 1528.
U.S. Appl. No. 12/830,236 / Notice of Publication dated Dec. 16, 2010, 1 page, Doc 1529
U.S. Appl. No. 12/830,236 / Requirement for Restriction / Election Mar. 18, 2011, 6 pages, Doc 1530.
U.S. Appl. No. 12/830,236 / Response to Election / Restriction filed Apr. 18, 2011, 8 pages, Doc 1531.
U.S. Appl. No. 12/830,236 / Non-Final Rejection dated May 11, 2011, 29 pages, Doc 1532.
U.S. Appl. No. 12/830,2361 Amendment / Request for Reconsideration After Non-Final Rejection filed Jul. 6, 2011, 20 pages, Doc 1533.
U.S. Appl. No. 12/830,236 / Final Rejection dated Oct. 14, 2011, 54 pages, Doc 1534.
U.S. Appl. No. 12/830,236 / Response After Final Action filed Jan. 17, 2012, 26 pages, Doc 1535.
U.S. Appl. No. 12/830,236 / Advisory Action dated Feb. 8, 2012, 6 pages, Doc 1536.
U.S. Appl. No. 12/830,236 / Notice of Appeal filed Mar. 8, 2012, 6 pages, Doc 1537.
U.S. Appl. No. 12/830,236 / Request for Continued Examination filed Jun. 5, 2012, 24 pages, Doc 1538.
U.S. Appl. No. 12/830,236 / Non-Final Rejection dated Jul. 31, 2012, 28 pages, Doc 1540.
U.S. Appl. No. 12/830,236 / Amendment / Request for Reconsideration After Non-Final Rejection filed Nov. 1, 2012, 28 pages, Doc 1541.
U.S. Appl. No. 12/830,236 / Final Rejection Feb. 27, 2013, 42 pages, Doc 1542.
U.S. Appl. No. 12/830,236 / Response After Final Action Jun. 27, 2013, 42 pages, Doc 1543.
U.S. Appl. No. 12/830,236 / Advisory Action and Amendment After Final Jul. 12, 2013, 4 pages, Doc 1544.
U.S. Appl. No. 12/830,236 / Notice of Appeal Filed Jul. 19, 2013, 6 pages, Doc 1545.
U.S. Appl. No. 12/830,236 / Appeal Brief filed Sep. 18, 2013, 44 pages, Doc 1546.
U.S. Appl. No. 12/830,236 / Examiner's Answer to Appeal Brief dated Dec. 18, 2013, 35 pages, Doc 1547.
U.S. Appl. No. 12/830,236 / Reply Brief filed Feb. 18, 2014, 18 pages, Doc 1548.
U.S. Appl. No. 12/830,236 / Appeal Docketing Notice filed Mar. 21, 2014, 2 pages, Doc 1550.
U.S. Appl. No. 12/830,236 / Patent Board Decision—Examiner Affirmed dated Mar. 9, 2016, 6 pages, Doc 1551.
U.S. Appl. No. 12/830,236 / Request for Continued Examination filed Apr. 27, 2016, 20 pages, Doc 1552.
U.S. Appl. No. 12/830,236 / Non-Final Rejection Jun. 29, 2016, 113 pages, Doc 1553.
U.S. Appl. No. 12/830,236 / Applicant Initiated Review Summary dated Aug. 30, 2016, 6 pages, Doc 1555.
U.S. Appl. No. 12/830,236 / Amendment / Request for Reconsideration After Non-Final Rejection filed Sep. 6, 2016, 15 pages, Doc 1556.
U.S. Appl. No. 12/830,236 / Applicant Initiated Interview Summary dated Sep. 9, 2016, 5 pages, Doc 1557.
U.S. Appl. No. 12/830,236 / Final Rejection dated Dec. 14, 2016, 98 pages, Doc 1558.
U.S. Appl. No. 12/830,236 / Response After Final Action filed Feb. 13, 2017, 17 pages, Doc 1559.
U.S. Appl. No. 12/830,236 / Amendment After Final Action or under 37CFR 1.312 dated Mar. 3, 2017, 3 pages, Doc 1560.
U.S. Appl. No. 12/830,236 / Request for Continued Examination filed Apr. 4, 2017, 23 pages, Doc 1561.
U.S. Appl. No. 12/830,236 / Non-Final Rejection dated Jun. 21, 2017, 90 pages, Doc 1562.
U.S. Appl. No. 12/830,236 / Applicant Initiated Review Summary dated Oct. 5, 2017, 9 pages, Doc 1563.
U.S. Appl. No. 12/830,236 / Amendment / Request for Reconsideration After Non-Final Rejection filed Oct. 23, 2017, 23 pages, Doc 1564.
U.S. Appl. No. 12/830,236 / Non-Final Rejection dated Feb. 6, 2018, 91 pages, Doc 1565.
U.S. Appl. No. 12/830,236 / Amendment / Request for Reconsideration After Non-Final Rejection filed May 4, 2018, 29 pages, Doc 1566.
U.S. Appl. No. 12/830,236 / Final Rejection dated Sep. 5, 2018, 65 pages, Doc 1567.
U.S. Appl. No. 12/830,236 / After Final Consideration Program Request filed Nov. 5, 2018, 27 pages, Doc 1568.
U.S. Appl. No. 12/830,236 / Advisory Action dated Nov. 19, 2018, 7 pages, Doc 1569.
U.S. Appl. No. 12/830,236 / Request for Continued Examination filed Dec. 31, 2018, 30 pages, Doc 1570.
U.S. Appl. No. 12/830,236 / Notice of Allowance and Fees Due dated Apr. 2, 2019, 53 pages, Doc 1571.
U.S. Appl. No. 12/830,236 / Supplemental Notice of Allowability dated May 21, 2019, 24 pages, Doc 1023.
U.S. Appl. No. 12/830,236 / Issue Fee Payment dated Jul. 1, 2019, 3 pages, Doc 1024.
U.S. Appl. No. 12/830,236 / Supplemental Allowability Jul. 9, 2019, 8 pages, Doc 1573.

(56) References Cited

OTHER PUBLICATIONS

U.S. Appl. No. 12/830,236 / Issue Notification dated Jul. 24, 2019, 1 page, Doc 1025.
U.S. Appl. No. 16/459,930, filed Jul. 2, 2019, 99 pages, Doc 1026.
U.S. Appl. No. 16/459,930 / Filing Receipt and Notice to File Missing Parts and Filing Receipt dated Jul. 18, 2019, 7 pages, Doc 1577
U.S. Appl. No. 16/459,930 / Response to Notice to File Missing Parts and Preliminary Amendment dated Sep. 4, 2019, 19 pages, Doc 1029.
U.S. Appl. No. 16/459,930 / Updated Filing Receipt dated Sep. 6, 2019, 4 pages, Doc 1030.
U.S. Appl. No. 16/459,930 / Notice of Publication dated Dec. 12, 2019, 1 page, Doc 1031.
U.S. Appl. No. 16/459,930 / Non-Final Rejection dated Oct. 6, 2020, 43 pages, Doc 1581.
U.S. Appl. No. 16/459,930 / Response to Non-Final Rejection filed Mar. 8, 2021, 19 pages, Doc 2175.
U.S. Appl. No. 16/459,930 / Non-final Office Action dated Jun. 9, 2021, 17 pages, Doc 2304.
U.S. Appl. No. 11/385,257 / New Application Filed Mar. 20, 2006, 118 pages, Doc 1582.
U.S. Appl. No. 11/385,257 / Pre-Exam Formalities Notice May 3, 2006, 2 pages, Doc 1583.
U.S. Appl. No. 11/385,257 / Applicant Response to Pre-Exam Formalities Notice filed Aug. 3, 2006, 46 pages, Doc 1584.
U.S. Appl. No. 11/385,257 / Notice of Publication dated Nov. 30, 2006, 1 page, Doc 1585.
U.S. Appl. No. 11/385,257 / Non-Final Rejection Apr. 29, 2008, 44 pages, Doc 1586.
U.S. Appl. No. 11/385,257 / Transmittal Letter May 23, 2008, 2 pages, Doc 1587.
U.S. Appl. No. 11/385,257 / Amendment / Request for Reconsideration After Non-Final Rejection filed Jul. 29, 2008, 29 pages, Doc 1588.
U.S. Appl. No. 11/385,257 / Final Rejection dated Dec. 9, 2008, 47 pages, Doc 1589.
U.S. Appl. No. 11/385,257 / Request for Continued Examination filed May 11, 2009, 36 pages, Doc 1590.
U.S. Appl. No. 11/385,257 / Supplemental Response or Supplemental Amendment filed May 26, 2009, 3 pages, Doc 1591.
U.S. Appl. No. 11/385,257 / Notice to the Applicant Regarding a Non-Compliant or Non-Responsive Amendment dated Jun. 1, 2009, 3 pages, Doc 1592.
U.S. Appl. No. 11/385,257 / Amendment / Request for Reconsideration After Non-Final Rejection filed Jun. 30, 2009, 34 pages, Doc 1593.
U.S. Appl. No. 11/385,257 / Non-Final Rejection dated Sep. 14, 2009, 47 pgs, Doc 1594.
U.S. Appl. No. 11/385,257 / Amendment / Request After Non-Final Rejection filed Jan. 13, 2010, 37 pages, Doc 1595.
U.S. Appl. No. 11/385,257 / Final Rejection dated Apr. 12, 2010, 55 pages, Doc 1596.
U.S. Appl. No. 11/385,257 / Request for Continued Examination filed Aug. 12, 2010, 40 pages, Doc 1597.
U.S. Appl. No. 11/385,257 / Non-Final Rejection dated Sep. 30, 2010, 56 pages, Doc 1598.
U.S. Appl. No. 11/385,257 / Amendment / Request for Reconsideration After Non-Final Rejection filed Mar. 29, 2011, 36 pages, Doc 1599.
U.S. Appl. No. 11/385,257 / Final Rejection dated Jun. 1, 2011, 47 pages, Doc 1600.
U.S. Appl. No. 11/385,257 / Request for Continued Examination dated Nov. 1, 2011, 37 pages, Doc 1601.
U.S. Appl. No. 11/385,257 / Non-Final Rejection dated Jan. 9, 2012, 53 pages, Doc 1602.
U.S. Appl. No. 11/385,257 / Amendment / Request for Reconsideration After Non-Final Rejection filed Apr. 6, 2012, 30 pages, Doc 1603.
U.S. Appl. No. 11/385,257 / Notice of Allowance and Fees Due dated Jun. 22, 2012, 45 pages, Doc 1604.
U.S. Appl. No. 11/385,257 / Notice of Allowance and Fees dated Due Oct. 4, 2012, 4 pages, Doc 1606.
U.S. Appl. No. 11/385,257 / Amendment After Notice of Allowance filed Dec. 12, 2012, 8 pages, Doc 1608.
U.S. Appl. No. 11/385,257 / Issue Notification dated Dec. 22, 2012, 1 page, Doc 1610.
U.S. Appl. No. 13/625,812 / Application filed Sep. 24, 2012, 123 pages, Doc 1612.
U.S. Appl. No. 13/625,812 / Notice to File Missing Parts and Filing Receipt dated Oct. 15, 2012, 6 pages, Doc 1613.
U.S. Appl. No. 13/625,812 / Preliminary Amendment dated Mar. 8, 2013, 50 pages, Doc 1614.
U.S. Appl. No. 13/625,812 / Notice of Incomplete Reply Mar. 15, 2013, 3 pages, Doc 1615.
U.S. Appl. No. 13/625,812 / Applicant Response to Pre-Exam Formalities Notice filed Apr. 2, 2013, 5 pages, Doc 1616.
U.S. Appl. No. 13/625,812 / Notice of Incomplete Reply Apr. 10, 2013, 3 pages, Doc 1617.
U.S. Appl. No. 13/625,812 / Filing Receipt and Miscellaneous Communication to Applicant Apr. 22, 2013, 5 pages, Doc 1619.
U.S. Appl. No. 13/625,812 / General Transmittal of Replacement Application Data Sheet filed May 10, 2013, 8 pages, Doc 1620.
U.S. Appl. No. 13/625,812 / Non-Final Rejection Jul. 26, 2013, 64 pages, Doc 1621.
U.S. Appl. No. 13/625,812 / Notice of Publication Aug. 1, 2013, 1 page, Doc 1622.
U.S. Appl. No. 13/625,812 / Amendment / Request for Reconsideration After Non-Final Rejection filed Oct. 9, 2013, 18 pages, Doc 1623.
U.S. Appl. No. 13/625,812 / Final Rejection dated Dec. 3, 2013, 35 pages, Doc 1624.
U.S. Appl. No. 13/625,812 / Response After Final Action filed Apr. 1, 2014, 25 pages, Doc 1625
U.S. Appl. No. 13/625,812 / Advisory Action Apr. 9, 2014, 3 pages, Doc 1626.
U.S. Appl. No. 13/625,812 / Notice of Appeal filed May 5, 2014, 6 pages, Doc 1627.
U.S. Appl. No. 13/625,812 / Request for Continued Examination filed Aug. 4, 2014, 25 pages, Doc 1628.
U.S. Appl. No. 13/625,812 / Request for Corrected Filing Receipt filed Aug. 21, 2014, 9 pages, Doc 1629.
U.S. Appl. No. 13/625,812 / Filing Receipt Aug. 27, 2014, 3 pages, Doc 1630.
U.S. Appl. No. 13/625,812 / Notice of Allowance and Fees Due dated Dec. 9, 2014, 36 pages, Doc 1631.
U.S. Appl. No. 13/625,812 / Filing Receipt Feb. 2, 2015, 3 pages, Doc 1632.
U.S. Appl. No. 13/625,812 / Filing Receipt Feb. 6, 2015, 3 pages, Doc 1634.
U.S. Appl. No. 13/625,812 / Terminal Disclaimer filed Mar. 2, 2015, 5 pages, Doc 1635.
U.S. Appl. No. 13/625,812 / Post-Allowance Communication—Incoming filed Mar. 6, 2015, 8 pages, Doc 1636.
U.S. Appl. No. 13/625,812 / Issue Fee Payment and Amendment After Notice of Allowance filed Mar. 9, 2015, 8 pages, Doc 1637.
U.S. Appl. No. 13/625,812 / Terminal Disclaimer Review Decision Mar. 12, 2015, 1 page, Doc 1639.
U.S. Appl. No. 13/625,812 / Issue Notification Apr. 8, 2015, 1 page, Doc 1641.
U.S. Appl. No. 13/625,812 / Terminal Disclaimer filed Apr. 14, 2015, 14 pages, Doc 1642.
U.S. Appl. No. 13/625,812 / Terminal Disclaimer Review Decision Apr. 17, 2015, 1 page, Doc 1643.
U.S. Appl. No. 14/641,735 / Application, Declaration and Power of Attorney filed Mar. 9, 2015, 128 pages, Doc 1645.
U.S. Appl. No. 14/641,735 / Notice to File Missing Parts Mar. 20, 2015, 6 pages, Doc 1646.
U.S. Appl. No. 14/641,735 / Preliminary Amendment filed Jun. 22, 2015, 41 pages, Doc 1647.
U.S. Appl. No. 14/641,735 / Notice of Incomplete Reply Jun. 26, 2015, 3 pages, Doc 1648.

(56) References Cited

OTHER PUBLICATIONS

U.S. Appl. No. 14/641,735 / Applicant Response to Pre-Exam Formalities Notice filed Jul. 8, 2015, 36 pages, Doc 1649.
U.S. Appl. No. 14/641,735 / Filing Receipt Jul. 22, 2015, 4 pages, Doc 1650.
U.S. Appl. No. 14/641,735 / Terminal Disclaimer filed Aug. 27, 25, 7 pages, Doc 1651.
U.S. Appl. No. 14/641,735 / Notice of Publication Oct. 29, 2015, 1 page, Doc 1652
1/14/201614/641,735 / Preliminary Amendment filed Jan. 14, 2016, 11 pages, Doc 1653.
U.S. Appl. No. 14/641,735 / Non-Final Rejection dated Jul. 14, 2017, 103 pages, Doc 1654.
U.S. Appl. No. 14/641,735 / Letter Restarting Period for Response and Examiner's Search Strategy and Results Aug. 24, 2017, 34 pages, Doc 1655.
U.S. Appl. No. 14/641,735 / Amendment / Request for Reconsideration After Non-Final Rejection filed Nov. 24, 2017, 30 pages, Doc 1656.
U.S. Appl. No. 14/641,735 / Final Rejection dated Mar. 15, 2018, 30 pages, Doc 1657.
U.S. Appl. No. 14/641,735 / Response After Final Action filed May 15, 2018, 31 pages, Doc 1658.
U.S. Appl. No. 14/641,735 / Advisory Action dated Jun. 8, 2018, 5 pages, Doc 1659.
U.S. Appl. No. 14/641,735 / Applicant Initiated Review Summary dated Jul. 10, 2018, 5 pages, Doc 1661.
U.S. Appl. No. 14/641,735 / Request for Continued Examination filed Jul. 16, 2018, 39 pages, Doc 1662.
U.S. Appl. No. 14/641,735 / Preliminary Amendment filed Oct. 26, 2018, 13 pages, Doc 1663.
U.S. Appl. No. 14/641,735 / Non-Final Rejection dated Nov. 2, 2018, 46 pages, Doc 1664.
U.S. Appl. No. 14/641,735 / Amendment / Request for Reconsideration After Non-Final Rejection filed Feb. 4, 2019, 30 pages, Doc 1665.
U.S. Appl. No. 14/641,735 / Notice of Allowance and Fees Due Apr. 15, 2019, 37 pages, Doc 1666.
U.S. Appl. No. 14/641,735 / Issue Fee Payment and Response under 37 CFR § 1.312 dated Jul. 12, 2019, 8 pages, Doc 1032.
U.S. Appl. No. 14/641,735 / Notice of Allowance and Fees Due Jul. 26, 2019, 7 pages, Doc 1667.
U.S. Appl. No. 14/641,735 / Supplemental Notice of Allowability dated Jul. 26, 2019, 7 pages, Doc 1033.
U.S. Appl. No. 14/641,735 / Issue Notification dated Aug. 7, 2019, 1 page, Doc 1034.
U.S. Appl. No. 16/513,021, filed Jul. 16, 2019, 130 pages, Doc 1035.
U.S. Appl. No. 16/513,021 / Filing Receipt and Notice to File Missing Parts dated Jul. 30, 2019, 7 pages, Doc 1671.
U.S. Appl. No. 16/513,021 / Response to Notice to File Missing Parts and Preliminary Amendment dated Sep. 11, 2019, 45 pages, Doc 1038.
U.S. Appl. No. 16/513,021 / Updated Filing Receipt dated Sep. 12, 2019, 4 pages, Doc 1039.
U.S. Appl. No. 16/513,021 / Notice of Publication dated Dec. 19, 2019, 1 page, Doc 1040.
U.S. Appl. No. 16/513,021 / Non-final Office Action dated May 5, 2021, 36 pages, Doc 2290.
U.S. Appl. No. 16/513,021 / Response to Non-final Office Action filed Sep. 28, 2021, 36 pages, Doc 2346.
U.S. Appl. No. 11/319,758 / Transmittal of New Application filed Dec. 27, 2005, 79 pages, Doc 1675.
U.S. Appl. No. 11/319,758 / Pre-Exam Formalities Notice Feb. 1, 2006, 2 pages, Doc 1676.
U.S. Appl. No. 11/319,758 / Applicant Response to Pre-Exam Formalities Notice filed Jul. 3, 2006, 15 pages, Doc 1677.
U.S. Appl. No. 11/319,758 / Non-Final Rejection dated Nov. 12, 2008, 46 pages, Doc 1678.
U.S. Appl. No. 11/319,758 / Amendment / Request for Reconsideration After Non-Final Rejection dated May 12, 2009, 40 pages, Doc 1679.
U.S. Appl. No. 11/319,758 / Final Rejection dated Aug. 3, 2009, 39 pages, Doc 1680.
U.S. Appl. No. 11/319,758 / Non-Final Rejection dated Mar. 30, 2010, 58 pages, Doc 1681.
U.S. Appl. No. 11/319,758 / Final Rejection dated Oct. 28, 2010, 58 pages, Doc 1682.
U.S. Appl. No. 11/319,758 / Request for Continued Examination filed Mar. 28, 2011, 37 pages, Doc 1683.
U.S. Appl. No. 11/319,758 / Non-Final Rejection dated Jun. 3, 2011, 57 pages, Doc 1684.
U.S. Appl. No. 11/319,758 / Amendment / Request for Reconsideration After Non-Final Rejection filed Nov. 3, 2011, 35 pages, Doc 1685.
U.S. Appl. No. 11/319,758 / Final Rejection Jan. 17, 2012, 41 pages, Doc 1686.
U.S. Appl. No. 11/319,758 / Response After Final Action dated May 17, 2012, 35 pages, Doc 1687.
U.S. Appl. No. 11/319,758 / Advisory Action dated Jun. 20, 2012, 3 pages, Doc 1690.
U.S. Appl. No. 11/319,758 / Response After Final Action filed Jun. 28, 2012, 30 pages, Doc 1691.
U.S. Appl. No. 11/319,758 / Notice of Allowance and Fees Due dated Jul. 17, 2012, 48 pages, Doc 1692.
U.S. Appl. No. 11/319,758 / Amendment After Notice of Allowance and Issue Fee Payment filed Oct. 12, 2012, 12 pages, Doc 1693.
U.S. Appl. No. 11/319,758 / Issue Notification dated Oct. 31, 2012, 4 pages, Doc 1695.
U.S. Appl. No. 13/632,581 / Preliminary Amendment and Application filed Oct. 1, 2012, 90 pages, Doc 1697.
U.S. Appl. No. 13/632,581 / Notice to File Missing Parts and Filing Receipt Feb. 2, 2012, 6 pages, Doc 1698.
U.S. Appl. No. 13/632,581 / Applicant Response to Pre-Exam Formalities Notice filed 2/22/2013, 26 pages, Doc 1699
U.S. Appl. No. 13/632,581 / Filing Receipt Mar. 5, 2013, 4 pages, Doc 1700.
U.S. Appl. No. 13/632,581 / Notice of Publication dated Jun. 13, 2013, 1 page, Doc 1701.
U.S. Appl. No. 13/632,581 / Non-Final Rejection dated Jul. 3, 2013, 43 pages, Doc 1702.
U.S. Appl. No. 13/632,581 / Amendment / Request for Reconsideration After Non-Final Rejection filed Sep. 11, 2013, 48 pages, Doc 1703.
U.S. Appl. No. 13/632,581 / Final Rejection Dec. 18, 2013, 47 pages, Doc 1704.
U.S. Appl. No. 13/632,581 / Response After Final Action filed Mar. 18, 2014, 40 pages, Doc 1705.
U.S. Appl. No. 13/632,581 / Advisory Action dated Apr. 3, 2014, 15 pages, Doc 1706.
U.S. Appl. No. 13/632,581 / Notice of Appeal filed Apr. 17, 2014, 6 pages, Doc 1707.
U.S. Appl. No. 13/632,581 / Request for Continued Examination filed Jul. 16, 2014, 28 pages, Doc 1708.
U.S. Appl. No. 13/632,581 / Notice of Informal or Non-Responsive CPA Amendment dated Oct. 20, 2014, 5 pages, Doc 1709.
U.S. Appl. No. 13/632,581 / Amendment / Request for Reconsideration After Non-Final Rejection filed Nov. 4, 2014, 19 pages, Doc 1710.
U.S. Appl. No. 13/632,581 / Non-Final Rejection dated Jan. 27, 2015, 81 pages, Doc 1711.
U.S. Appl. No. 13/632,581 / Amendment / Request for Reconsideration After Non-Final Rejection filed Apr. 20, 2015, 27 pages, Doc 1712.
U.S. Appl. No. 13/632,581 / Final Rejection dated Jul. 20, 2015, 47 pages, Doc 1713.
U.S. Appl. No. 13/632,581 / After Final Consideration Program Request filed Sep. 21, 2015, 31 pages, Doc 1714.
U.S. Appl. No. 13/632,581 / Advisory Action and After Final Consideration Program Decision dated Oct. 2, 2015, 18 pages, Doc 1715.

(56) References Cited

OTHER PUBLICATIONS

U.S. Appl. No. 13/632,581 / Request for Continued Examination filed Nov. 30, 2015, 60 pages, Doc 1716.
U.S. Appl. No. 13/632,581 / Notice of Allowance and Fees Due dated Dec. 17, 2015, 89 pages, Doc 1717.
U.S. Appl. No. 13/632,581 / Filing Receipt Jan. 22, 2016, 4 pages, Doc 1719.
U.S. Appl. No. 13/632,581 / Terminal Disclaimer filed Mar. 7, 2016, 8 pages, Doc 1723.
U.S. Appl. No. 13/632,581 / Issue Fee Payment and Amendment After Notice of Allowance filed Mar. 6, 2016, 24 pages, Doc 1724.
U.S. Appl. No. 13/632,581 / Response to Amendment Under Rule 312 Mar. 22, 2016, 18 pages, Doc 1725.
U.S. Appl. No. 13/632,581 / Issue Notification dated Apr. 13, 2016, 1 page, Doc 1726
U.S. Appl. No. 15/081,612 / Application, Declaration, and Power of Attorney filed Mar. 25, 2016, 91 pages, Doc 1727.
U.S. Appl. No. 15/081,612 / Notice to File Missing Parts Apr. 11, 2016, 8 pages, Doc 1728.
U.S. Appl. No. 15/081,612 / Preliminary Amendment filed Jun. 13, 2016, 38 pages, Doc 1729.
U.S. Appl. No. 15/081,612 / Preliminary Amendment filed Jun. 14, 2016, 6 pages, Doc 1730.
U.S. Appl. No. 15/081,612 / Filing Receipt Jun. 21, 2016, 4 pages, Doc 1731.
U.S. Appl. No. 15/081,612 / Non-Final Rejection dated Jul. 27, 2016, 91 pages, Doc 1732.
U.S. Appl. No. 15/081,612 / Terminal Disclaimer Sep. 23, 2016, 7 pages, Doc 1733.
U.S. Appl. No. 15/081,612 / Notice of Publication Sep. 29, 2016, 1 page, Doc 1734.
U.S. Appl. No. 15/081,612 / Notice of Allowance and Fees Due Oct. 17, 2016, 38 pages, Doc 1735.
U.S. Appl. No. 15/081,612 / Notice of Allowance and Fees Due dated Jan. 4, 2017, 4 pages, Doc 1736.
U.S. Appl. No. 15/081,612 / Request for Continued Examination, Amendment After Notice of Allowance and Issue Fee Payment filed Jan. 30, 2017, 11 pages, Doc 1737.
U.S. Appl. No. 15/081,612 / Notice of Allowance and Fees Due Jan. 30, 2017, 3 pages, Doc 1738.
U.S. Appl. No. 15/081,612 / Notice of Allowance and Fees Due dated Feb. 13, 2017, 51 pages, Doc 1739.
U.S. Appl. No. 15/081,612 / Amendment After Notice of Allowance and Issue Fee Payment Filed Mar. 20, 2017, 8 pages, Doc 1740.
U.S. Appl. No. 15/081,612 / Issue Notification dated Apr. 20, 2017, 1 page, Doc 1742.
U.S. Appl. No. 15/464,205 / Application, Power of Attorney and Declarations filed Mar. 20, 2017, 122 pages, Doc 1743.
U.S. Appl. No. 15/464,205 / Notice to File Missing Parts Mar. 28, 2017, 10 pages, Doc 1744.
U.S. Appl. No. 15/464,205 / Applicant Response to Pre-Exam Formalities Notice dated May 31, 2017, 99 pages, Doc 1745.
U.S. Appl. No. 15/464,205 / Filing Receipt Jun. 2, 2017, 5 pages, Doc 1746.
U.S. Appl. No. 15/464,205 / Notice of Publication Sep. 7, 2017, 1 page, Doc 1747.
U.S. Appl. No. 15/464,205 / Preliminary Amendment filed Feb. 22, 2019, 14 pages, Doc 1748.
U.S. Appl. No. 15/464,205 / Non-final Office Action dated Jul. 25, 2019, 64 pages, Doc 1041
U.S. Appl. No. 15/464,205 / Response to Non-Final Rejection filed Oct. 22, 2019, 21 pages, Doc 1750.
U.S. Appl. No. 15/464,205 / Terminal Disclaimer filed Oct. 22, 2019, 5 pages, Doc 1043.
U.S. Appl. No. 15/464,205 / Final Office Action dated Nov. 14, 2019, 11 pages, Doc 1044.
U.S. Appl. No. 15/464,205 / Response to Final Office Action dated Feb. 12, 2020, 11 pages, Doc 1062.
U.S. Appl. No. 15/464,205 / Advisory Action dated Feb. 25, 2020, 5 pages, Doc 1063.
U.S. Appl. No. 15/464,205 / Request for Continued Examination and Amendment filed Mar. 5, 2020, 20 pages, Doc 1064.
U.S. Appl. No. 15/464,205 / Non-Final Rejection dated Mar. 27, 2020, 52 pages, Doc 1755.
U.S. Appl. No. 15/464,205 / Response to Non-Final Rejection, 19 pages, Doc 1756.
U.S. Appl. No. 15/464,205 / Final Rejection dated Sep. 3, 2020, 100 pages, Doc 1757.
U.S. Appl. No. 15/464,205 / Interview Summary dated Oct. 26, 2020, 8 pages, Doc 1758.
U.S. Appl. No. 15/464,205 / Attorney Ref. No. 151.P009C3: Response to Final Rejection filed Nov. 3, 2020, 21 pages, Doc 1759.
U.S. Appl. No. 15/464,205 / Advisory Action dated Nov. 16, 2020, 10 pages, Doc 1760.
U.S. Appl. No. 15/464,205 / Request for Continued Examination filed Nov. 20, 2020, 24 pages, Doc 1761.
U.S. Appl. No. 15/464,205 / Notice of Allowance/Allowability filed May 26, 2020, 20 pages, Doc 2291.
U.S. Appl. No. 11/006,842 / Transmittal of New Application filed Dec. 7, 2004, 86 pages, Doc 1762.
U.S. Appl. No. 11/006,842 / Pre-Exam Formalities Notice Jan. 10, 2005, 2 pages, Doc 1763.
U.S. Appl. No. 11/006,842 / Applicant Response to Pre-Exam Formalities Notice filed Apr. 1, 2005, 9 pages, Doc 1764.
U.S. Appl. No. 11/006,842 / Preliminary Amendment filed May 2, 2005, 94 pages, Doc 1765.
U.S. Appl. No. 11/006,842 / Requirement for Restriction / Election Jan. 23, 2008, 5 pages, Doc 1766.
U.S. Appl. No. 11/006,842 / Response to Election / Restriction filed Feb. 25, 2008, 28 pages, Doc 1767
U.S. Appl. No. 11/006,842 / Requirement for Restriction / Election dated May 13, 2008, 5 pages, Doc 1768.
U.S. Appl. No. 11/006,842 / Miscellaneous Communication to Applicant dated May 15, 2008, 4 pages, Doc 1769.
U.S. Appl. No. 11/006,842 / Amendment / dated Request for Reconsideration After Non-Final Rejection filed Aug. 13, 2008, 29 pages, Doc 1770.
U.S. Appl. No. 11/006,842 / Non-Final Rejection dated Nov. 3, 2008, 28 pages, Doc 1771.
U.S. Appl. No. 11/006,842 / Amendment / Request for Reconsideration After Non-Final Rejection filed May 4, 2009, 40 pages, Doc 1772.
U.S. Appl. No. 11/006,842 / Supplemental Response or Supplemental Amendment filed Jul. 17, 2009, 25 pages, Doc 1773.
U.S. Appl. No. 11/006,842 / Notice of Allowance and Fees Due dated Jul. 27, 2009, 37 pages, Doc 1774.
U.S. Appl. No. 11/006,842 / Amendment After Notice of Allowance and Issue Fee Payment filed Oct. 27, 2009, 4 pages, Doc 1776.
U.S. Appl. No. 11/006,842 / Miscellaneous Communication to Applicant and Bibliographic Data Sheet Nov. 3, 2009, 2 pages, Doc 1777.
U.S. Appl. No. 11/006,842 / Issue Notification Nov. 18, 2009, 1 page, Doc 1778.
U.S. Appl. No. 11/006,842 / Request for Certificate of Correction filed Jun. 1, 2015, 5 pages, Doc 1779.
U.S. Appl. No. 11/006,842 / Certificate of Correction Sep. 15, 2015, 1 page, Doc 1780.
U.S. Appl. No. 12/613,450 / Application, Declaration and Power of Attorney filed Nov. 5, 2009, 63 pages, Doc 1781.
U.S. Appl. No. 12/613,450 / Notice to File Missing Parts Nov. 18, 2009, 6 pages, Doc 1782.
U.S. Appl. No. 12/613,450 / Applicant Response to Pre-Exam Formalities Notice and Preliminary Amendment filed Jan. 19, 2010, 19 pages, Doc 1783.
U.S. Appl. No. 12/613,450 / Filing Receipt Jan. 27, 2010, 3 pages, Doc 1784.
U.S. Appl. No. 12/613,450 / Notice of Publication May 6, 2010, 1 page, Doc 1785.
U.S. Appl. No. 12/613,450 / Requirement for Restriction / Election dated Jun. 10, 2011, 5 pages, Doc 1786.
U.S. Appl. No. 12/613,450 / Response to Election / Restriction filed Jul. 6, 2011, 20 pages, Doc 1787.

(56) References Cited

OTHER PUBLICATIONS

U.S. Appl. No. 12/613,450 / Non-Final Rejection dated Aug. 25, 2011, 20 pages, Doc 1788.
U.S. Appl. No. 12/613,450 / Amendment / Request for Reconsideration After Non-Final Rejection filed Dec. 27, 2011, 33 pages, Doc 1789.
U.S. Appl. No. 12/613,450 / Final Rejection dated Feb. 14, 2012, 18 pages, Doc 1790.
U.S. Appl. No. 12/613,450 / Response After Final Action filed Jun. 8, 2012, 24 pages, Doc 1791
U.S. Appl. No. 12/613,450 / Advisory Action and Amendment After Final or Under 37CFR 1.312 dated Jun. 20, 2012, 4 pages, Doc 1792.
U.S. Appl. No. 12/613,450 / Request for Continued Examination filed Jul. 12, 2012, 26 pages, Doc 1793.
U.S. Appl. No. 12/613,450 / Notice of Allowance and Fees Due filed Oct. 7, 2013, 70 pages, Doc 1794.
U.S. Appl. No. 12/613,450 / Terminal Disclaimer filed Jan. 2, 2014, 7 pages, Doc 1798.
U.S. Appl. No. 12/613,450 / Miscellaneous Communication to Applicant dated Jan. 14, 2014, 6 pages, Doc 1799.
U.S. Appl. No. 12/613,450 / Issue Notification dated Jan. 22, 2014, 1 page, Doc 1800.
U.S. Appl. No. 14/149,749 / Application filed Jan. 7, 2014, 61 pages, Doc 1801.
U.S. Appl. No. 14/149,749 / Notice to File Missing Parts Jan. 23, 2014, 7 pages, Doc 1802.
U.S. Appl. No. 14/149,749 / Applicant Response to Pre-Exam Formalities Notice filed May 23, 2014, 18 pages, Doc 1803.
U.S. Appl. No. 14/149,749 / Notice of Incomplete Reply May 29, 2014, 3 pages, Doc 1804.
U.S. Appl. No. 14/149,749 / Applicant Response to Pre-Exam Formalities Notice filed Aug. 25, 2014, 108 pages, Doc 1805.
U.S. Appl. No. 14/149,749 / Filing Receipt Sep. 4, 2014, 4 pages, Doc 1806.
U.S. Appl. No. 14/149,749 / Notice of Publication Dec. 11, 2014, 1 page, Doc 1809.
U.S. Appl. No. 14/149,749 / Terminal Disclaimer filed Feb. 23, 2015, 5 pages, Doc 1810.
U.S. Appl. No. 14/149,749 / Terminal Disclaimer—Electronic-Approved Feb. 23, 2015, 1 page, Doc 1811.
U.S. Appl. No. 14/149,749 / Examiner Initiated Interview Summary dated Feb. 24, 2015, 2 pages, Doc 1812.
U.S. Appl. No. 14/149,749 / Notice of Allowance and Fees Due dated Apr. 17, 2015, 113 pages, Doc 1813.
U.S. Appl. No. 14/149,749 / e-Terminal Disclaimer filed and approved, and Issue Fee Payment filed May 27, 2015, 22 pages, Doc 1815.
U.S. Appl. No. 14/149,749 / Response to Amendment Under Rule 312 dated May 29, 2015, 1 page, Doc 1816.
U.S. Appl. No. 14/149,749 / Response to Amendment Under Rule 312 dated Jun. 1, 2015, 6 pages, Doc 1817.
U.S. Appl. No. 14/149,749 / Issue Notification dated Jun. 17, 2015, 1 page, Doc 1819.
U.S. Appl. No. 14/149,749 / Fee Worksheet Aug. 12, 2005, 1 page, Doc 1820
U.S. Appl. No. 14/726,192 / Application, Declaration and Power of Attorney filed May 29, 2015, 65 pages, Doc 1821.
U.S. Appl. No. 14/726,192 / Notice to File Missing Parts Jun. 9, 2015, 6 pages, Doc 1822.
U.S. Appl. No. 14/726,192 / Preliminary Amendment filed Aug. 12, 2015, 119 pages, Doc 1823.
U.S. Appl. No. 14/726,192 / Filing Receipt Aug. 20, 2015, 4 pages, Doc 1824.
U.S. Appl. No. 14/726,192 / Terminal Disclaimer filed Nov. 20, 2015, 6 pages, Doc 1825.
U.S. Appl. No. 14/726,192 / Terminal Disclaimer—Electronic—Approved Nov. 20, 2015, 1 page, Doc 1826.
U.S. Appl. No. 14/726,192 / Notice of Publication Nov. 27, 2015, 1 page, Doc 1827.
U.S. Appl. No. 14/726,192 / Notice of Allowance and Fees Due dated May 2, 2016, 139 pages, Doc 1828.
U.S. Appl. No. 14/726,192 / Issue Fee Payment and Amendment After Notice of Allowance filed Jul. 18, 2016, 17 pages, Doc 1830.
U.S. Appl. No. 14/726,192 / Response to Amendment Under Rule 312 dated Jul. 21, 2016, 1 page, Doc 1831.
U.S. Appl. No. 14/726,192 / Response to Amendment Under Rule 312 and Amendment After Final filed Jul. 22, 2016, 3 pages, Doc 1832.
U.S. Appl. No. 14/726,192 / Issue Notification Aug. 3, 2016, 1 page, Doc 1834.
U.S. Appl. No. 15/240,964 / Preliminary Amendment, Declaration and Power of Attorney filed Aug. 31, 2016, 80 pages, Doc 1835.
U.S. Appl. No. 15/240,964 / Filing Receipt and Response Re: Informal Power of Attorney Aug. 31, 2016, 5 pages, Doc 1836.
U.S. Appl. No. 15/240,964 / Notice of Publication Dec. 8, 2016, 1 page, Doc 1839.
U.S. Appl. No. 15/240,964 / Non-Final Rejection dated Mar. 14, 2017, 58 pages, Doc 1840.
U.S. Appl. No. 15/240,964 / Amendment / Request for Reconsideration After Non-Final Rejection filed Jun. 14, 2017, 30 pages, Doc 1841.
U.S. Appl. No. 15/240,964 / Final Rejection dated Aug. 9, 2017, 185 pages, Doc 1842.
U.S. Appl. No. 15/240,964 / Response After Final Action filed dated Oct. 10, 2017, 33 pages, Doc 1843.
U.S. Appl. No. 15/240,964 / Advisory Action dated Oct. 30, 2017, 3 pages, Doc 1844.
U.S. Appl. No. 15/240,964 / Request for Continued Examination filed Nov. 9, 2017, 36 pages, Doc 1845.
U.S. Appl. No. 15/240,964 / Non-Final Rejection dated Jul. 30, 2018, 267 pages, Doc 1846.
U.S. Appl. No. 15/240,964 / Response to Non-Final Rejection filed Oct. 30, 2018, 45 pages, Doc 1847.
U.S. Appl. No. 15/240,964 / e-Terminal Disclaimer Filed and Approved Feb. 8, 2019, 8 pages, Doc 1848.
U.S. Appl. No. 15/240,964 / Notice of Allowance dated Feb. 21, 2019, 276 pages, Doc 1849.
U.S. Appl. No. 15/240,964 / Issue Fee Payment and Response Under 37 CFR § 1.312 filed May 16, 2019, 16 pages, Doc 1045.
U.S. Appl. No. 15/240,964 / Notice to File Corrected Application Papers dated May 16, 2019, 3 pages, Doc 1046.
U.S. Appl. No. 15/240,964 / Response to Notice to File Corrected Application Papers filed Jul. 22, 2019, 11 pages, Doc 1853.
U.S. Appl. No. 15/240,964 / Issue Notification dated Aug. 21, 2019, 1 page, Doc 1048.
U.S. Appl. No. 11/320,538 / Transmittal of New Application filed Dec. 27, 2005, 76 pages, Doc 1862.
U.S. Appl. No. 11/320,538 / Pre-Exam Formalities Notice Feb. 2, 2006, 2 pages, Doc 1863.
U.S. Appl. No. 11/320,538 / Applicant Response to Pre-Exam Formalities Notice filed Aug. 4, 2006, 36 pages, Doc 1864.
U.S. Appl. No. 11/320,538 / Non-Final Rejection dated Apr. 1, 2009, 27 pages, Doc 1865.
U.S. Appl. No. 11/320,538 / Amendment / Request for Reconsideration After Non-Final Rejection dated Jul. 1, 2009, 26 pages, Doc 1866.
U.S. Appl. No. 11/320,538 / Final Rejection dated Nov. 2, 2009, 29 pages, Doc 1867.
U.S. Appl. No. 11/320,538 / Amendment Submitted / Entered with Filing of CPA / RCE filed Jan. 4, 2010, 24 pages, Doc 1868.
U.S. Appl. No. 11/320,538 / Advisory Action dated Jan. 19, 2010, 4 pages, Doc 1869.
U.S. Appl. No. 11/320,538 / Request for Continued Examination filed Apr. 2, 2010, 29 pages, Doc 1870.
U.S. Appl. No. 11/320,538 / Non-Final Rejection Jun. 9, 2010, 24 pages, Doc 1871.
U.S. Appl. No. 11/320,538 / Final Rejection dated Dec. 22, 2010, 28 pages, Doc 1872.
U.S. Appl. No. 11/320,538 / Notice of Appeal Filed and Pre-Brief Conference Request filed May 23, 2011, 10 pages, Doc 1873.
U.S. Appl. No. 11/320,538 / Pre-Brief Appeal Conference Decision Jun. 30, 2011, 2 pages, Doc 1874.

(56) References Cited

OTHER PUBLICATIONS

U.S. Appl. No. 11/320,538 / Request for Continued Examination filed Dec. 23, 2011, 26 pages, Doc 1875.
U.S. Appl. No. 11/320,538 / Non-Final Rejection dated Dec. 19, 2012, 50 pages, Doc 1876.
U.S. Appl. No. 11/320,538 / Amendment / Request for Reconsideration After Non-Final Rejection filed Apr. 17, 2013, 25 pages, Doc 1877
U.S. Appl. No. 11/320,538 / Notice of Allowance and Fees Due Aug. 1, 2013, 49 pages, Doc 1878.
U.S. Appl. No. 11/320,538 / Issue Fee Payment filed Nov. 1, 2013, 9 pages, Doc 1879.
U.S. Appl. No. 11/320,538 / Notice of Allowance and Fees Due Nov. 19, 2013, 46 pages, Doc 1880.
U.S. Appl. No. 11/320,538 / Issue Notification Dec. 4, 2013, 1 page, Doc 1882.
U.S. Appl. No. 14/086,741 / Application filed Nov. 21, 2013, 79 pages, Doc 1883.
U.S. Appl. No. 14/086,741 / Notice to File Missing Parts and Filing Receipt Dec. 12, 2013, 7 pages, Doc 1884.
U.S. Appl. No. 14/086,741 / Preliminary Amendment and Applicant Response to Pre-Exam Formalities Notice filed Jun. 12, 2014, 89 pages, Doc 1885.
U.S. Appl. No. 14/086,741 / Filing Receipt Jun. 17, 2014, 4 pages, Doc 1886.
U.S. Appl. No. 14/086,741 / Notice of Publication Sep. 25, 2014, 1 page, Doc 1887.
U.S. Appl. No. 14/086,741 / Terminal Disclaimer and Power of Attorney filed Sep. 29, 2014, 7 pages, Doc 1888.
U.S. Appl. No. 14/086,741 / Terminal Disclaimer Review Decision Sep. 30, 2014, 1 page, Doc 1889.
U.S. Appl. No. 14/086,741 / Notice of Allowance and Fees Due and Communication Re: Power of Attorney Oct. 3, 2014, 46 pages, Doc 1890.
U.S. Appl. No. 14/086,741 / Miscellaneous Communication to Applicant and List of References Cited by Examiner Nov. 26, 2014, 3 pages, Doc 1891.
U.S. Appl. No. 14/086,741 / Amendment after Notice of Allowance and Issue Fee Payment filed Jan. 5, 2015, 19 pages, Doc 1892.
U.S. Appl. No. 14/086,741 / Petition Auto-Grant Letter from EFS Jan. 7, 2015, 2 pages, Doc 1894.
U.S. Appl. No. 14/086,741 / Response to Amendment under Rule 312 filed Jan. 22, 2015, 2 pages, Doc 1895.
U.S. Appl. No. 14/086,741 / Notice of Allowance and Fees Due dated Mar. 16, 2015, 48 pages, Doc 1896.
U.S. Appl. No. 14/086,741 / Issue Notification Apr. 1, 2015, 1 page, Doc 1898.
U.S. Appl. No. 14/596,154 / Application and Declaration filed Jan. 13, 2015, 82 pages, Doc 1899.
U.S. Appl. No. 14/596,154 / Notice to File Missing Parts and Filing Receipt Jan. 27, 2015, 7 pages, Doc 1901.
U.S. Appl. No. 14/596,154 / Preliminary Amendment and Applicant Response to Pre-Exam Formalities Notice filed Mar. 27, 2015, 88 pages, Doc 1902.
U.S. Appl. No. 14/596,154 / Filing Receipt Apr. 2, 2015, 3 pages, Doc 1903.
U.S. Appl. No. 14/596,154 / Terminal Disclaimer filed and Approved Nov. 20, 2015, 7 pages, Doc 1905.
U.S. Appl. No. 14/596,154 / Non-Final Rejection dated Sep. 21, 2017, 121 pages, Doc 1906.
U.S. Appl. No. 14/596,154 / Amendment / Request for Reconsideration After Non-Final Rejection filed Dec. 21, 2017, 48 pages, Doc 1907.
U.S. Appl. No. 14/596,154 / Notice of Allowance and Fees Due May 2, 2018, 56 pages, Doc 1908.
U.S. Appl. No. 14/596,154 / Notice of Allowance and Fees Due May 21, 2018, 11 pages, Doc 1909.
U.S. Appl. No. 14/596,154 / Issue Fee Payment filed Jul. 27, 2018, 8 pages, Doc 1910.
U.S. Appl. No. 14/596,154 / List of References Cited by Applicant and Considered by Examiner Aug. 8, 2018, 2 pages, Doc 1912.
U.S. Appl. No. 14/596,154 / Issue Notification Aug. 21, 2018, 1 page, Doc 1913.
U.S. Appl. No. 16/710,731 / Reissue Application filed Dec. 11, 2019, 91 pages, Doc 1914.
U.S. Appl. No. 16/710,731 / Filing Receipt dated Dec. 12, 2019, 5 pages, Doc 1915.
U.S. Appl. No. 16/710,731 / Request for Corrected Filing Receipt filed Feb. 19, 2020, 16 pages, Doc 1916.
U.S. Appl. No. 16/710,731 / Corrected Filing Receipt dated Feb. 24, 2020, 4 pages, Doc 1066.
U.S. Appl. No. 16/710,731 / Non-Final Rejection dated Nov. 24, 2020, 15 pages, Doc 1918.
U.S. Appl. No. 16/710,731 / Response to Non-Final Rejection dated Nov. 24, 2020, 21 pages, Doc 2177.
U.S. Appl. No. 16/710,731 / Response to Non-Final Rejection filed Mar. 23, 2021, 21 pages, Doc 2307.
U.S. Appl. No. 16/710,731 / Non-Final Rejection dated Apr. 21, 2021, 11 pages, Doc 2292.
U.S. Appl. No. 16/048,113 / Application filed Jul. 27, 2018, 86 pages, Doc 1919.
U.S. Appl. No. 16/048,113 / Filing Receipt and Notice to File Missing Parts Aug. 24, 2018, 6 pages, Doc 1920.
U.S. Appl. No. 16/048,113 / Notice of Publication Jan. 31, 2019, 1 page, Doc 1923.
U.S. Appl. No. 16/048,113 / Non-Final Rejection dated Oct. 2, 2020, 130 pages, Doc 1924.
U.S. Appl. No. 16/048,113 / Response to Non-Final Rejection dated Feb. 2, 2021, 22 pages, Doc 2165.
U.S. Appl. No. 16/048,113 / Terminal Disclaimer Oct. 20, 2020, 5 pages, Doc 2166
U.S. Appl. No. 16/048,113 / Notice of Allowance/Allowability dated Apr. 6, 2021, 75 pages, Doc 2293.
U.S. Appl. No. 16/048,113 / Issue Fee Payment and 312 Response filed Jul. 6, 2021, 12 pages, Doc 2307.
U.S. Appl. No. 11/361,500 / Transmittal of New Application Feb. 23, 2006, 77 pages, Doc 1925.
U.S. Appl. No. 11/361,500 / Pre-Exam Formalities Notice Mar. 23, 2006, 2 pages, Doc 1926.
U.S. Appl. No. 11/361,500 / Applicant Response to Pre-Exam Formalities Notice filed Jul. 19, 2006, 27 pages, Doc 1927.
U.S. Appl. No. 11/361,500 / Notice of Publication Nov. 16, 2006, 1 page, Doc 1928.
U.S. Appl. No. 11/361,500 / Non-Final Rejection dated May 27, 2009, 27 pages, Doc 1929.
U.S. Appl. No. 11/361,500 / Amendment / Request for Reconsideration After Non-Final Rejection filed Aug. 27, 2009, 37 pages, Doc 1930.
U.S. Appl. No. 11/361,500 / Notice of Allowance and Fees Due dated Dec. 11, 2009, 134 pages, Doc 1931.
U.S. Appl. No. 11/361,500 / Issue Fee Payment and Amendment After Notice of Allowance filed Jan. 6, 2010, 26 pages, Doc 1932.
U.S. Appl. No. 11/361,500 / Response to Amendment Under Rule 312 dated Jan. 25, 2010, 7 pages, Doc 1933.
U.S. Appl. No. 11/361,500 / Issue Notification Feb. 24, 2010, 1 page, Doc 1934.
U.S. Appl. No. 11/361,500 / Filing Receipt and Notice to File Missing Parts Feb. 25, 2010, 5 pages, Doc 1936.
U.S. Appl. No. 11/361,500 / Applicant Response to Pre-Exam Formalities Notice filed Apr. 26, 2010, 13 pages, Doc 1937.
U.S. Appl. No. 11/361,500 / Filing Receipt May 4, 2010, 3 pages, Doc 1938.
U.S. Appl. No. 11/361,500 / Notice of Publication Aug. 12, 2010, 1 page, Doc 1939.
U.S. Appl. No. 11/361,500 / Non-Final Rejection dated Aug. 30, 2012, 31 pages, Doc 1940.
U.S. Appl. No. 11/361,500 / Amendment / Request for Reconsideration After Non-Final Rejection filed Nov. 20, 2012, 15 pages, Doc 1941.
U.S. Appl. No. 11/361,500 / Terminal Disclaimer filed Jan. 2, 2013, 5 pages, Doc 1942.

(56) References Cited

OTHER PUBLICATIONS

U.S. Appl. No. 16/361,500/ Terminal Disclaimer Review Decision Jan. 4, 2013, 1 page, Doc 1943.
U.S. Appl. No. 16/361,500/ Notice of Allowance and Fees Due Jan. 10, 2013, 144 pages, Doc 1944.
U.S. Appl. No. 11/361,500/ Issue Fee Payment Apr. 10, 2013, 8 pages, Doc 1945.
U.S. Appl. No. 11/361,500/ Issue Notification dated Apr. 24, 2013, 1 page, Doc 1948.
U.S. Appl. No. 12/702,243 / Application and Preliminary Amendment filed Feb. 8, 2010, 84 pages, Doc 1952.
U.S. Appl. No. 12/702,243 / Notice to File Missing Parts and Filing Receipt Feb. 25, 2010, 5 pages, Doc 1953.
U.S. Appl. No. 12/702,243 / Applicant Response to Pre-Exam Formalities Notice Apr. 26, 2010, 13 pages, Doc 1954.
U.S. Appl. No. 12/702,243 / Filing Receipt May 4, 2010, 3 pages, Doc 1955.
U.S. Appl. No. 12/702,243 / Notice of Publication Aug. 12, 2010, 1 page, Doc 1956.
U.S. Appl. No. 12/702,243 / Non-Final Rejection Aug. 30, 2012, 31 pages, Doc 1957.
U.S. Appl. No. 12/702,243 / Amendment / Request for Reconsideration After Non-Final Rejection filed Nov. 20, 2012, 15 pages, Doc 1958.
U.S. Appl. No. 12/702,243 / Terminal Disclaimer filed Jan. 2, 2013, 5 pages, Doc 1959.
U.S. Appl. No. 12/702,243 / Terminal Disclaimer Review Decision Jan. 4, 2013, 1 page, Doc 1960.
U.S. Appl. No. 12/702,243 / Notice of Allowance and Fees Due Jan. 10, 2013, 120 pages, Doc 1961.
U.S. Appl. No. 12/702,243 / Issue Fee Payment and Post-Allowance Communication filed Aor 10, 2013, 8 pages, Doc 1962.
U.S. Appl. No. 12/702,243 / List of Reference Considered by Examiner Apr. 13, 2013, 4 pages, Doc 1964.
U.S. Appl. No. 12/702,243 / Issue of Notification Apr. 24, 2013, 1 page, Doc 1965.
U.S. Appl. No. 13/860,482 / Application and Preliminary Amendment filed Apr. 10, 2013, 99 pages, Doc 1969.
U.S. Appl. No. 13/860,482 / Notice to File Missing Parts and Filing Receipt May 21, 2013, 6 pages, Doc 1970.
U.S. Appl. No. 13/860,482 / Applicant Response to Pre-Exam Formalities Notice filed Oct. 22, 2013, 7 pages, Doc 1971.
U.S. Appl. No. 13/860,482 / Filing Receipt and Fee Worksheet Oct. 28, 2013, 4 pages, Doc 1972.
U.S. Appl. No. 13/860,482 / Notice of Publication Feb. 6, 2014, 1 page, Doc 1973.
U.S. Appl. No. 13/830,482 / Non-Final Rejection dated Jun. 9, 2014, 14 pages, Doc 1974.
U.S. Appl. No. 13/860,482 / Amendment / Request for Reconsideration After Non-Final Rejection and Terminal Disclaimer filed Sep. 8, 2014, pages, Doc 1975
U.S. Appl. No. 13/860,482 / Terminal Disclaimer Review Decision Sep. 9, 2014, 1 page, Doc 1976.
U.S. Appl. No. 13/860,482 / Terminal Disclaimer Filed Oct. 8, 2014, 4 pages, Doc 1978.
U.S. Appl. No. 13/860,482 / Terminal Disclaimer Review Decision Oct. 9, 2014, 1 page, Doc 1979.
U.S. Appl. No. 13/860,482 / Notice of Allowance and Fees Due Nov. 5, 2014, 95 pages, Doc 1981.
U.S. Appl. No. 13/860,482 / Issue Fee Payment and Amendment Made After Notice of Allowance filed Feb. 4, 2015, 8 pages, Doc 1982.
U.S. Appl. No. 13/860,482 / Issue Information Including Classification, Examiner, Name, Claim, Renumbering, etc. Feb. 6, 2015, 1 page, Doc 1983.
U.S. Appl. No. 13/860,482 / Issue Notification Mar. 4, 2015, 1 page, Doc 1985.
U.S. Appl. No. 14/614,292 / Application and Declaration filed Feb. 4, 2015, 82 pages, Doc 1986.
U.S. Appl. No. 14/614,292 / Notice to File Missing Parts and Filing Receipt Feb. 20, 2015, 6 pages, Doc 1987.
U.S. Appl. No. 14/614,292 / Applicant Response to Pre-Exam Formalities Notice Apr. 17, 2015, 34 pages, Doc 1988.
U.S. Appl. No. 14/614,292 / Filing Receipt and Fee Worksheet Apr. 24, 2015, 4 pages, Doc 1989.
U.S. Appl. No. 14/614,292 / Notice of Publication Aug. 6, 2015, 1 page, Doc 1990.
U.S. Appl. No. 14/614,292 / e-Terminal Disclaimer Filed and Approved Nov. 20, 2015, 7 pages, Doc 1991.
U.S. Appl. No. 14/614,292 / Non-Final Rejection May 19, 2016, 84 pages, Doc 1992.
U.S. Appl. No. 14/614,292 / Amendment / Request for Reconsideration After Non-Final Rejection filed Aug. 18, 2016, 23 pages, Doc 1993.
U.S. Appl. No. 14/614,292 / Notice of Allowance and Fees Due dated Sep. 21, 2016, 153 pages, Doc 1994.
U.S. Appl. No. 14/614,292 / Issue Fee Payment and Amendment After Notice of Allowance filed Dec. 21, 2016, 8 pages, Doc 1995.
U.S. Appl. No. 14/614,292 / Issue Notification Jan. 18, 2017, 1 page, Doc 1997.
U.S. Appl. No. 15/411,823 / Application, Power of Attorney, Declaration and Preliminary Amendment filed Jan. 20, 2017, 116 pages, Doc 1998.
U.S. Appl. No. 15/411,823 / Filing Receipt and Fee Worksheet Jan. 31, 2017, 4 pages, Doc 1999.
U.S. Appl. No. 15/411,823 / Notice of Publication May 11, 2017, 1 page, Doc 2000.
U.S. Appl. No. 15/411,823 / Non-Final Rejection dated Jan. 25, 2018, 85 pages, Doc 2001
U.S. Appl. No. 15/411,823 / e-Terminal Disclaimer Filed and Approved Apr. 24, 2018, 28 pages, Doc 2002.
U.S. Appl. No. 15/411,823 / Notice of Allowance and Fees Due filed Jul. 13, 2018, 101 pages, Doc 2003.
U.S. Appl. No. 15/411,823 / Issue Fee Payment filed and Miscellaneous Incoming Letter Oct. 15, 2018, 8 pages, Doc 2004.
U.S. Appl. No. 15/411,823 / Issue Notification Nov. 7, 2018, 1 page, Doc 2008.
U.S. Appl. No. 16/164,430 / Application filed Oct. 18, 2018, 84 pages, Doc 2009.
U.S. Appl. No. 16/164,430 / Notice to File Missing Parts and Filing Receipt Nov. 6, 2018, 7 pages, Doc 2010.
U.S. Appl. No. 16/164,430 / Response to Notice of Missing Parts filed Jan. 18, 2019, 37 pages, Doc 2011.
U.S. Appl. No. 16/164,430 / Updatd Filing Receipt Jan. 23, 2019, 5 pages, Doc 2012.
U.S. Appl. No. 16/164,430 / Notice of Publication May 2, 2019, 1 page, Doc 2013.
U.S. Appl. No. 16/164,430 / Non-Final Rejection dated Oct. 18, 2019, 122 pages, Doc 2014.
U.S. Appl. No. 16/164,430 / Non-final Office Action dated Oct. 18, 2019, 107 pages, Doc 1058.
U.S. Appl. No. 16/164,430 / Response to Non-Final Rejection filed Jan. 21, 2020, 15 pages, Doc 2015.
U.S. Appl. No. 16/164,430 / Notice of Allowance dated Mar. 6, 2020, 86 pages, Doc 2016.
U.S. Appl. No. 16/164,430 / Issue Fee Payment filed Jun. 8, 2020, 4 pages, Doc 2017.
U.S. Appl. No. 16/164,430 / Supplemental Notice of Allowability dated Jun. 16, 2020, 12 pages, Doc 2018.
U.S. Appl. No. 16/164,430 / Issue Notification Jun. 17, 2020, 1 page, Doc 2154.
U.S. Appl. No. 16/164,430 / Request for Certificate of Correction filed Sep. 3, 2020, 6 pages, Doc 2021.
U.S. Appl. No. 16/164,430 / Certificate of Correction Oct. 6, 2020, 1 page, Doc 2023.
U.S. Appl. No. 16/898,134 / Application filed Jun. 10, 2020, 84 pages, Doc 2024.
U.S. Appl. No. 16/898,134 / Filing Receipt and Notice to File Missing Parts Jun. 19, 2020, 8 pages, Doc 2025.
U.S. Appl. No. 16/898,134 / Preliminary Amendment and Response to Mising Parts filed Aug. 18, 2020, 39 pages, Doc 2026.

(56) References Cited

OTHER PUBLICATIONS

U.S. Appl. No. 16/898,134 / Updated Filing Receipt Aug. 21, 2020, 6 pages, Doc 2027.
U.S. Appl. No. 16/898,134 / Notice of Publication Nov. 27, 2020, 2 pages, Doc 2028.
U.S. Appl. No. 16/898,134 / Non-final Office Action dated Jun. 30, 2021, 57 pages, Doc 2308.
U.S. Appl. No. 11/412,417 / New Application filed Apr. 26, 2006, 96 pages, Doc 2029.
U.S. Appl. No. 11/412,417 / Pre-Exam Formalities Notice May 19, 2006, 2 pages, Doc 2030.
U.S. Appl. No. 11/412,417 / Applicant Response to Pre-Exam Formalities Notice filed Jul. 19, 2006, 14 pages, Doc 2031.
U.S. Appl. No. 11/412,417 / Non-Final Rejection dated Apr. 1, 2008, 53 pages, Doc 2032.
U.S. Appl. No. 11/412,417 / Amendment / Request for Reconsideration After Non-Final Rejection filed Aug. 1, 2008, 34 pages, Doc 2033.
U.S. Appl. No. 11/412,417 / Final Rejection dated Nov. 13, 2008, 40 pages, Doc 2034.
U.S. Appl. No. 11/412,417 / Request for Continued Examination and Amendment Submitted with Filing of Request for Continued Examination filed May 12, 2009, 36 pages, Doc 2035.
U.S. Appl. No. 11/412,417 / Non-Final Rejection dated Jun. 30, 2009, 141 pages, Doc 2036.
U.S. Appl. No. 11/412,417 / Amendment / Request for Reconsideration After Non-Final Rejection filed Oct. 30, 2009, 36 pages, Doc 2037.
U.S. Appl. No. 11/412,417 / Final Rejection dated Jan. 4, 2010, 43 pages, Doc 2038.
U.S. Appl. No. 11/412,417 / Request for Continued Examination filed May 4, 2010, 32 pages, Doc 2039.
U.S. Appl. No. 11/412,417 / Supplemental Remarks or Supplemental Amendment filed Jun. 22, 2010, 25 pages, Doc 2040.
U.S. Appl. No. 11/412,417 / Notice of Allowance and Fees Due dated Jul. 6, 2010, 23 pages, Doc 2041.
U.S. Appl. No. 11/412,417 / Request for Continued Examination filed Oct. 5, 2010, 4 pages, Doc 2043.
U.S. Appl. No. 11/412,417 / Notice of Allowance and Fees Due dated Oct. 26, 2010, 17 pages, Doc 2044.
U.S. Appl. No. 11/412,417 / Issue Fee Payment and Miscellaneous Incoming Letter filed Jan. 26, 2011, 3 pages, Doc 2045.
U.S. Appl. No. 11/412,417 / Issue Notification Feb. 9, 2011, 1 page, Doc 2047.
U.S. Appl. No. 13/030,084 / Application and Declaration filed Feb. 17, 2011, 105 pages, Doc 2048
U.S. Appl. No. 13/030,084 / Notice to File Missing Parts Mar. 3, 2011,6 pages, Doc 2049.
U.S. Appl. No. 13/030,084 / Applicant Response to Pre-Exam Formalities Notice filed Aug. 3, 2011, 29 pages, Doc 2050.
U.S. Appl. No. 13/030,084 / Filing Receipt Aug. 11, 2011,4 pages, Doc 2051.
U.S. Appl. No. 13/030,084 / Non-Final Rejection dated Oct. 26, 2011, 39 pages, Doc 2052.
U.S. Appl. No. 13/030,084 / Notice of Publication Nov. 17, 2011, 1 page, Doc 2053.
U.S. Appl. No. 13/030,084 / Informal or Non-Responsive Amendment filed Jan. 26, 2012, 35 pages, Doc 2054.
U.S. Appl. No. 13/030,084 / Notice to Applicant Regarding a Non-Compliant or Non-Responsive Amendment Jan. 31, 2012, 4 pages, Doc 2055.
U.S. Appl. No. 13/030,084 / Amendment / Request for Reconsideration After Non-Final Rejection filed Feb. 9, 2012, 36 pages, Doc 2056.
U.S. Appl. No. 13/030,084 / Final Rejection dated Mar. 28, 2012, 62 pages, Doc 2057.
U.S. Appl. No. 13/030,084 / Response After Final Action filed Jun. 14, 2012, 90 pages, Doc 2058.
U.S. Appl. No. 13/030,084 / Advisory Action dated Jun. 26, 2012, 4 pages, Doc 2059.
U.S. Appl. No. 13/030,084 / Request for Continued Examination filed Jul. 23, 2012, 91 pages, Doc 2060.
U.S. Appl. No. 13/030,084 / Notice to Applicant Regarding a Non-Compliant or Non-Responsive Amendment dated Jul. 25, 2012, 2 pages, Doc 2061.
U.S. Appl. No. 13/030,084 / Amendment / Request for Reconsideration After Non-Final Rejection filed Jan. 2, 2013, 40 pages, Doc 2062.
U.S. Appl. No. 13/030,084 / Non-Final Rejection dated Apr. 30, 2013, 45 pages, Doc 2064.
U.S. Appl. No. 13/030,084 / Amendment / Request for Reconsideration After Non-Final Rejection dated Jul. 30, 2013, 30 pages, Doc 2065.
U.S. Appl. No. 13/030,084 / Non-Final Rejection dated Oct. 10, 2013, 50 pages, Doc 2066.
U.S. Appl. No. 13/030,084 / Amendment / Request for Reconsideration After Non-Final Rejection filed Jan. 2, 2014, 27 pages, Doc 2067.
U.S. Appl. No. 13/030,084 / Final Rejection dated Mar. 19, 2014, 48 pages, Doc 2068.
U.S. Appl. No. 13/030,084 / Amendment Submitted / Entered with Filing of CPA / Request for Continued Examination filed May 19, 2014, 41 pages, Doc 2069.
U.S. Appl. No. 13/030,084 / Advisory Action dated Jun. 6, 2014, 6 pages, Doc 2070.
U.S. Appl. No. 13/030,084 / Applicant Initiated Interview Summary dated Jul. 1, 2014, 3 pages, Doc 2071.
U.S. Appl. No. 13/030,084 / Request for Continued Examination filed Aug. 15, 2014, 31 pages, Doc 2072
U.S. Appl. No. 13/030,084 / Non-Final Rejection dated Mar. 24, 2015, 45 pages, Doc 2073.
U.S. Appl. No. 13/030,084 / Amendment / Request for Reconsideration After Non-Final Rejection filed Jun. 24, 2015, 31 pages, Doc 2074.
U.S. Appl. No. 13/030,084 / e-Terminal Disclaimer filed and approved and Communication Re: Power of Attorney Sep. 10, 2015, 9 pages, Doc 2077.
U.S. Appl. No. 13/030,084 / Notice of Allowance and Fees Due dated Sep. 17, 2015, 46 pages, Doc 2078.
U.S. Appl. No. 13/030,084 / Post-Allowance Communication—Incoming Nov. 13, 2015, 4 pages, Doc 2082.
U.S. Appl. No. 13/030,084 / Miscellaneous Communication Applicant Nov. 30, 2015, 49 pages, Doc 2083.
U.S. Appl. No. 13/030,084 / Issue Fee Payment filed Dec. 10, 2015, 8 pages, Doc 2084.
U.S. Appl. No. 13/030,084 / Issue Notification Jan. 16, 2016, 1 page, Doc 2086.
U.S. Appl. No. 14/968,429 / Application filed Dec. 14, 2015, 119 pages, Doc 2087.
U.S. Appl. No. 14/968,429 / Filing Receipt and Notice to File Corrected Application Papers Jan. 4, 2016, 6 pages, Doc 2088.
U.S. Appl. No. 14/968,429 / Applicant Response to Pre-Exam Formalities Notice filed Jan. 14, 2016, 38 pages, Doc 2089.
U.S. Appl. No. 14/968,429 / Filing Receipt and Miscellaneous Communication to Applicant Jan. 21, 2016, 5 pages, Doc 2090.
U.S. Appl. No. 14/968,429 / Notice of Publication Apr. 28, 2016, 1 page, Doc 2093.
U.S. Appl. No. 14/968,429 / Non-Final Rejection dated May 15, 2017, 56 pages, Doc 2094.
U.S. Appl. No. 14/968,429 / Amendment / Request for Reconsideration After Non-Final Rejection, 22 pages, Doc 2095.
U.S. Appl. No. 14/968,429 / Final Rejection dated Oct. 24, 2017, 11 pages, Doc 2096.
U.S. Appl. No. 14/968,429 / Response After Final Action and After Final Consideration Program Request filed Dec. 26, 2017, 31 pages, Doc 2097.
U.S. Appl. No. 14/968,429 / Advisory Action and After Final Consideration Program Decision dated Jan. 11, 2018, 7 pages, Doc 2098.
U.S. Appl. No. 14/968,429 / e-Terminal Disclaimer filed and Approved and Response After Final Action filed Feb. 7, 2018, 25 pages, Doc 2099.

(56) References Cited

OTHER PUBLICATIONS

U.S. Appl. No. 14/968,429 / Amendment After Final filed Feb. 26, 2018, 16 pages, Doc 2100.
U.S. Appl. No. 14/968,429 / Notice of Allowance and Fees Due dated Mar. 19, 2018, 47 pages, Doc 2101.
U.S. Appl. No. 14/968,429 / Amendment After Notice of Allowance and Issue Fee Payment filed May 29, 2018, 17 pages, Doc 2102.
U.S. Appl. No. 14/968,429 / Amendment After Notice of Allowance filed May 31, 2018, 14 pages, Doc 2103.
U.S. Appl. No. 14/968,429 / Amendment After Notice of Allowance filed Jun. 13, 2018, 14 pages, Doc2104.
U.S. Appl. No. 14/968,429 / Response to Amendment Under Rule 312 dated Jul. 10, 2018, 5 pages, Doc 2105.
U.S. Appl. No. 14/968,429 / Response to Amendment Under Rule 312 dated Jul. 23, 2018, 3 pages, Doc 2106.
U.S. Appl. No. 14/968,429 / Issue Notification Aug. 1, 2018, 1 page, Doc 2107.
U.S. Appl. No. 14/968,429 / Request for Certificate of Correction filed Oct. 12, 2018, 6 pages, Doc 2108.
U.S. Appl. No. 14/968,429 / Certificate of Correction Nov. 20, 2018, 1 page, Doc 2109.
U.S. Appl. No. 16/048,061 / Application filed Jul. 27, 2018, 109 pages, Doc 2110.
U.S. Appl. No. 16/048,061 / Notice to File Missing Parts and Filing Receipt Aug. 13, 2018, 7 pages, Doc 2111.
U.S. Appl. No. 16/048,061 / Applicant Response to Pre-Exam Formalities Notice filed Oct. 12, 2018, 45 pages, Doc 2112.
U.S. Appl. No. 16/048,061 / Filing Receipt Oct. 16, 2018, 5 pages, Doc 2113.
U.S. Appl. No. 16/048,061 / Request for Corrected Filing Receipt filed Oct. 31, 2018, 8 pages, Doc 2114.
U.S. Appl. No. 16/048,061 / Filing Receipt Nov. 5, 2018, 4 pages, Doc 2115.
U.S. Appl. No. 16/048,061 / Notice of Publication Jan. 24, 2019, 1 page, Doc 2116.
U.S. Appl. No. 16/048,061 / Non-Final Rejection dated Sep. 25, 2020, 68 pages, Doc 2117.
U.S. Appl. No. 16/048,061 / Response to Non-Final Rejection filed Jan. 25, 2021, 17 pages, Doc 2167.
U.S. Appl. No. 16/048,061 / Terminal Disclaimer filed Jan. 25, 2021,6 pages, Doc 2168.
U.S. Appl. No. 16/048,061 / Notice of Allowance/Allowability dated Apr. 9, 2021, 33 pages, Doc 2294.
U.S. Appl. No. 16/048,061 / Issue Fee Payment and 312 Response filed Jul. 9, 2021, 19 pages, Doc 2312.
U.S. Appl. No. 16/048,061 / eTerminal Disclaimer filed Jul. 9, 2021, 3 pages, Doc 2313.
U.S. Appl. No. 16/164,535 / Application filed Oct. 18, 2018, 122 pages, Doc 2118.
U.S. Appl. No. 16/164,535 / Notice to File Corrected Application Papers and Filing Receipt 11/7/2018, 7 pages, Doc 2119
U.S. Appl. No. 16/164,535 / Applicant Response to Pre-Exam Formalities Notice filed Jan. 7, 2019, 27 pages, Doc 2120.
U.S. Appl. No. 16/164,535 / Updated Filing Receipt Jan. 11, 2019, 5 pages, Doc 2121.
U.S. Appl. No. 16/164,535 / Notice of Publication Apr. 25, 2019, 1 page, Doc 2122.
U.S. Appl. No. 16/164,535 / Non-Final Rejection dated Nov. 24, 2020, 76 pages, Doc 2123.
U.S. Appl. No. 16/164,535 / Response to Non-Final Rejection filed Feb. 19, 2021, 17 pages, Doc 2169.
U.S. Appl. No. 16/164,535 / Terminal Disclaimer filed Feb. 19, 2021, 6 pages, Doc 2170.
U.S. Appl. No. 16/164,535 / Notice of Allowance/Allowability dated Feb. 19, 2021,6 pages, Doc 2295.
U.S. Appl. No. 16/164,535 / Request for Continued Examination and Amendment filed Jun. 17, 2021, 58 pages, Doc 2309.
U.S. Appl. No. 16/164,535 / Notice of Allowance / Allowability and Examiner-Initialed SB08 Listing dated Jul. 8, 2021,20 pages, Doc 2311.

U.S. Appl. No. 11/480,094 / Application filed Jun. 29, 2006, 125 pages, Doc 2124.
U.S. Appl. No. 11/480,094 / Pre-Exam Formalities Notice Aug. 2, 2006, 2 pages, Doc 2125.
U.S. Appl. No. 11/480,094 / Applicant Response to Pre-Exam Formalities Notice filed Nov. 2, 2006, 32 pages, Doc 2126.
U.S. Appl. No. 11/480,094 / Filing Receipt Dec. 7, 2006, 3 pages, Doc 2127.
U.S. Appl. No. 11/480,094 / Non-Final Rejection dated Nov. 7, 2008, 28 pages, Doc 2128.
U.S. Appl. No. 11/480,094 / Amendment / Request for Reconsideration After Non-Final Rejection filed May 7, 2009, 37 pages, Doc 2129.
U.S. Appl. No. 11/480,094 / Final Rejection dated Jul. 28, 2009, 16 pages, Doc 2130.
U.S. Appl. No. 11/480,094 / Request for Continued Examination filed Dec. 28, 2009, 39 pages, Doc 2131.
U.S. Appl. No. 11/480,094 / Non-Final Rejection dated Dec. 15, 2010, 33 pages, Doc 2132.
U.S. Appl. No. 11/480,094 / Amendment / Request for Reconsideration After Non-Final Rejection filed May 16, 2011, 34 pages, Doc 2133.
U.S. Appl. No. 11/480,094 / Final Rejection dated Aug. 1, 2011, 26 pages, Doc 2134
U.S. Appl. No. 11/480,094 / Response After Final Action filed Nov. 1, 2011, 35 pages, Doc 2135.
U.S. Appl. No. 11/480,094 / Advisory Action dated Nov. 14, 2011, 3 pages, Doc 2136.
U.S. Appl. No. 11/480,094 / Notice of Appeal Filed Nov. 28, 2011, 5 pages, Doc 2137 pages.
U.S. Appl. No. 11/480,094 / Abandonment Jul. 31, 2012, 2 pages, Doc 2138.
U.S. Appl. No. 16/820,457 / Non-final Office Action dated Apr. 26, 2022, 16 pages, Doc 2382.
U.S. Appl. No. 16/379,674 / Issue Fee Payment and 312 Response filed Mar. 4, 2022, 13 pages, Doc 2383.
U.S. Appl. No. 16/379,674 / Examiner Response to 312 Amendment dated Mar. 18, 2022, 1 page, Doc 2384.
U.S. Appl. No. 16/379,674 / Issue Notification dated Apr. 6, 2022, 1 page, Doc 2385.
U.S. Appl. No. 17/690,576 / Patent Application filed Mar. 9, 2022, 76 pages, Doc 2386.
U.S. Appl. No. 17/690,576 / Filing Receipt and Notice to File Missing Parts dated Mar. 15, 2022, 6 pages, Doc 2387.
U.S. Appl. No. 16/459,930 / Issue Fee Payment and 312 Response filed Mar. 28, 2022, 8 pages, Doc 2390.
U.S. Appl. No. 16/459,930 / Issue Notification dated Apr. 6, 2022, 1 page, Doc 2391.
U.S. Appl. No. 17/710,515 / Patent Application filed Mar. 31, 2022, 99 pages, Doc 2392.
U.S. Appl. No. 17/710,515 / Filing Receipt and Notice to File Missing Parts dated Apr. 7, 2022, 6 pages, Doc 2393.
U.S. Appl. No. 16/513,021 / Request for Continued Examination and Amendment filed Mar. 2, 2022, 32 pages, Doc 2394.
U.S. Appl. No. 15/464,205/ Issue Notification dated Mar. 2, 2022, 1 page, Doc 2397.
U.S. Appl. No. 16/427,054 / Notice of Allowance / Allowability dated Mar. 2, 2022, 13 pages, Doc 2400.
U.S. Appl. No. 16/710,731 / Request for Continued Examination and Amendment filed Mar. 2, 2022, 27 pages, Doc 2401.
U.S. Appl. No. 16/209,872 / Issue Notification dated Dec. 1, 2021, 1 page, Doc 2369.
U.S. Appl. No. 17/381,142 / Notice of Publication dated Nov. 11, 2021, 1 page, Doc 2370.
U.S. Appl. No. 16/379,674 / Notice of Allowance/Allowability dated Dec. 8, 2021, 28 pages, Doc 2367.
U.S. Appl. No. 16/710,577 / Notice of Abandonment dated Oct. 26, 2021, 2 pages, Doc 2388.
U.S. Appl. No. 16/909,899 / Response to Non-final Office Action filed Nov. 11, 2021, 27 pages, Doc 2366.
U.S. Appl. No. 16/909,899 / Non-final Office Action dated Jan. 27, 2022, 27 pages, Doc 2371.

(56) References Cited

OTHER PUBLICATIONS

U.S. Appl. No. 16/459,930 / Notice of Allowance/Allowability dated Dec. 29, 2021, 8 pages, Doc 2372.
U.S. Appl. No. 16/459,930 / Corrected Notice of Allowability dated Jan. 21, 2022, 3 pages, Doc 2389.
U.S. Appl. No. 16/513,021 / Response to Final Office Action filed Feb. 2, 2022, 31 pages, Doc 2374.
U.S. Appl. No. 16/513,021 / Advisory Action dated Feb. 22, 2022, pages, Doc 2375.
U.S. Appl. No. 15/464,205 / Issue Fee Payment and 312 Response filed Jan. 31, 2022, pages, Doc 2395.
U.S. Appl. No. 15/464,205 / Corrected Notice of Allowability dated Feb. 7, 2022, 2 pages, Doc 2396.
U.S. Appl. No. 17/590,229 / Patent Application filed Feb. 1, 2022, 95 pages, Doc 2398.
U.S. Appl. No. 17/590,229 / Filing Receipt and Notice to File Missing Parts dated Feb. 9, 2022, 6 pages, Doc 2399.
U.S. Appl. No. 17/396,488 / Notice of Publication dated Feb. 10, 2022, 1 page, Doc 2381.
U.S. Appl. No. 16/898,134 / Issue Fee and 312 Response filed Dec. 22, 2021, 7 pages, Doc 2376.
U.S. Appl. No. 16/898,134 / Issue Notification dated Jan. 19, 2022, 1 page, Doc 2377.
U.S. Appl. No. 17/565,326 / US Patent Application filed Dec. 29, 2021, 84 pages, Doc 2373.
U.S. Appl. No. 17/565,326 / Filing Receipt date Jan. 13, 2022, 4 pages, Doc 2378.
U.S. Appl. No. 16/164,535 / Issue Fee Payment and 312 Response filed Oct. 8, 2021, 17pages, Doc 2356.
U.S. Appl. No. 16/164,535 / Issue Notification dated Nov. 17, 2021, 1 page, Doc 2368.
U.S. Appl. No. 17/378,119 / Notice of Publication dated Feb. 10, 2022, 1 page, Doc 2380.

\* cited by examiner

Rule A (Boolean)

410 { [0] → empty sequence
[1] → ( )

Rule B (Even)

420 [2x] → ( ) [x]

Rule C (Add Non-composite)

430 [Q(x)] → ( [x] )

Rule D (Add Composite)

A. If grouping or subgrouping S is empty sequence then Eval (S)=0; if S is ( ) then Eval (S) = 1

B. If grouping or subgrouping S is ( )T then Eval (S) = Eval ( ( )T) = 2 * Eval (T)

C. If grouping or subgrouping S is (T) then Eval (S) =Eval ((T)) = Q (Eval(T))

D. If grouping or subgroping S is UV then Eval (S) = Eval (UV) = Eval (U) * Eval (V)

METHOD AND/OR SYSTEM FOR TRANSMITTING AND/OR RECEIVING DATA

This disclosure claims priority pursuant to 35 USC 119(e) from U.S. provisional patent application serial no. Not Yet Assigned, filed on Nov. 30, 2004, by LeTourneau, et al., titled, "METHOD AND/OR SYSTEM FOR TRANSMITTING AND/OR RECEIVING DATA," assigned to the assignee of the presently claimed subject matter.

BACKGROUND

This disclosure is related to transmitting data and/or receiving data.

A variety of techniques exist for transmitting and/or receiving data. However, such techniques typically have several disadvantages, including, a limit on the size of the datum that may be transmitted and/or received, such as 32 or 64 bits, for example. Another disadvantage includes the difficulty of synchronization between a receiver and transmitter. Thus, new methods and/or systems for receiving and/or transmitting data continue to be desirable.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 4 is a table illustrating an embodiment of operations in which natural numerals are associated with an embodiment of a sequence of binary values;

FIG. 5 is a table illustrating an application of the embodiment of FIG. 4 to a series of natural numerals;

FIG. 6 is a table illustrating an embodiment of an operation that associates non-composite natural numerals with natural numerals;

FIG. 8 is a table illustrating an embodiment of a technique for evaluating binary sequences received, such as those received via the approach illustrated in FIG. 7.

DETAILED DESCRIPTION

Figure 1:
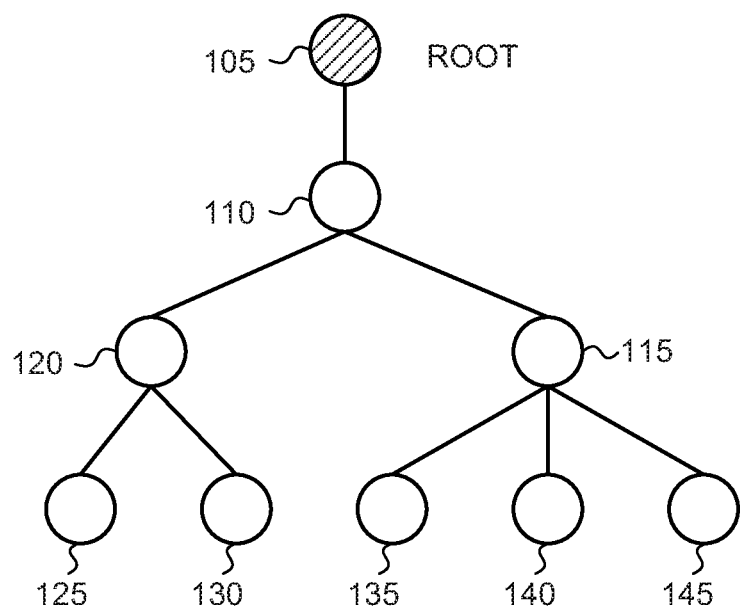
FIG. 1 is a schematic diagram of an embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 1 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

In a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with one value, or three values. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with numerals, such as binary numerals as previously described. Any distinctly identifiable labels may be employed; however, in this context, it shall be understood that employing numerals to label the edges is sufficiently general to encompass any sort of data labels that may be desirable, regardless of their form. For example, and without loss of generality, a table look-up process may be employed to convert between a set of data or other labels and a set of natural numerals.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTs) may be listed or enumerated. See, for example, U.S. provisional patent application Ser. No. 60/543,371, titled "Manipulating Sets of Hierarchical Data," filed on Feb. 9, 2004, by J. J. LeTourneau, and assigned to the assignee of the current provisional application. This is illustrated, here, for example, in FIG. 2. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371. U.S. provisional patent application Ser. No. 60/543,371 is provided simply as an example of listing or enumerating unordered BELTs.

Figure 2:
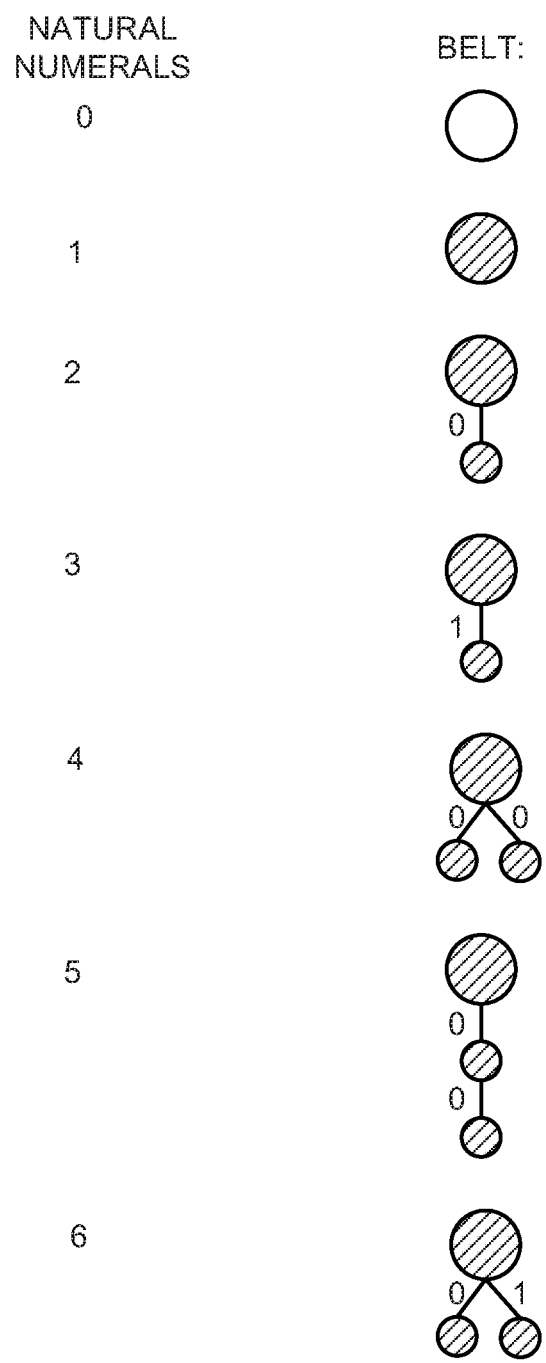
FIG. 2 is a schematic diagram illustrating an embodiment of an association between natural numerals and binary edge labeled trees.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 2 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 2, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Thus, referring again to FIG. 2, the one-push of the root tree is the tree at position three. This follows from FIG. 9 of previously referenced U.S. provisional patent application Ser. No. 60/543,371, since $Q((1*2)-1)=Q(1)=3$. Likewise, the tree at position five is the zero-push of the tree at position 2. Again, this follows from FIG. 9 of the previously referenced US provisional patent application, since $Q((2*2)-2)=Q(2)=5$.

In the embodiment just described, binary edge labeled trees use binary numerals "0" and "1." However, as previously suggested, the claimed subject matter is not limited in scope to binary edge labeled trees. For example, trees may employ any finite number of numeral combinations as labels, such as a unitary value, triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., for example.

Figure 3:
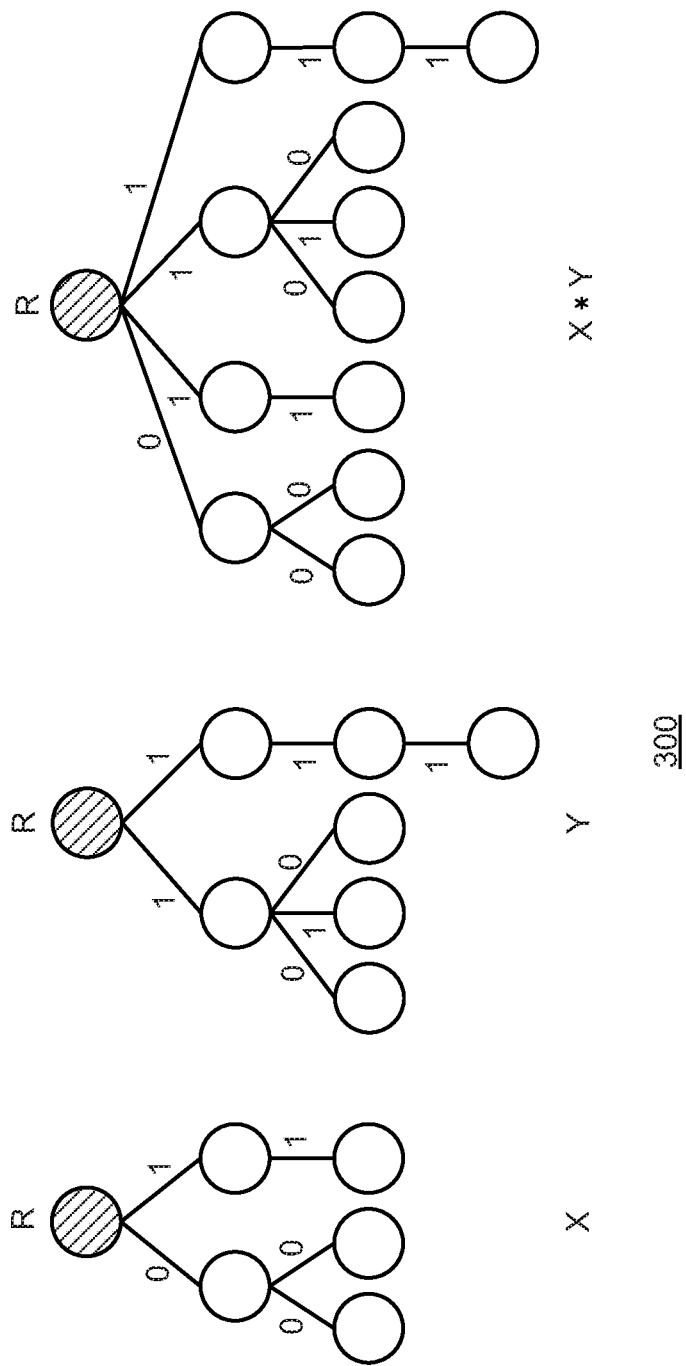
FIG. 3 is a schematic diagram illustrating an embodiment of an operation applied to an embodiment of two binary edge labeled trees.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and monadic operations, previously described as a zero-push and a one-push. For this particular embodiment, an additional operation may be characterized, a "merger" operation. The merger operation with respect to trees refers to merging two trees at their roots. This operation is illustrated, for example, in FIG. 3.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation returns "c" and is denoted as "c." The merger operator is denoted as "*" and here comprises a binary operation. In contrast, in U.S. provisional patent application No. 60/575,784, titled "Method and/or System for Simplifying Tree Expressions, such as for Pattern Matching," filed May 28, 2004, by J. J. LeTourneau, assigned to the assignee of the current application, monadic operators were employed, referred to as successor operators, using the symbol S(x), much like the push operations previously described.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Likewise, previously, in U.S. provisional application 60/543,371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter. See, for example, U.S. provisional patent application Ser. No. 60/623,280, titled "METHOD AND/OR SYSTEM FOR MANIPULATING TREE EXPRESSIONS" filed on Oct. 29, 2004, by J. J. LeTourneau, and U.S. provisional patent application Ser. No. 60/623,352 titled "METHOD AND/OR SYSTEM FOR TAGGING TREES" filed on Oct. 29, 2004, by J. J. LeTourneau; both of the foregoing assigned to the assignee of the current provisional patent application.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with unitary edge labeled trees.

As previously suggested in aforementioned U.S. provisional patent application No. 60/575,784, a set of congruence operations on a set of tree expressions may be isomorphic to a set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

It is likewise noted that, for this particular embodiment, one way of manipulating an edge labeled tree is to apply a push operation to the edge labeled tree. Likewise, as previously described, for this embodiment, a push operation comprises adding an edge and labeling it. For this embodiment, the labels for the edge labeled tree comprise numerals. Of course, this is merely one potential embodiment and the claimed subject matter is not limited in scope in this respect. For example, as previously described, letters may be employed. Likewise, any set of values where each value is distinct may be employed and remain within the scope of the claimed subject matter. Furthermore, a similar set of manipulations may be applied to node labeled trees rather than edge labeled trees. Likewise, a push operation may be applied to a node labeled tree, as previously described for edge labeled trees.

Additional uses of the previously described embodiment also exist, although the claimed subject matter is not limited in scope to a particular embodiment. For example, in one embodiment, FIG. 5 provides an embodiment of an association between natural numerals, on the left-hand side of FIG. 5, and a set of binary-valued strings or binary sequences, on the right-hand side of FIG. 5. Of course, as has been previously indicated, the claimed subject matter is not limited in scope to this particular association embodiment and many other association embodiments are included within the scope of the claimed subject matter. Nonetheless, there are aspects of this particular embodiment worthy of further discussion. For example, FIG. 4 provides a set of rules that permit conversion between the natural numerals and this particular association embodiment of sequences. Again, it is noted that the claimed subject matter is not limited in scope to this particular embodiment. However, as shall be discussed in more detail hereinafter, a feature of this particular embodiment is the ability to represent push operations and merger operations, such as those previously described in connection with edge labeled trees, using strings or sequences, here binary-valued strings or sequences.

FIG. 4 provides for this embodiment a set of rules for converting natural numerals to binary-valued strings. In this context, for FIGS. 4 and 5, a numeral with brackets, such as [X], is intended here to denote the binary sequence for X. As illustrated, and as is similar to the approach previously employed in conjunction with edge labeled trees, the numeral 0 is assigned an empty string, whereas the numeral 1 is assigned a pair of corresponding left-right brackets or parentheses (It is noted that the terms brackets and parentheses used interchangeably). This is indicated by expression 410. It is likewise noted that, in this context, the numeral zero is included when referring to the natural numerals. Likewise, as is illustrated by expression 420 in FIG. 4, a non-zero numeral that is two times the numeral X is represented as the string or sequence for X plus an extra set of left-right brackets or parentheses in front of the string or sequence for the numeral X. Likewise, expression 430, denoted the odd non-composite rule, is similar in concept to a push operation, previously described in connection with edge labeled trees. If a natural numeral is a non-composite numeral, it is assigned the string or sequence for the natural number index of that non-composite, as defined by the operation shown in FIG. 6, but then surrounded by an additional left-hand bracket on the left-hand side and an additional right hand bracket on the right-hand side, as depicted in FIG. 4. Further, expression 440 comprises the merger rule in which the multiplication of two natural numerals is simply the combination of the strings or sequences for those natural numerals represented side by side or adjacent to one another. It is further noted, although the claimed subject matter is not limited in scope in this respect, that a convention may be introduced to ensure that a unique association exists between particular numerals and strings. For example, one such convention may be that the smaller of the two numerals is the string or sequence on the left, for example, although, the claimed subject matter is not limited in scope to such a particular approach. From these rules, it is possible to construct the binary-valued sequences shown in FIG. 5 that correspond with the natural numerals. Again, it is noted that this is a particular association embodiment and the claimed subject matter is not limited in scope in this respect. Thus any one of a number of other rules for constructing sequences might have been employed and remain within the scope of the claimed subject matter.

A feature of this embodiment, although the claimed subject matter is not limited in scope in this respect, is that the binary-valued sequences shown in FIG. 5 may likewise be associated with unitary edge labeled trees, that is, trees that employ a single unitary label for all of the edges of the tree. To be more specific, the set of distinct values from which labels for edges are chosen is a set of one value only in such an embodiment. Alternatively, such trees need not have their edges labeled with any value since in such an embodiment the value is the same for all edges. Here, such an edge labeled tree may be converted to, for example, for this particular embodiment, a binary-valued string corresponding the edge labeled tree and the string may be manipulated in place of manipulating a corresponding natural numeral.

Thus, this particular embodiment provides an approach in which unitary edge labeled trees may be manipulated by converting to natural numerals, manipulating the natural numerals, and converting back to unitary edge labeled trees. See, for example, U.S. provisional patent application Ser. No. 60/623,280 titled "METHOD AND/OR SYSTEM FOR MANIPULATING TREE EXPRESSIONS filed on Oct. 29, 2004, by J. J. LeTourneau, and U.S. provisional patent application Ser. No. 60/623,352, titled "METHOD AND/OR SYSTEM FOR TAGGING TREES filed on Oct. 29, 2004, by J. J. LeTourneau; both of the foregoing assigned to the assignee of the current provisional patent application. Furthermore, unitary edge labeled trees may be manipulated by converting to corresponding binary-valued strings, manipulating the strings, and then converting back to unitary edge labeled trees. It is noted that the claimed subject matter is not limited to these particular approaches or to employing any one of these approaches alone. The desirability of the approach will vary with a variety of potential factors, including storage capabilities, processing capabilities, the particular application and the like.

In yet another embodiment in accordance with the claimed subject matter, a sequence of natural numerals may be converted to a binary sequence representing trees of finite size, such as unitary trees. As shall be discussed in more detail hereinafter, additionally padding values may be imbedded or added between the portion of the sequence that represents natural numerals, also referred to as data or signal information in this particular context. The resulting sequence may then be transmitted. Likewise, the binary sequence representing natural numerals in the form of finite trees plus padding values may be received and then converted into the sequence of natural numerals at the receiving end.

Thus, although the claimed subject matter is not limited in scope in this respect, this particular embodiment provides a technique for transmitting a finite sequence of natural numerals by employing two values, referred to in this context as a binary sequence or a binary-valued string. It is noted that these values may comprise "0" and "1" as is conventionally employed in connection with digital systems, although, of course, the claimed subject matter is not limited in scope in this respect. Instead, for this particular embodiment, and as illustrated in connection with FIG. 4, "0" shall comprise a left parenthesis, denoted "(", and "1" shall comprise a right parenthesis, denoted ")", for this particular embodiment. Nonetheless, as is understood, there is no loss of generality by employing this value replacement for the purposes of this particular embodiment.

Figure 7:
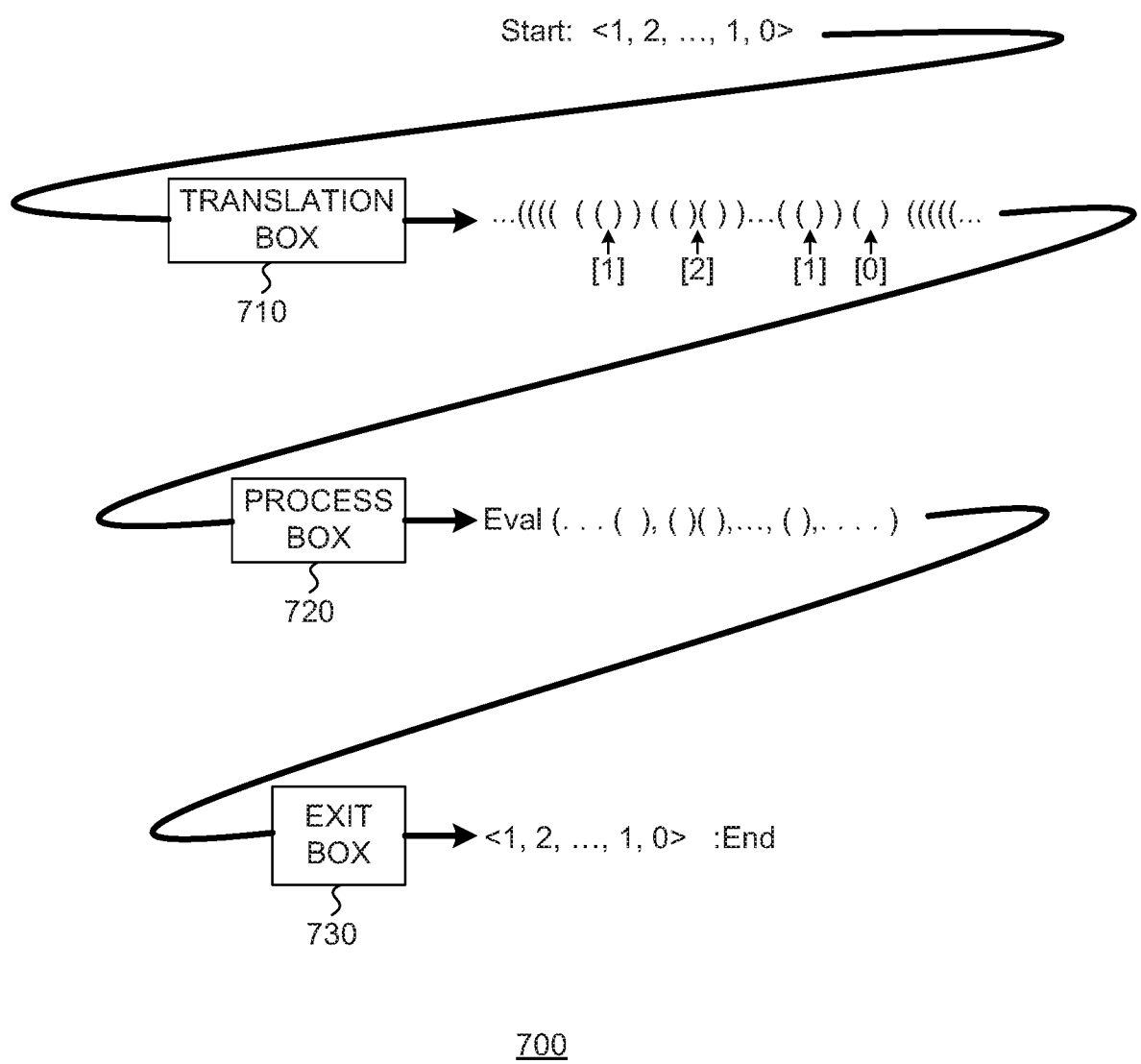
FIG. 7 is a schematic diagram illustrating an embodiment of a technique for transmitting natural numerals using binary sequences.

FIG. 7 is a schematic diagram illustrating an example of this particular embodiment. Thus, as illustrated, a finite sequence of natural numerals, designated for example as 1, 2, . . . , 1, 0 are translated, depicted here by box 710 in FIG. 7. This translation may be implemented using a table look up, for example, applying the approach previously described with respect FIGS. 4 and 5. Alternatively, of course, instead, the previously described approach may be implemented by a computing platform programmed to determine the desired binary sequence representation for a natural numeral, computed, for example, as previously described, from a finite tree, such as a unitary tree for this particular embodiment.

Although the claimed subject matter is not limited in scope in this respect, as suggested, one technique for implementing this approach may be to apply a table look up approach. Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover all such embodiments.

Additionally, padding values may be imbedded or inserted between representations of the particular natural numerals, here, the particular binary representations for the particular trees. In this particular embodiment, such a padding value comprises a left parenthesis, although, of course, the claimed subject matter is not limited in scope in this respect. It is noted that, for this embodiment, an arbitrary amount of padding may be inserted between the representations of the natural numerals to be transmitted. As discussed in more detail, this is one desirable aspect of this particular embodiment. Although the claimed subject matter is not limited in scope in this respect, such padding may be inserted between such representations, as depicted by process box 720 in FIG. 7. It is this combined binary sequence that then may be transmitted across a transmission media or communications channel. This binary sequence may then be received at a receiver which may then be employed, as depicted by box 730, to convert the binary sequence back into the natural numerals, as described in more detail below, for this particular embodiment.

It is noted that this particular embodiment has a number of desirable properties associated with it. For example, natural numerals may be transmitted in any multiplicity and in any order. Likewise, although the previous discussion suggests the communication of natural numerals, in an alternate embodiment, a table look up may be employed at each end of a communications channel to permit communication of other information other than natural numerals. For example, natural numerals may represent other information to be communicated and a table look up process at the receiving end and transmitting end may be employed to perform the conversion prior to transmission and after reception. Likewise, in FIG. 7, the particular binary sequence is illustrated as being applied to process box 720 in reverse order, so that the sequence is "read" right to left here, although this is merely one embodiment and, alternatively, the binary sequence may be applied to process box 720 without employing this reverse order.

As previously indicated, in this particular embodiment, right parenthesis or right bracket and left parenthesis or left bracket in place of the conventional binary values "0" and "1"; however, the claimed subject matter is not limited in this respect. Likewise, for the embodiment illustrated in FIG. 7, as illustrated and discussed in more detail later, a sequence of values is read right to left, although, of course, the claimed subject matter is not limited in scope in this respect. Thus, on the receiver side of the communications channel, if a right parenthesis is received, this indicates the start of a sequence of data or signal information. Alternatively, if a left parenthesis is received this indicates padding unless a right parenthesis is received first that corresponds to the left parenthesis. One way to implement this, although, of course, the claimed subject matter is not limited in scope in this respect, is by assigning a minus one (−1) to a left parenthesis or bracket and a plus one (+1) to a right parenthesis or bracket. Thus, by accumulating values as parentheses are received, encountering zero may be employed to indicate or synchronize the beginning of a binary sequence of data. This approach has a number of potential advantages, although the claimed subject matter is not limited in scope to this approach or to possessing the particular advantages of a particular embodiment.

An effect of this accumulation approach is to match binary values in this particular embodiment, such as matching a left parenthesis with a corresponding right parenthesis. Once the accumulation equals zero, the receiver recognizes that it has received signal information, in this particular embodiment, a binary sequence representing a natural numeral. In this context, the term signal information generally refers to data to be transmitted across a communications channel. Thus, a first right parenthesis is a wake up signal to the receiver and a corresponding left parenthesis signals the end of a grouping of signal information. Likewise, if zero is reached again, this allows the receiver to recognize that signal information has been communicated. Otherwise, what is received represents padding values that may be inserted between groupings of signal information. Of course, for this embodiment, the particular groupings represent particular natural numerals. Likewise, with this mechanism, referring to FIG. 5, if nothing, that is, no additional values, is received between corresponding binary values, such as left and right parenthesis, this signifies the natural numeral zero in this embodiment using the empty sequence of empty string. Alternately, the natural numeral one and the remaining natural numerals may be indicated by receiving a sequence of binary values or right and left parentheses, such as those indicated in FIG. 5, between a first set of corresponding binary values, such as between a right and a left parenthesis, although the claimed subject matter is not limited in scope in this respect. As the previous discussion in FIG. 5 indicates, a particular grouping of signal information will not be completely received until the accumulation at the receiver equals zero. This is a signal in this embodiment to the receiver that a grouping of binary values that represents a discrete natural numeral has been received between a set of corresponding binary values, such as, for this embodiment, a right parenthesis and a left parenthesis.

One technique, although the claimed subject matter is not limited in scope in this respect, to determine whether a portion of a binary sequence is padding or signal information is based at least in part on the amount that has been accumulated at the time a particular binary value is received. For example, using the convention previously described, if the accumulation is negative, that indicates data or signal information is currently being received; however, if the accumulation is positive, that indicates padding, such as, for one embodiment, for example, control signal information, is currently being received.

This particular technique or embodiment has a number of useful properties, although the claimed subject matter is not limited in scope to this particular embodiment.

For example, a natural numeral of any particular size may be transmitted across a communications channel. Thus, communication of a natural numeral is not limited by a buffer size or register size, such as 32 bits or 64 bits. Likewise, similarly, arbitrarily-sized padding or breaks may be employed between natural numerals. In addition, as the previous discussion illustrates, for this particular embodiment, the binary sequence is self-synchronizing. More specifically, the receiver becomes synchronized whenever zero is reached during accumulation, as previously described. This provides an advantage over other types of approaches in which synchronizing signals are transmitted separately from the data.

It is likewise noted that the ability to provide arbitrary padding or breaks between signal information provides a number of different potential capabilities, although the following examples are not intended to limit the scope of the claimed subject matter in any way. For example, it may be possible to use padding between groupings of binary values to communicate control signals, such as, in one example, potential multiplexing of the sequence signal information. In this particular context, the term control signals or control signal information refers to signal information that is not data to be communicated, For example, the padding could designate different processors or other hardware that are to receive and/or process a particular portion of the binary sequences received. Likewise, if several independent binary sequences are transmitted separately, the self-synchronizing capability previously described provides the capability for the independent sequences to become cross-synchronized, even, for example, if received by different receivers. Likewise, alternately, such padding may provide other control signal information, such as encryption keys that may be employed in any one of a variety of possible encryptions schemes. Likewise, such padding values may be employed for watermarking or authentication of received binary sequences. Again, these are just a few examples of possible uses of the padding values in connection with a binary sequence as described in this particular embodiment. Alternately, such padding could provide "context control," such as, for example, depending upon the particular context, using padding to provide control signal information designating or indicating the meaning of the data or signal information that is being received. Perhaps, for example, without intending to limit the scope of the claim subject matter, each natural numeral, or at least some of the natural numerals being transmitted, represents data for a different purpose at the receiving end of a communications channel. Likewise, depending on the particular environment, it may be possible to insert real time information in place of padding values as binary sequences are transmitted between different points or nodes, for example. This may be useful, for example, if there are delays or other communication system performance information, for example, that it is desirable to capture in real time in a string of communication transmissions, for example. Likewise, another application may include inserting error correction coding into the binary sequence so as not to disturb the data being transmitted.

In still yet another embodiment, content signal information may be provided by padding values. Examples, without limitation include: audio signal information, video signal information, picture signal information, VoIP encoding signal information, or other information about the content of the sequence.

In yet another embodiment, although, again, the claimed subject matter is not limited in scope in this respect, compression may be applied. For example, if natural numerals are to be transmitted, the particular natural numbers may be factored into non-composite numerals and indices for the non-composite numerals, such as those indicated in FIG. 6, for example, may be represented in the binary sequence, potentially reducing the number of total binary values to be transmitted.

An aspect of this particular embodiment also relates to converting from the binary sequence acquired at the receiver to a sequence of natural numerals. Of course, for this particular embodiment, data or signal information and padding values are separated. Likewise padding values are then ignored at least for the purposes of determining the natural numerals that were transmitted. As previously described, one approach may be to employ a look up table containing information, such as that illustrated in FIG. 5. In an alternate embodiment, however, it may be possible to, instead, determine the associated natural numeral with the received binary sequence through computation. This may be accomplished, for this particular embodiment, in a manner similar to an inverse of the approach depicted in FIG. 4.

Once a grouping of sequence values representing a particular natural numeral, or representing a particular tree (that corresponds to a particular natural numeral) is received, using the approach described above, for example, for this particular embodiment, that grouping is evaluated.

For example, as previously suggested for this particular embodiment, if the grouping is empty, this indicates the natural numeral 0. Here, of course, this refers to receiving one set of corresponding binary values for synchronization, such as a right and left parenthesis. However, if a single right parenthesis and a single corresponding left parenthesis is between the one set of corresponding binary values providing synchronization, here a corresponding right and left parenthesis, for this particular embodiment, this indicates the natural numeral 1. If the grouping contains anything else, in this embodiment, further evaluation is performed on the values between the corresponding right and left parentheses, as described in more detail below.

Within or between the first set of corresponding right and left parentheses is a subgrouping of values. If the subgrouping is not one of the possibilities discussed immediately above (e.g., empty or a right-left pair, for example), three other possibilities remain for this particular embodiment. First, there may be second set of corresponding right and left parentheses that contain a subgrouping of values. Second, there may be a second set of corresponding right and left parentheses immediately preceding a subgrouping of values. Third, there may be two self-contained or complete subgroupings of binary values side-by-side.

These possibilities are depicted in FIG. 8. In this particular context, the term grouping refers to the longest sequence of consecutive binary values out of a sequence that taken as a whole represents a single natural numeral. The term subgrouping refers to a sequential portion of binary values that is a subset of a grouping. It is noted that a grouping may contain subgroupings that represent natural numerals; likewise, a subgrouping may contain smaller subportions that also represent a natural numeral. Thus, in a recursive fashion, the grouping and then the subgroupings are evaluated using the approach illustrated, for this embodiment, in FIG. 8, until a natural numeral is determined for a complete grouping.

Of course, the claimed subject matter is not limited to unordered edge labeled trees. For example, as described in previously cited U.S. provisional patent application 60/543,371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). As one example embodiment, operations and/or manipulations may be employed using edge labeled trees and the resulting edge labeled tree may be converted to a node labeled tree. However, in another embodiment, operations and/or manipulations may be performed directly using node labeled trees.

In accordance with the claimed subject matter, therefore, any tree, regardless of whether it is edge labeled, node labeled, non-binary, a feature tree, or otherwise, may be manipulated and/or operated upon in a manner similar to the approach of the previously described embodiments. However, for convenience, without intending to limit the scope of the claimed subject matter in any way, here, operations and/or manipulations and the like have been described primarily in the context of unitary trees. See, for example, U.S. provisional patent application Ser. No. 60/543,371, titled "Manipulating Sets of Hierarchical Data," filed on Feb. 9, 2004, by J. J. LeTourneau, and assigned to the assignee of the current provisional application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of executing computer instructions, the method comprising:
    accessing instructions from one or more physical memory devices for execution by one or more processors;
    executing the instructions accessed from the one or more physical memory devices by the one or more processors;
    storing, in at least one of the physical memory devices, signal values resulting from having executed the instructions on the one or more processors;
    wherein the accessed instructions to communicate a sequence of binary values; and
    wherein executing the instructions to communicate the sequence of binary values further comprising:
    receiving, via a communications channel, a sequence of binary values in the form of digital electronic signals, the digital electronic signals comprising content signals,
    the sequence comprising a sequence of labeled tree structures in a form of the sequence of binary values and the sequence of the labeled tree structures representing content, wherein the labeled tree structures comprise labeled tree hierarchies; and
    converting the labeled tree hierarchies to symbols.

2. The method of claim 1, wherein the content signals comprise at least one of the following content signals: audio content signals; video content signals; picture content signals; alphanumerical string content signals; or VoIP content signals.

3. The method of claim 1, wherein the converting the labeled tree hierarchies to symbols comprises:
    accessing the one or more of the physical memory devices to identify the symbols associated with the labeled tree hierarchies, the one or more physical memory devices storing an accessible structure comprising stored values representing the symbols.

4. The method of claim 3, wherein the accessing the one or more physical memory devices to identify the symbols associated with the labeled tree hierarchies comprises:
    performing a table look up operation to determine the symbols associated with the labeled tree hierarchies.

5. The method of claim 1, the sequence further comprising control signals.

6. The method of claim 1, the sequence further comprising padding signals.

7. The method of claim 1, wherein the sequence comprises a self-synchronizing sequence.

8. The method of claim 1, wherein the sequence comprises a cross-synchronizing sequence.

9. The method of claim 1, wherein the sequence of binary values further comprises a sequence to synchronize a transmitting end and a receiving end of the communications channel.

10. A method of executing computer instructions, the method comprising:
    accessing instructions from one or more physical memory devices for execution by one or more processors;
    executing the instructions accessed from the one or more physical memory devices by the one or more processors;
    storing, in at least one of the physical memory devices, signal values resulting from having executed the instructions on the one or more processors;
    wherein the accessed instructions to communicate a sequence of binary values; and
    wherein executing the instructions to communicate the sequence of binary values further comprising:
    receiving, via a communications channel, a sequence of binary values in the form of digital electronic signals, the digital electronic signals comprising content signals,
    the sequence comprising a sequence of labeled tree structures in the form of the sequence of binary values and the sequence of the labeled tree structures representing content, wherein the labeled tree structures comprise labeled tree hierarchies, and
    converting the labeled tree hierarchies to symbols, and
    comparing a symbol representing a labeled tree hierarchy to other symbols stored in the one or more physical memory devices to detect a presence of the symbol, wherein a correspondence between the symbol and at least one of the other symbols is indicative of a presence of content in electronic content corresponding to the at least one of the other symbols stored and is indicative of one or more locations thereof.

11. The method of claim 10, wherein the content signals comprise at least one of the following content signals: audio content signals; video content signals; picture content signals; alphanumerical string content signals; or VoIP content signals.

12. The method of claim 10, wherein the sequence of binary values further comprises a sequence to synchronize a transmitting end and a receiving end of the communications channel.

13. An article comprising:
    a non-transitory storage medium comprising instructions stored thereon:
    wherein the instructions being accessible from the non-transitory storage medium as physical memory states on one or more physical memory devices, the one or more physical memory devices coupled to one or more processors able to execute the instructions stored as physical memory states, the one or more physical memory devices also able to store binary digital signal quantities, if any, as physical memory states, that are to result from execution of the instructions on the one or more processors, wherein the the execution of the instructions to communicate a sequence of binary values, and wherein the execution of the instructions to communicate the sequence of binary values further to:
    communicate, via a communications channel, a sequence of binary values in the form of digital electronic signals, the digital electronic signals comprising content signals,
    the sequence to comprise a sequence of labeled tree structures in the form of the sequence of binary values and the sequence of the labeled tree structures to represent content, wherein the labeled tree structures to comprise the labeled tree hierarchies and the sequence to further comprise a sequence to synchronize a transmitting end and receiving end of the communications channel; and convert the labeled tree hierarchies to symbols.

14. The article of claim 13, wherein the content signals to comprise at least one of the following content signals: audio content signals; video content signals; picture content signals; alphanumerical string content signals or VoIP encoding content signals.

15. The article of claim 13, wherein to convert the labeled tree hierarchies to symbols comprises:
to access the one or more physical memory devices to identify the symbols associated with the labeled tree hierarchies, the one or more physical memory devices to store an accessible structure comprising stored values representing the symbols.

16. The article of claim 15, wherein access to the one or more physical memory devices to identify the symbols associated with the labeled tree hierarchies comprises:
to perform a table look up operation to determine the symbols associated with the labeled tree hierarchies.

17. The article of claim 13, the sequence to further comprise control signals.

18. The article of claim 13, the sequence to further comprise padding signals.

19. The article of claim 13, wherein the sequence to further comprise a self-synchronizing sequence.

20. The article of claim 13, wherein the sequence to further comprise a cross-synchronizing sequence.

21. An article comprising:
a non-transitory storage medium comprising instructions stored thereon:
wherein the instructions being accessible from the non-transitory storage medium as physical memory states on one or more physical memory devices, the one or more physical memory devices coupled to one or more processors able to execute the instructions stored as physical memory states, the one or more physical memory devices also able to store binary digital signal quantities, if any, as physical memory states, that are to result from execution of the instructions on the one or more processors, wherein the execution of the instructions to communicate a sequence of binary values, and wherein the instructions to communicate the sequence of binary values further to:
communicate, via a communications channel, a sequence of binary values in the form of digital electronic signals, the digital electronic signals comprising content signals,
the sequence to comprise a sequence of labeled tree structures in the form of the sequence of binary values and the sequence of the labeled tree structures to represent content, wherein the labeled tree structures to comprise the labeled tree hierarchies and the sequence to further comprise a sequence to synchronize a transmitting end and a receiving end of the communications channel;
convert the labeled tree hierarchies to symbols, and
compare a symbol representing a labeled tree hierarchy to other symbols in the one or more physical memory devices to detect a presence of the symbol, wherein a correspondence between the symbol and at least one of the other symbols is indicative of a presence of content in electronic content corresponding to the at least one of the other symbols and is indicative of one or more locations thereof.

22. The article of claim 21, wherein the content signals comprise at least one of the following content signals: audio content signals; video content signals; picture content signals; alphanumerical string content signals; or VoIP content signals.

23. An apparatus comprising:
one or more processors coupled to one or more physical memory devices to store executable instructions and to store binary digital storage quantities as physical memory states, wherein the executable instructions being accessible from the one or more physical memory devices for execution by one or more processors; and
the one or more processors able to store in at least one of the physical memory devices, binary digital signal quantities, if any, that are to result from execution of the instructions on the one or more processors, wherein the executable instructions to communicate a sequence of binary values; and
wherein the instructions to communicate the sequence of binary values further to:
communicate, via a communications channel, a sequence of binary values in the form of digital electronic signals, the digital electronic signals to comprise content signals;
the sequence to comprise a sequence of labeled tree structures in the form of the sequence of binary values and the sequence of the labeled tree structures to represent content, wherein the labeled tree structures to comprise labeled tree hierarchies; and
convert the labeled tree hierarchies to symbols. .

24. The apparatus of claim 23, wherein the content signals comprise at least one of the following content signals: audio content signals; video content signals; picture content signals; alphanumerical string content signals; or VoIP encoding content signals.

25. The apparatus of claim 23, wherein the symbols to convert the labeled tree hierarchies to symbols to comprise:
to access the one or more physical memory devices to identify the symbols associated with the labeled tree hierarchies.

26. The apparatus of claim 25, wherein to access the one or more physycal memory devices to identify the symbols associated with the labeled tree hierarchies to comprise:
to perform a table lookup operation to determine the symbols associated with the labeled tree hierarchies.

27. The apparatus of claim 23, wherein the sequence to comprise a self-synchronizing sequence.

28. The apparatus of claim 23, wherein the sequence to comprise a cross-synchronizing sequence.

29. The apparatus of claim 23, wherein the sequence of binary values further to comprise control signals.

30. The apparatus of claim 23, wherein the sequence of binary values further to comprise padding signals.

31. The apparatus of claim 23, wherein the sequence of binary values further to comprise a sequence to synchronize a transmitting end and a receiving end of the communications channel.

32. An apparatus comprising:
one or more processors coupled to one or more physical memory devices to store executable instructions and to store binary digital storage quantities as physical memory states, wherein the executable instructions being accessible from the one or more physical memory devices for execution by one or more processors; and the one or more processors able to store in at least one of the physical memory devices, binary digital signal quantities, if any, that are to result from execution of the instructions on the one or more processors, wherein the executable instructions to communicate a sequence of binary values; and wherein the instructions to communicate the sequence of binary values further to:

communicate, via a communications channel, a sequence of binary values in the form of digital electronic signals, the digital electronic signals to comprise content signals;

the sequence to comprise a sequence of labeled tree structures in the form of the sequence of binary values and the sequence of the labeled tree structures to represent content, wherein the labeled tree structures to comprise labeled tree hierarchies; and convert the labeled tree hierarchies to symbols; and compare a symbol to represent a labeled tree hierarchy to other symbols stored in the one or more physical memory devices to detect a presence of the symbol, wherein a correspondence between the symbol and at least one of the other symbols is indicative of a presence of content in electronic content corresponding to at least one of the other symbols stored and is indicative of one or more locations thereof.

33. The apparatus of claim 32, wherein the content signals comprise at least one of the following content signals: audio content signals; video content signals; picture content signals; alphanumerical string content signals; or VoIP content signals.

34. The apparatus of claim 32, wherein the sequence of binary values further to comprise a sequence to synchronize a transmitting end and a receiving end of the communications channel.

35. An apparatus to communicate a sequence of binary values to represent a sequence of finite labeled trees, the apparatus comprising:

means for accessing instructions from one or more physical memory devices for execution by one or more processors;

means for executing the instructions accessed from the one or more physical memory devices by the one or more processors;

means for storing, in at least one of the physical memory devices, signal values resulting from having executed the instructions on the one or more processors;

wherein the accessed instructions to communicate a sequence of binary values; and wherein the means for executing the instructions to communicate the sequence of binary values comprises:

means for communicating via a communications channel a sequence of binary values in the form of digital electronic signals, the digital electronic signals comprising content signals;

the sequence comprising a sequence of labeled tree structures in the form of the sequence of binary values and the sequence of labeled tree structures representing content, wherein the labeled tree structures comprising labeled tree hierarchies; and means for converting the labeled tree hierarchies to symbols.

36. The apparatus of claim 35, wherein the content signals comprise at least one of the following content signals: audio content signals; video content signals; picture content signals; alphanumerical string content signals; or VoIP encoding content signals.

37. The apparatus of claim 35, wherein the sequence comprises a self-synchronizing sequence.

38. The apparatus of claim 35, wherein the sequence comprises a cross-synchronizing sequence.

39. The apparatus of claim 35, wherein the means for converting the labeled tree hierarchies comprises:

means for accessing the one of the physical memory devices to identify the symbols associated with the labeled tree hierarchies.

40. The apparatus of claim 39, wherein the means for accessing the one or more physical memory devices to identify the symbols associated with the labeled tree hierarchies comprises:

a means for performing a table look up operation to determine the symbols associated with the labeled tree hierarchies.

41. The apparatus of claim 35, the sequence further comprising control signals.

42. The apparatus of claim 35, the sequence further comprising padding signals.

43. The apparatus of claim 35, wherein the sequence of binary values further comprises a sequence to synchronize a transmitting end and a receiving end of the communications channel.

44. An apparatus to communicate a sequence of binary values to represent a sequence of finite labeled trees, the apparatus comprising:

means for accessing instructions from one or more physical memory devices for execution by one or more processors;

means for executing the instructions accessed from the one or more physical memory devices by the one or more processors;

means for storing, in at least one of the physical memory devices, signal values resulting from having executed the instructions on the one or more processors;

wherein the accessed instructions to communicate a sequence of binary values; and wherein the means for executing the instructions to communicate the sequence of binary values comprises:

means for communicating via a communications channel a sequence of binary values in the form of digital electronic signals, the digital electronic signals comprising content signals;

the sequence comprising a sequence of labeled tree structures in the form of the sequence of binary values and the sequence of labeled tree structures representing content, wherein the labeled tree structures comprising labeled tree hierarchies; and means for converting the labeled tree hierarchies to symbols; and means for comparing a symbol representing a labeled tree hierarchy to other symbols stored in the one or more physical memory devices to detect a presence of the symbol, wherein a correspondence between the symbol and at least one of the other symbols is indicative of a presence of content in electronic content corresponding to the at least one of the other symbols stored and is indicative of one or more locations thereof.

45. The apparatus of claim 44, wherein the content signals comprise at least one of the following content signals: audio content signals; video content signals; picture content signals; alphanumerical string content signals; or VoIP content signals.

46. The apparatus of claim 44, wherein the sequence of binary values further comprises a sequence to synchronize a transmitting end and a receiving end of the communications channel.

\* \* \* \* \*